(12) United States Patent
Yoshizawa et al.

(10) Patent No.: US 11,181,838 B2
(45) Date of Patent: *Nov. 23, 2021

(54) ELECTROPHOTOGRAPHIC PHOTORECEPTOR, ELECTROPHOTOGRAPHIC PHOTORECEPTOR CARTRIDGE AND IMAGE FORMING APPARATUS

(71) Applicant: Mitsubishi Chemical Corporation, Chiyoda-ku (JP)

(72) Inventors: Atsushi Yoshizawa, Tokyo (JP); Hiroyuki Fukuoka, Tokyo (JP); Osamu Numata, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/570,619

(22) Filed: Sep. 13, 2019

(65) Prior Publication Data

US 2020/0004169 A1 Jan. 2, 2020

Related U.S. Application Data

(63) Continuation of application No. PCT/JP2018/010341, filed on Mar. 15, 2018.

(30) Foreign Application Priority Data

Mar. 16, 2017 (JP) .............................. JP2017-050855

(51) Int. Cl.
G03G 5/05 (2006.01)
C08F 265/06 (2006.01)
G03G 21/18 (2006.01)

(52) U.S. Cl.
CPC ......... *G03G 5/0546* (2013.01); *C08F 265/06* (2013.01); *G03G 5/0539* (2013.01); *G03G 21/18* (2013.01)

(58) Field of Classification Search
CPC ............... G03G 5/0539; G03G 5/0546; G03G 5/14726; G03G 5/0589; G03G 5/14786
See application file for complete search history.

(56) References Cited

U.S. PATENT DOCUMENTS

| 5,254,422 A * | 10/1993 | Kato .................... G03G 5/0589 430/49.6 |
| 5,459,005 A | 10/1995 | Kato et al. |
| 5,580,690 A | 12/1996 | Kato et al. |
| 5,597,672 A | 1/1997 | Kato |
| 5,747,214 A * | 5/1998 | Kato ........................ G03G 5/02 156/277 |
| 2002/0077411 A1 | 6/2002 | Nakajima et al. |
| 2004/0253529 A1 | 12/2004 | Baba et al. |
| 2008/0199795 A1 | 8/2008 | Ogaki et al. |
| 2009/0130576 A1 | 5/2009 | Ogaki et al. |
| 2010/0120974 A1 | 5/2010 | Shimanaka et al. |
| 2010/0248100 A1 | 9/2010 | Ezumi |
| 2010/0248105 A1 | 9/2010 | Nukada et al. |
| 2012/0231379 A1 * | 9/2012 | Nukada ............... G03G 5/14726 430/56 |
| 2013/0017478 A1 * | 1/2013 | Oda .................... G03G 5/14726 430/56 |
| 2013/0122408 A1 * | 5/2013 | Haruyama ......... G03G 5/14726 430/56 |

(Continued)

FOREIGN PATENT DOCUMENTS

| JP | 6-51541 A | 2/1994 |
| JP | 6-289630 A | 10/1994 |
| JP | 8-234503 A | 9/1996 |
| JP | 2002-194037 A | 7/2002 |
| JP | 2003-213062 A | 7/2003 |

(Continued)

OTHER PUBLICATIONS

Diamond, Arthur S. (ed) Handbook of Imaging Materials. New York: Marcel-Dekker, Inc. pp. 145-164, 239-247, and 254-257. (Year: 2001).*

International Search Report dated May 1, 2018 in PCT/JP2018/010341 filed Mar. 15, 2018 (with English translation).

Written Opinion dated May 1, 2018 in PCT/JP2018/010341 filed Mar. 15, 2018.

(Continued)

*Primary Examiner* — Christopher D Rodee
(74) *Attorney, Agent, or Firm* — Oblon, McClelland, Maier & Neustadt, L.L.P.

(57) ABSTRACT

The present invention aims to provide an electrophotographic photoreceptor excellent in abrasion resistance and electrical properties, which uses polymers excellent in surface-active functions such as fluororesin dispersibility and electrical properties, and relates to an electrophotographic photoreceptor which contains a polymer containing a repeating unit represented by the following Formula (A1), provided that the definitions of $X^1$, $X^2$, $R^{11}$ to $R^{16}$ in Formula (A1), and $R^{21}$ in Formula (A2) are shown in the specification

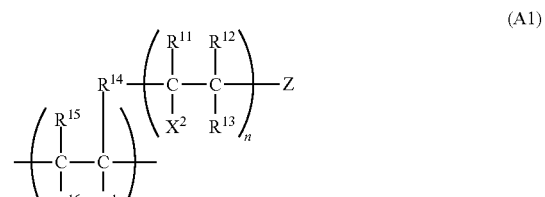

(A1)

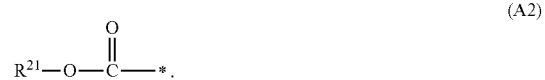

(A2)

9 Claims, 2 Drawing Sheets

(56) References Cited

U.S. PATENT DOCUMENTS

| | | | | |
|---|---|---|---|---|
| 2013/0316278 A1* | 11/2013 | Zhu | .......................... | G03G 5/06 |
| | | | | 430/69 |
| 2014/0377695 A1* | 12/2014 | Kameyama | ........ | G03G 5/14708 |
| | | | | 430/96 |
| 2015/0346615 A1* | 12/2015 | Kihara | ................ | G03G 5/14726 |
| | | | | 430/56 |
| 2020/0233322 A1* | 7/2020 | Choda | .................. | G03G 5/0539 |

FOREIGN PATENT DOCUMENTS

| JP | 2004-361929 A | 12/2004 |
|---|---|---|
| JP | 2008-214530 A | 9/2008 |
| JP | 4418600 B2 | 2/2010 |
| JP | 4436456 B2 | 3/2010 |
| JP | 2010-90338 A | 4/2010 |
| JP | 2010-224503 A | 10/2010 |
| JP | 2010-230970 A | 10/2010 |
| JP | 2011-118054 A | 6/2011 |
| JP | 2011-209309 A | 10/2011 |
| JP | 2012-158696 A | 8/2012 |
| JP | 5544850 B2 | 7/2014 |
| JP | 5589497 B2 | 9/2014 |
| JP | 5719014 B1 | 5/2015 |
| JP | 2015-218231 A | 12/2015 |
| JP | 2016-166260 A | 9/2016 |
| WO | WO 2008/053904 A1 | 5/2008 |

OTHER PUBLICATIONS

Office Action dated Oct. 12, 2021 in the corresponding JP patent application No. 2018-047382 (English machine translation).

\* cited by examiner

ELECTROPHOTOGRAPHIC PHOTORECEPTOR, ELECTROPHOTOGRAPHIC PHOTORECEPTOR CARTRIDGE AND IMAGE FORMING APPARATUS

TECHNICAL FIELD

The present invention relates to an electrophotographic photoreceptor using a specific polymer, an electrophotographic photoreceptor cartridge, and an image forming apparatus, and particularly, to an electrophotographic photoreceptor which uses a specific polymer and is excellent in electrical properties, abrasion resistance, or the like.

BACKGROUND ART

In a case where fluororesin particles such as polytetrafluoroethylene (PTFE) are dispersed in a non-aqueous liquid medium such as an organic solvent, the fluororesin particles are likely to aggregate and deposit, and it is very difficult to disperse to a fine particle diameter and to maintain the dispersed state of the fine particle diameter since the fluororesin has low surface energy, water and oil repellency, and large specific gravity.

Therefore, in the related art, dispersion of fluororesin particles in an organic solvent is performed by using a fluororesin dispersant (Patent Literatures 1 to 3).

On the other hand, the electrophotographic photoreceptor is repeatedly used in an electrophotographic process, that is, a cycle of charging, exposure, development, transfer, cleaning, charge eliminating or the like, and it is under various stresses during that time. In the process, there are mechanical stress such as abrasion, scratches and film peeling of the surface of the photosensitive layer due to rubbing with a cleaning blade or a magnetic brush, contact with a developer or paper, or likes. Such mechanical stress damage is likely to appear on an image, and directly affects the image quality, and which is a major factor limiting the lifespan of the photoreceptor.

Various studies have been made for means against mechanical stress of photoreceptors. The means include, for example, providing a protective layer on the outermost surface layer of the photoreceptor, increasing mechanical strength of a binder resin in the outermost layer, and adding a filler to the outermost layer.

Among these, a study in which fluororesin particles are used as a filler has been conducted (Patent Literature 4). The fluororesin particles have high lubricity, and have the function of improving the abrasion resistance of the photoreceptor by reducing the frictional force between the photoreceptor and a member which contacts the photoreceptor during the electrophotographic process.

In the case of using fluororesin particles in the electrophotographic photoreceptor, fluororesin dispersants are used because of poor dispersibility of the fluororesin particles in coating liquids using organic solvents.

At that time, a fluorine (meth)acrylic graft polymer having a specific structure which is relatively unlikely to deteriorate the electrical properties is used in an electrophotographic photoreceptor because the electrical properties are required (Patent Literatures 5 to 7).

CITATION LIST

Patent Literature

Patent Literature 1: JP-A-2003-213062
Patent Literature 2: JP-A-2010-090338
Patent Literature 3: Japanese Patent No. 5719014
Patent Literature 4: Japanese Patent No. 4418600
Patent Literature 5: Japanese Patent No. 4436456
Patent Literature 6: Japanese Patent No. 5544850
Patent Literature 7: Japanese Patent No. 5589497

SUMMARY OF INVENTION

Technical Problem

However, with the dispersant as described above, the fine particle diameter of the fluororesin particles in the organic solvent and the dispersion stability in the state of the fine particle diameter are still insufficient. Accordingly, a uniform film cannot be obtained, and the abrasion resistance of the electrophotographic photoreceptor is not sufficiently improved. In addition, in a case where the fluorine (meth) acrylic graft polymer having a specific structure as described in Patent Literatures 5 to 7 is used for the electrophotographic photoreceptor as a dispersant, the electrical properties such as an increase in residual potential in repeated use are deteriorated.

The present invention has been made in view of the above problems.

The present invention provides a polymer excellent in surface-active functions such as electrical properties and dispersibility of fluororesin particles, and further provides an electrophotographic photoreceptor excellent in abrasion resistance and electrical properties by using the polymer.

Solution to Problem

The inventors of the present invention have conducted intensive studies to solve the above-mentioned problems, and as a result, it is found that a polymer having a partial structure (moiety) derived from a macromonomer having a specific structure has surface-active functions excellent in dispersibility of fluororesin particles, and a uniformly dispersed coating film can be provided, so that the obtained electrophotographic photoreceptor is excellent in abrasion resistance.

In addition, the polymer according to the present invention was found to be excellent in the electrical properties required for the electrophotographic photoreceptor when used for the electrophotographic photoreceptor, and thereby the present invention has been completed.

Namely, the gist of the present invention lies in the following [1] to [10].

[1] An electrophotographic photoreceptor comprising a polymer containing a repeating unit represented by the following Formula (A1):

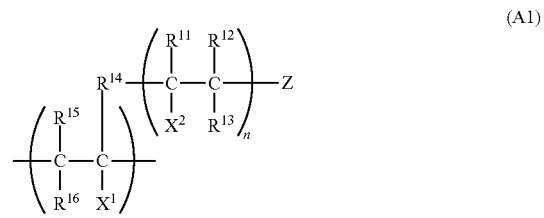

wherein in the formula (A1), $X^1$ and $X^2$ each independently represent a hydrocarbon group which may have a substituent, or a group represented by the following Formula (A2); $R^{11}$ to $R^{13}$, and $R^{15}$ to $R^{16}$ represent a hydrogen atom, or a hydrocarbon group which may have a substituent; $R^{14}$ represents a hydrocarbon group which may have a substituent; Z represents a terminal group; and n represents an integer of 1 or more, and

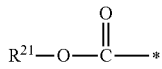

(A2)

wherein in the Formula (A2), $R^{21}$ represents a hydrogen atom, a hydrocarbon group which may have a substituent, or a heterocyclic group which may have a substituent.

[2] The electrophotographic photoreceptor according to item [1], wherein the polymer further contains a repeating unit represented by the following Formula (A3):

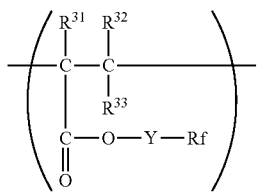

(A3)

wherein in the Formula (A3), Y represents a single bond or a divalent group; Rf represents a group having a C—F bond; and $R^{31}$ to $R^{33}$ represent a hydrogen atom or a hydrocarbon group.

[3] The electrophotographic photoreceptor according to item [1] or [2], wherein at least one of $X^1$ and $X^2$ in the Formula (A1) is a group represented by the Formula (A2).

[4] The electrophotographic photoreceptor according to any one of items [1] to [3], wherein the weight average molecular weight (Mw) of the polymer is 10,000 to 200,000.

[5] The electrophotographic photoreceptor according to any one of items [1] to [4], wherein the weight average molecular weight of the repeating unit represented by the Formula (A1) is 2,000 to 20,000.

[6] The electrophotographic photoreceptor according to any one of items [1] to [5], wherein Rf in the Formula (A3) is a linear perfluoroalkyl group having 4 to 6 carbon atoms.

[7] The electrophotographic photoreceptor according to any one of items [1] to [6], wherein the content of the repeating unit represented by the Formula (A1) is 1% by mass to 80% by mass based on the entire polymer.

[8] The electrophotographic photoreceptor according to any one of items [1] to [7] comprising fluororesin particles.

[9] An electrophotographic photoreceptor cartridge comprising: the electrophotographic photoreceptor according to any one of items [1] to [8], and at least one device selected from the group consisting of a charging device which charges the electrophotographic photoreceptor, an exposure device which exposes the charged electrophotographic photoreceptor to form an electrostatic latent image, and a developing device which develops the electrostatic latent image formed on the electrophotographic photoreceptor.

[10] An image forming apparatus comprising: the electrophotographic photoreceptor according to any one of claims 1 to 8, a charging device which charges the electrophotographic photoreceptor, an exposure device which exposes the charged electrophotographic photoreceptor to form an electrostatic latent image, and a developing device which develops the electrostatic latent image formed on the electrophotographic photoreceptor.

In addition, the gist of the present invention also lies in the following <1> to <10>.

<1> A copolymer containing a moiety derived from the structure represented by the following Formula (1) and a repeating unit represented by the following Formula (3),

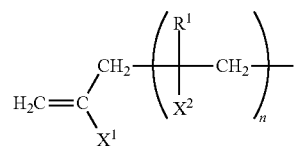

(1)

in the Formula (1), $X^1$ and $X^2$ each independently represent a hydrocarbon group which may have a substituent or a group represented by the following Formula (2); $R^1$ represents a hydrogen atom, or a hydrocarbon group which may have a substituent; and n is an integer of 2 or more,

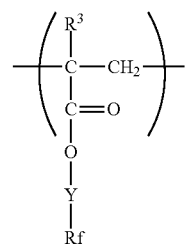

(2)

in the Formula (2), $R^2$ represents a hydrogen atom, a hydrocarbon group which may have a substituent, or a heterocyclic group which may have a substituent,

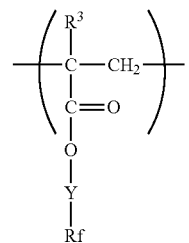

(3)

in the Formula (3), Y represents a single bond or a divalent group; Rf represents a group having a C—F bond; and $R^3$ represents a hydrogen atom or a hydrocarbon group.

<2> The copolymer according to item <1>, wherein in the Formula (1), $X^1$ or $X^2$ represents a group represented by the Formula (2).

<3> The copolymer according to item <1> or <2>, wherein the weight average molecular weight (Mw) is 10,000 to 200,000.

<4> The copolymer according to any one of items <1> to <3>, wherein the weight average molecular weight of the moiety derived from the structure represented by the Formula (1) is 2,000 to 20,000.

<5> The copolymer according to any one of items <1> to <4>, wherein in the Formula (3), Rf is a linear perfluoroalkyl group having 4 to 6 carbon atoms.

<6> The copolymer according to any one of items <1> to <5>, wherein the content of the moiety derived from the structure represented by the Formula (1) is 1% by mass to 80% by mass based on the entire copolymer.

<7> An electrophotographic photoreceptor comprising a photosensitive layer on a conductive support, wherein the photosensitive layer contains the copolymer according to any one of items <1> to <6>.

<8> The electrophotographic photoreceptor according to item <7>, comprising fluororesin particles.

<9> An electrophotographic photoreceptor cartridge including the electrophotographic photoreceptor according to item <7> or <8>, and "at least one device selected from the group consisting of a charging device which charges the electrophotographic photoreceptor, an exposure device which exposes the charged electrophotographic photoreceptor to form an electrostatic latent image, and a developing device which develops the electrostatic latent image formed on the electrophotographic photoreceptor".

<10> An image forming apparatus including the electrophotographic photoreceptor according to item <7> or <8>, "a charging device which charges the electrophotographic photoreceptor, an exposure device which exposes the charged electrophotographic photoreceptor to form an electrostatic latent image, and a developing device which develops the electrostatic latent image formed on the electrophotographic photoreceptor".

Advantageous Effects of Invention

The copolymer according to the present invention is excellent in solubility in organic solvents, excellent in dispersibility of fluororesin particles, and good in electrical properties, so that an electrophotographic photoreceptor using the copolymer is excellent in abrasion resistance and electrical properties.

That is, according to the present invention, a dispersion liquid excellent in dispersibility of fluororesin particles can be obtained by using a copolymer having a specific structure. In addition, an electrophotographic photoreceptor excellent in abrasion resistance and electrical properties can be provided by forming a photosensitive layer using the dispersion liquid.

DESCRIPTION OF EMBODIMENTS

Figure 1:
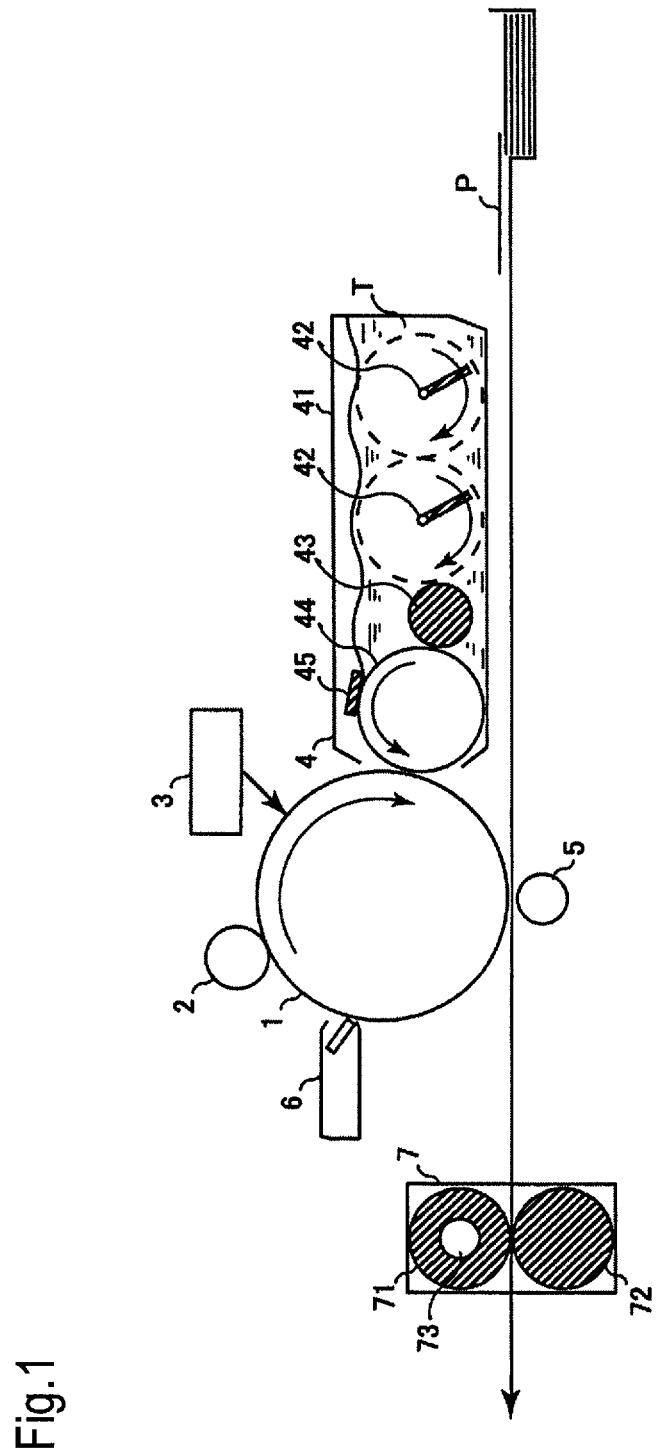
FIG. 1 is a conceptual view illustrating an example of an image forming apparatus using an electrophotographic photoreceptor of the present invention.

Hereinafter, the present invention will be described, but the present invention is not limited to the following specific embodiments, and can be freely modified within the scope of the technical idea.

1. Electrophotographic Photoreceptor 1-1. Polymer

The electrophotographic photoreceptor according to the present invention contains a polymer containing a repeating unit represented by the following Formula (A1). The polymer according to the present invention may contain a moiety, a structure, and a repeating unit other than a moiety derived from the structure represented by the Formula (A1).

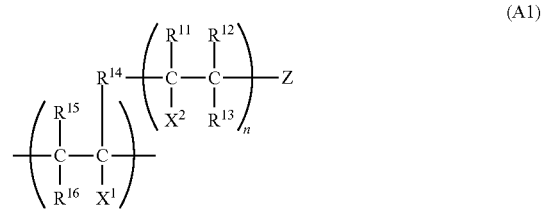

(In the formula (A1), $X^1$ and $X^2$ each independently represent a hydrocarbon group which may have a substituent, or a group represented by the following Formula (A2). $R^{11}$ to $R^{13}$, and $R^{15}$ and $R^{16}$ represent a hydrogen atom, or a hydrocarbon group which may have a substituent. $R^{14}$ represents a hydrocarbon group which may have a substituent. Z represents a terminal group. n represents an integer of 1 or more.)

(In the Formula (A2), $R^{2'}$ represents a hydrogen atom, a hydrocarbon group which may have a substituent, or a heterocyclic group which may have a substituent.)

The polymer contained by the electrophotographic photoreceptor according to the present invention may further contain a repeating unit represented by the following Formula (A3) (that is, the polymer may be a copolymer).

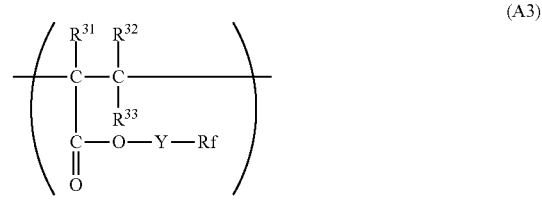

(In the Formula (A3), Y represents a single bond or a divalent group. Rf represents a group having a C—F bond, and $R^{31}$ to $R^{33}$ represent a hydrogen atom or a hydrocarbon group.)

1-1-1. Hydrocarbon Group in $X^1$, $X^2$, $R^{11}$, $R^{12}$, $R^{13}$, $R^{15}$, $R^{16}$, and $R^{21}$ The following descriptions of the hydrocarbon group are common to $X^1$, $X^2$, $R^{11}$, $R^{12}$, $R^{13}$, $R^{15}$, $R^{16}$, and $R^{21}$.

The term "hydrocarbon group" refers to a group composed of a carbon atom and a hydrogen atom, and corresponds to an aliphatic hydrocarbon group and an aromatic hydrocarbon group.

The term "aliphatic hydrocarbon group" refers to an acyclic or cyclic hydrocarbon group composed of a carbon atom and a hydrogen atom, and represents a group which does not have an aromatic structure. Examples of aliphatic hydrocarbon groups include linear, branched and cyclic hydrocarbon groups, in which the linear hydrocarbon group and the cyclic hydrocarbon group are preferred, and the linear hydrocarbon group is more preferred. The linear hydrocarbon group and the cyclic hydrocarbon group have a high affinity with a solvent, and thus dispersion stability of fluororesin particles is improved.

In addition, the term "aromatic hydrocarbon group" refers to a hydrocarbon group having an aromatic structure composed of carbon atoms and hydrogen atoms.

Examples of the aliphatic hydrocarbon group include an alkyl group, an alkenyl group, and an alkynyl group. The number of carbon atoms of the aliphatic hydrocarbon group is not particularly limited, and the number of carbon atoms of the alkyl group is generally 1 or more, and the number of carbon atoms of the alkenyl group and the alkynyl group is generally 2 or more. On the other hand, the number of carbon atoms of the alkyl group, the alkenyl group, and the alkynyl group is preferably 20 or less, more preferably 10 or less, and particularly preferably 6 or less. When the number of carbon atoms is within the above range, high solvent affinity can be obtained.

Examples of the aromatic hydrocarbon group include an aryl group and an aralkyl group. The number of carbon atoms of the aromatic hydrocarbon group is not particularly limited, and is preferably 6 or more, and is preferably 20 or less, and more preferably 12 or less. When the number of carbon atoms is within the above range, solubility and electrical properties are excellent.

Specific examples of the hydrocarbon group include: an alkyl group, for example, an alkyl group having 1 to 5 carbon atoms, such as a methyl group, an ethyl group, a n-propyl group, an i-propyl group, a n-butyl group, a sec-butyl group, an i-butyl group, a tert-butyl group, a n-pentyl group, an isopentyl group, a sec-pentyl group, a neopentyl group, a 1-methylbutyl group, a 2-methylbutyl group, a 1,1-dimethylpropyl group, and a 1,2-dimethylpropyl group;

an alkenyl group, for example, an alkenyl group having 2 to 5 carbon atoms, such as a vinyl group, a 1-propenyl group, a 2-propenyl group, an isopropenyl group, a 1-butenyl group, a 2-butenyl group, a 3-butenyl group, a 1-pentenyl group, a 2-pentenyl group, a 3-pentenyl group, and a 4-pentenyl group; and an alkynyl group, for example, an alkynyl group having 2 to 5 carbon atoms, such as an ethynyl group, a 1-propynyl group, a 2-propynyl group, a 1-butynyl group, a 2-butynyl group, a 3-butynyl group, a 1-pentynyl group, a 2-pentynyl group, a 3-pentynyl group, and a 4-pentynyl group.

Specific examples of the hydrocarbon group include: an aryl group such as a phenyl group, a tolyl group, an xylyl group, an ethyl phenyl group, a n-propylphenyl group, an i-propylphenyl group, a n-butylphenyl group, a sec-butylphenyl group, an i-butylphenyl group, a tert-butylphenyl group, a naphthyl group, an anthracene group, a biphenyl group, and a pyrene group; and an aralkyl group, for example, an aralkyl group having 7 to 12 carbon atoms, such as a benzyl group, an α-methyl benzyl group, a 1-methyl-1-phenylethyl group, a phenethyl group, a 2-phenylpropyl group, a 2-methyl-2-phenylpropyl group, a 3-phenylpropyl group, a 3-phenylbutyl group, a 3-methyl-3-phenylbutyl group, a 4-phenylbutyl group, a 5-phenylpentyl group, and a 6-phenylhexyl group.

From the viewpoint of the dispersibility of fluororesin particles, particularly preferred are an alkyl group such as a methyl group, an ethyl group, a n-propyl group, and a n-butyl group; an alkenyl group such as a vinyl group and a 1-propenyl group; and an alkynyl group such as an ethynyl group and a 1-propynyl group.

From the viewpoint of the dispersibility of fluororesin particles, particularly preferred are an aryl group such as a phenyl group, a tolyl group, an xylyl group, a naphthyl group, a biphenyl group, a tert-butylphenyl group, and a naphthyl group; and an aralkyl group such as a benzyl group, a phenethyl group, a 3-phenylpropyl group, and a 4-phenylbutyl group.

Among these, the hydrocarbon group is still more preferably a methyl group, an ethyl group, a n-propyl group, a n-butyl group, a phenyl group, a tolyl group, a naphthyl group, and a benzyl group, and most preferably a methyl group, an ethyl group, a phenyl group, and a benzyl group, from the viewpoint of electrical properties and the dispersibility of fluororesin particles.

In addition, $R^{12}$, $R^{13}$, $R^{15}$ and $R^{16}$ are most preferably a hydrogen atom.

When the above groups are satisfied, the solubility and reactivity of a polymer can be compatible.

1-1-2. Substituent in $X^1$, $X^2$, $R^{11}$, $R^{12}$, $R^{13}$, $R^5$, $R^{16}$, and $R^{21}$ $X^1$, $X^2$, $R^{11}$, $R^{12}$, $R^{13}$, $R^{15}$, $R^{16}$, and $R^{21}$ represent the above groups, and may have a substituent.

Examples of the substituent include a hydrocarbon group, an alkoxy group, a halogen group, or the like.

Here, the hydrocarbon group has the same meaning as the hydrocarbon group described in "1-1-1". Examples of the alkoxy group include a methoxy group, an ethoxy group, a phenoxy group, a one-terminal alkoxy polyethylene glycoloxy group, a one-terminal alkoxy polypropylene glycoxy group, or the like. Examples of the halogen group include a fluoro group, a chloro group and a bromo group.

Examples of the substituent further include a cyano group, an acyloxy group, a carboxyl group, an alkoxycarbonyl group, a carbamoyl group, an allyl group, a hydroxyl group, an amino group, a siloxane group, a hydrophilic or ionic group, or the like.

Examples of the acyloxy group include an acetate group, a propionate group, a succinate group, a malonate group, a phthalate group, a 2-hydroxyethyl-phthalate group, a benzoate group, a naphthoate group, or the like. Examples of the alkoxycarbonyl group include a methoxy carbonyl group, an ethoxycarbonyl group, a propoxycarbonyl group, a butoxycarbonyl group, a benzyl alkoxy carbonyl group, or the like. Examples of the amino group include a monoalkylamino group and a dialkylamino group.

From the viewpoint of the electrical properties, preferred are an alkoxy group such as a methoxy group, an ethoxy group, and a phenoxy group; an acyloxy group such as an acetate group, a propionate group and a phthalate group; and an alkoxycarbonyl group such as a methoxycarbonyl group, an ethoxycarbonyl group, and a benzylalkoxycarbonyl group.

1-1-3. Hydrocarbon Group in $R^{14}$

The hydrocarbon group in $R^{14}$ corresponds to a divalent group obtained by being derived by removing one hydrogen atom from a hydrocarbon group in "1-1-1. Hydrocarbon Group in $X^1$, $X^2$, $R^{11}$, $R^{12}$, $R^{13}$, $R^{15}$, $R^{16}$, and $R^{21}$".

The hydrocarbon group in $R^{14}$ may have a substituent, for example, substituents similar to "1-1-2. Substituent in $X^1$, $X^2$, $R^{11}$, $R^{12}$, $R^{13}$, $R^{15}$, $R^{16}$, and $R^{21}$" can be mentioned.

Preferred specific examples of the hydrocarbon group (which may have a substituent) in $R^{14}$ include an alkylene group, a divalent aromatic group, a divalent group containing an ether group, a divalent group containing an ester group, or the like.

Examples of the alkylene group include a linear hydrocarbon group, a branched hydrocarbon group, and an alicyclic hydrocarbon group. Examples of the linear hydrocarbon group include a methylene group, an ethylene group, a trimethylene group, a tetramethylene group, a pentamethylene group, or the like. Examples of the branched hydrocarbon group include a methyl ethylene group, a methyltrimethylene group, a dimethyltrimethylene group, or the like. Examples of the alicyclic hydrocarbon group include alkylene groups such as a cyclohexylene group and a 1,4-dimethylenecyclohexane group.

From the viewpoint of stability and reactivity of the (meth)acrylate which is the source of the structure, a linear alkylene group is preferred. From the simplicity of production, an alkylene group having 1 to 3 carbon atoms is more preferred, and a methylene group is particularly preferred.

Examples of the divalent aromatic group include a phenylene group, a naphthylene group, a biphenylene group, a terphenylene group, or the like.

Examples of the divalent group containing an ether group include —[(CH$_2$)$_l$O]$_m$— (in which 1 represents an integer of 1 to 10, m represents an integer of 1 to 100), or the like. Examples of the divalent group containing an ester group include —R'COOR"— (in which R' and R" each independently represent a divalent hydrocarbon group), or the like.

1-1-4. In Respect of Heterocyclic Group in $R^{21}$

Examples of the "heterocycle" of the above-mentioned "a heterocyclic group which may have a substituent" represented by $R^{21}$ include a heterocycle having 2 to 18 carbon atoms.

Examples of the heterocyclic group include an aromatic heterocyclic group, a cyclic ether group, a cyclic amino group, a cyclic thioether group, or the like. Specific examples of the heterocyclic group include a furanyl group, a pyrrolyl group, a pyridinyl group, a thiophenyl group, an oxiranyl group, an oxetanyl group, a tetrahydrofuranyl group, a tetrahydropyranyl group, a dioxolanyl group, a dioxanyl group, a tetrahydrothiophenyl group, or the like. From the viewpoint of electrical properties, a furanyl group, a thiophenyl group, and a tetrahydrofuranyl group are preferred.

As a "substituent" in the heterocyclic group, substituents have the same meaning as the substituent described in "1-1-2." can be mentioned. Examples of the substituent include a hydrocarbon group, an alkoxy group, a halogen group, or the like.

1-1-5. In Respect of Formula (A1)

The above $X^1$ and $X^2$ each independently represent a hydrocarbon group which may have a substituent, or a group represented by the above Formula (A2). From the viewpoint of reactivity and dispersibility, at least one of $X^1$ and $X^2$ in the above Formula (A1) is preferably a group represented by the above Formula (A2).

That is, $X^1$ and $X^2$ may independently be any one of the two groups mentioned above. Only $X^2$ in each of the n repeating units in the Formula (A1) may be independently the above groups respectively, or may be different from each other.

A ratio of $X^2$ represented by the Formula (A2) (repeating unit) to the entire (n) repeating units (the entire repeating unit derived from the structure represented by Formula (A1)) is preferably 60 mol % or more, and particularly preferably 80 mol % or more.

From the viewpoint of reactivity and dispersibility, $X^1$ or $X^2$ is more preferably the group represented by the above Formula (A2) ($X^2$ in the all n repeating units are the group represented by the above Formula (A2)).

Further, from the viewpoint of reactivity and dispersibility, both $X^1$ and $X^2$ are preferably the group represented by the above Formula (A2).

From the viewpoint of synthesis, no less than half of $R^{11}$ in the repeating units of the Formula (A1) are preferably hydrocarbon groups.

Z in the Formula (A1) represents a terminal group. Examples of the terminal group, which is similar to the terminal group of the polymer obtained by known radical polymerization, include a hydrogen atom or a group derived from a radical polymerization initiator.

"n" in the Formula (A1) is an integer of 1 or more, preferably 2 or more, more preferably 3 or more, still more preferably 5 or more, and particularly preferably 10 or more. On the other hand, an upper limit is not particularly limited, and is generally 1000, preferably 800, more preferably 500, and particularly preferably 200. When "n" is within the above range, good dispersibility is obtained.

A weight average molecular weight (Mw) of the repeating units represented by the above Formula (A1) is not particularly limited, and is preferably 2,000 or more, and particularly preferably 3,000 or more. On the other hand, Mw is preferably 20,000 or less, and particularly preferably 15,000 or less.

"The weight average molecular weight (Mw) of the repeating units represented by the above Formula (A1)" refers to a "weight average molecular weight (Mw) of macromonomers which are sources of the repeating units represented by the above Formula (A1)".

When the molecular weight is within the above range, good solvent affinity can be obtained, and a smooth coating film having good compatibility with other binder resins can be obtained.

The weight average molecular weight (Mw) in the present invention refers to a weight average molecular weight obtained by gel permeation chromatography (GPC) using polystyrene as a standard substance.

1-1-6. In Respect of Y in Formula (A3)

Y represents a single bond or a divalent group.

The "divalent group" is not particularly limited as long as it is a divalent group, and examples thereof include a divalent hydrocarbon group, a divalent group containing an ether group, a divalent group containing ester group, a divalent group containing a hydrocarbon group and an ether group, a divalent group containing a hydrocarbon group and an ester group, a "divalent group containing a hydrocarbon group, an ether group and an ester group", or the like.

The divalent hydrocarbon group corresponds to a divalent group obtained by being derived by removing one hydrogen atom from a hydrocarbon group in "1-1-1. Hydrocarbon Group in $X^1$, $X^2$, $R^{11}$, $R^{12}$, $R^{13}$, $R^{15}$, $R^{16}$, and $R^{21}$".

Preferred specific examples of the divalent hydrocarbon group include an alkylene group, a divalent aromatic group, a divalent group containing an ether group, a divalent group containing an ester group, or the like.

Examples of the alkylene group include a linear hydrocarbon group, a branched hydrocarbon group, and an alicyclic hydrocarbon group. Examples of the linear hydrocarbon group include a methylene group, an ethylene group, a trimethylene group, a tetramethylene group, a pentamethylene group, or the like. Examples of the branched hydrocarbon group include a methyl ethylene group, a methyltrimethylene group, a dimethyltrimethylene group, or the like. Examples of the alicyclic hydrocarbon group include alkylene groups such as a cyclohexylene group and a 1,4-dimethylenecyclohexane group.

From the viewpoint of stability and reactivity of the (meth)acrylate which is the source of the structure, a linear alkylene group is preferred. From the simplicity of production, an alkylene group having 1 to 3 carbon atoms is particularly preferred.

Examples of the divalent aromatic group include a phenylene group, a naphthylene group, a biphenylene group, a terphenylene group, or the like.

Examples of the divalent group containing an ether group include —[(CH$_2$)$_l$O]$_m$— (in which 1 represents an integer of 1 to 10, m represents an integer of 1 to 100), or the like.

Examples of the divalent group containing an ester group include —R'COOR"— (in which R' and R" each independently represent a divalent hydrocarbon group), or the like. Examples of the substituent include substituents which are the same as that in "1-1-2. Substituent in $X^1$, $X^2$, $R^{11}$, $R^{12}$, $R^{13}$, $R^{15}$, $R^{16}$, and $R^{21}$".

1-1-7. In Respect of Rf in Formula (A3)

Rf represents a group having a C—F bond, which is not particularly limited, and can use any group. Examples of the group having a C—F bond include groups obtained by replacing some or all of C—H bonds of hydrocarbon groups in "1-1-1. Hydrocarbon Group in $X^1$, $X^2$, $R^{11}$, $R^{12}$, $R^{13}$, $R^{15}$, $R^{16}$, and $R^{21}$".

Specific examples of the group having a C—F bond include a fluoroalkyl group, a fluoroalkenyl group, a fluoroalkynyl group, a fluorophenyl group, a fluoroaryl group, a fluoroaralkyl group, or the like.

The number of carbon atoms of the group having a C—F bond is not particularly limited, and is generally 1 or more, preferably 2 or more, and more preferably 4 or more, and on the other hand, is generally 6 or less, in the case of a fluoroalkyl group. In the case of a fluoroalkenyl group, the number of carbon atoms of the group having a C—F bond is generally 2 or more, and preferably 3 or more, and on the other hand, is preferably 6 or less. In the case of a fluoroalkynyl group, the number of carbon atoms of the group having a C—F bond is generally 2 or more, and preferably 3 or more, and on the other hand, is generally 7 or less, and preferably 6 or less.

When the number of carbon atoms is within the above range, good dispersibility and good electrical properties of the fluororesin particles can be obtained particularly.

Specific examples of the fluoroalkyl group include a fluoromethyl group, a difluoromethyl group, a trifluoromethyl group, a fluoroethyl group, a difluoroethyl group, a trifluoroethyl group, a tetrafluoroethyl group, a pentafluoroethyl group, or the like.

Specific examples thereof further include perfluoro (cyclo)alkyl groups such as a perfluoroethyl group, a perfluoropropyl group, a perfluoro n-butyl group, a perfluoro n-pentyl group, a perfluoro n-hexyl group, a perfluoro iso-propyl group, a perfluoro iso-butyl group, a perfluoro tert-butyl group, a perfluoro sec-butyl group, a perfluoro iso-pentyl group, a perfluoro iso-hexyl group, a perfluorocyclopentyl group, and a perfluorocyclohexyl group.

In addition, specific examples thereof include a 2H-tetrafluoroethyl group, a 3H-hexafluoropropyl group, a 1H-1-(trifluoromethyl) trifluoroethyl group, a 2H-hexafluoropropyl group, a 4H-octafluorobutyl group, a 6H-dodecafluorohexyl group, or the like.

Rf preferably represents a linear perfluoroalkyl group having 4 to 6 carbon atoms from the viewpoint of obtaining good dispersibility and good electrical properties of the fluororesin particles.

In a case where Rf represents a linear perfluoroalkyl group having 4 to 6 carbon atoms, Y represents a divalent group that does not contain a fluorine atom.

From the viewpoint of electrical properties, preferred are a perfluoroethyl group, a perfluoropropyl group, a perfluoro n-butyl group, a perfluoro n-pentyl group, and a perfluoro n-hexyl group. From the viewpoint of the dispersibility of fluororesin particles, particularly preferred are a perfluoro n-butyl group, a perfluoro n-pentyl group, and a perfluoro n-hexyl group.

Rf may have a hetero atom. Specific examples of the hetero atom include nitrogen, oxygen, sulfur, phosphorus, or the like. The hetero atom is preferably oxygen or sulfur, and more preferably oxygen.

Specific examples of the group having a hetero atom are shown below.

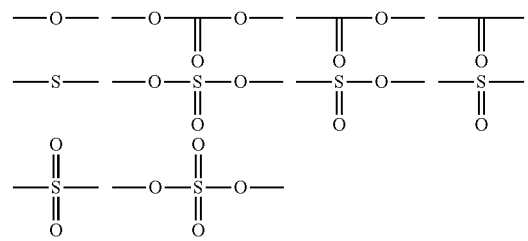

Preferred examples among the specific examples of the group having a hetero atom are shown below.

In a case where Rf has a hetero atom, Rf further preferably has a divalent hydrocarbon group. Examples of the divalent hydrocarbon group preferably include an alkylene group, a fluoro alkylene group, an alkenylene group, a fluoroalkenylene group, an alkynylene group, a fluoroalkynylene group, an arylene group, a fluoroarylene group, an aralkylene group, a fluoroaralkylene group, or the like. Among these, an alkylene group or a fluoro alkylene group is more preferred, and a fluoro alkylene group is particularly preferred.

The number of carbon atoms of the divalent hydrocarbon group is not particularly limited, and is generally 1 or more, and preferably 2 or more. On the other hand, the number of carbon atoms of the divalent hydrocarbon group is generally 20 or less, preferably 15 or less, more preferably 10 or less, still more preferably 8 or less, particularly preferably 6 or less, and most preferably 4 or less.

When the number of carbon atoms is within the above range, good dispersibility and good electrical properties can be obtained.

Specific examples of the fluoro alkylene group include a perfluoromethylene group, a perfluoroethylene group, a perfluoro 2-methyl ethylene group, a perfluoro 2-ethyl ethylene group, a perfluoro 2-propyl ethylene group, a perfluoro 2-butyl ethylene group, a perfluorotrimethylene group, a perfluorotetramethylene group, a perfluoropentamethylene group, a perfluorohexamethylene group, or the like.

From the viewpoint of solubility, a perfluoromethylene group, a perfluoroethylene group, and a perfluoro 2-methyl ethylene group are preferred.

Rf preferably represents a structure represented by the following Formula (4).

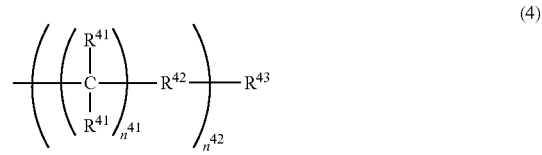

$R^{41}$ represents any one of a hydrogen atom, a fluorine atom, and a group having a C—F bond independently, $R^{42}$ represents a group having a hetero atom, and $R^{43}$ represents a group having a C—F bond.

$n^{41}$ represents an integer of 1 to 20, and $n^{42}$ represents an integer of 0 to 100.

With the above structure, the reactivity of the radical reaction can be enhanced, and the copolymer can be obtained with good yield.

1-1-8. In Respect of $R^{31}$, $R^{32}$, $R^{33}$ in Formula (A3)

Examples of $R^{31}$ in the Formula (A3) include those which are the same as $R^{11}$ in the Formula (A1). From the viewpoint of reactivity, a hydrogen atom or a methyl group is preferred, and a hydrogen atom is particularly preferred.

Examples of $R^{32}$ and $R^{33}$ in the Formula (A3) include those which are respectively the same as $R^{12}$ and $R^{13}$ in the Formula (A1).

1-1-9. In Respect of Formula (A3)

When the fluorine-containing (meth)acrylate which is the source of the repeating unit represented by the Formula (A3) is specifically described, examples thereof include perfluoroethyl (meth)acrylate, perfluoropropyl (meth)acrylate, perfluorobutyl (meth) acrylate, perfluoropentyl (meth)acrylate, perfluorohexyl (meth)acrylate, perfluoro iso-propyl (meth) acrylate, perfluoroiso-butyl (meth)acrylate, perfluoro tert-butyl (meth)acrylate, perfluoro sec-butyl (meth)acrylate, perfluoro iso-pentyl (meth)acrylate, perfluoro iso-hexyl (meth)acrylate, perfluorocyclopentyl (meth)acrylate, perfluorocyclohexyl (meth)acrylate, (perfluoroethyl) methyl (meth)acrylate, (perfluoropropyl) methyl (meth)acrylate, (perfluorobutyl) methyl (meth)acrylate, (perfluoropentyl) methyl (meth)acrylate, (perfluorohexyl) methyl (meth)acrylate, (perfluoroiso-propyl) methyl (meth)acrylate, (perfluoroiso-butyl) methyl (meth)acrylate, (perfluoro tert-butyl) methyl (meth)acrylate, (perfluorosec-butyl) methyl (meth) acrylate, (perfluoro iso-pentyl) methyl (meth)acrylate, (perfluoroiso-hexyl) methyl (meth)acrylate, (perfluorocyclopentyl) methyl (meth)acrylate, (perfluorocyclohexyl) methyl (meth)acrylate, 2-(perfluoroethyl) ethyl (meth)acrylate, 2-(perfluoropropyl) ethyl (meth)acrylate, 2-(perfluorobutyl) ethyl (meth)acrylate, 2-(perfluoropentyl) ethyl (meth)acrylate, 2-(perfluorohexyl) ethyl (meth)acrylate, 2-(perfluoro iso-propyl) ethyl (meth)acrylate, 2-(perfluoro iso-butyl) ethyl (meth)acrylate, 2-(perfluoro tert-butyl) ethyl (meth) acrylate, 2-(perfluoro sec-butyl) ethyl (meth)acrylate, 2-(perfluoro iso-pentyl) ethyl (meth)acrylate, 2-(perfluoro iso-hexyl) ethyl (meth)acrylate, 2-(perfluorocyclopentyl) ethyl (meth)acrylate, 2-(perfluorocyclohexyl) ethyl (meth) acrylate, 3-(perfluoroethyl) propyl (meth)acrylate, 3-(perfluoropropyl) propyl (meth)acrylate, 3-(perfluorobutyl) propyl (meth)acrylate, 3-(perfluoropentyl) propyl (meth) acrylate, 3-(perfluorohexyl) propyl (meth)acrylate, 3-(perfluoroisopropyl) propyl (meth)acrylate, 3-(perfluoro iso-butyl) propyl (meth)acrylate, 3-(perfluoro tert-butyl) propyl (meth)acrylate, 3-(perfluoro sec-butyl) propyl (meth) acrylate, 3-(perfluoro iso-pentyl) propyl (meth)acrylate, 3-(perfluoro iso-hexyl) propyl (meth)acrylate, 3-(perfluorocyclopentyl) propyl (meth)acrylate, 3-(perfluorocyclohexyl) propyl (meth)acrylate, 4-(perfluoroethyl) butyl (meth)acrylate, 4-(perfluoropropyl) butyl (meth)acrylate, 4-(perfluorobutyl) butyl (meth)acrylate, 4-(perfluoropentyl) butyl (meth)acrylate, 4-(perfluorohexyl) butyl (meth)acrylate, 4-(perfluoro iso-propyl) butyl (meth)acrylate, 4-(perfluoro iso-butyl) butyl (meth)acrylate, 4-(perfluoro tert-butyl) buty (meth)acrylate, 4-(perfluoro sec-butyl) butyl (meth)acrylate, 4-(perfluoro iso-pentyl) butyl (meth)acrylate, 4-(perfluoro iso-hexyl) butyl (meth)acrylate, 4-(perfluorocyclopentyl) butyl (meth)acrylate, 4-(perfluorocyclohexyl) butyl (meth) acrylate, or the like.

Specific examples of the fluorine-containing (meth)acrylate serving as the source of the repeating unit represented by the formula (A3) include (meth)acrylate having the following structural formula.

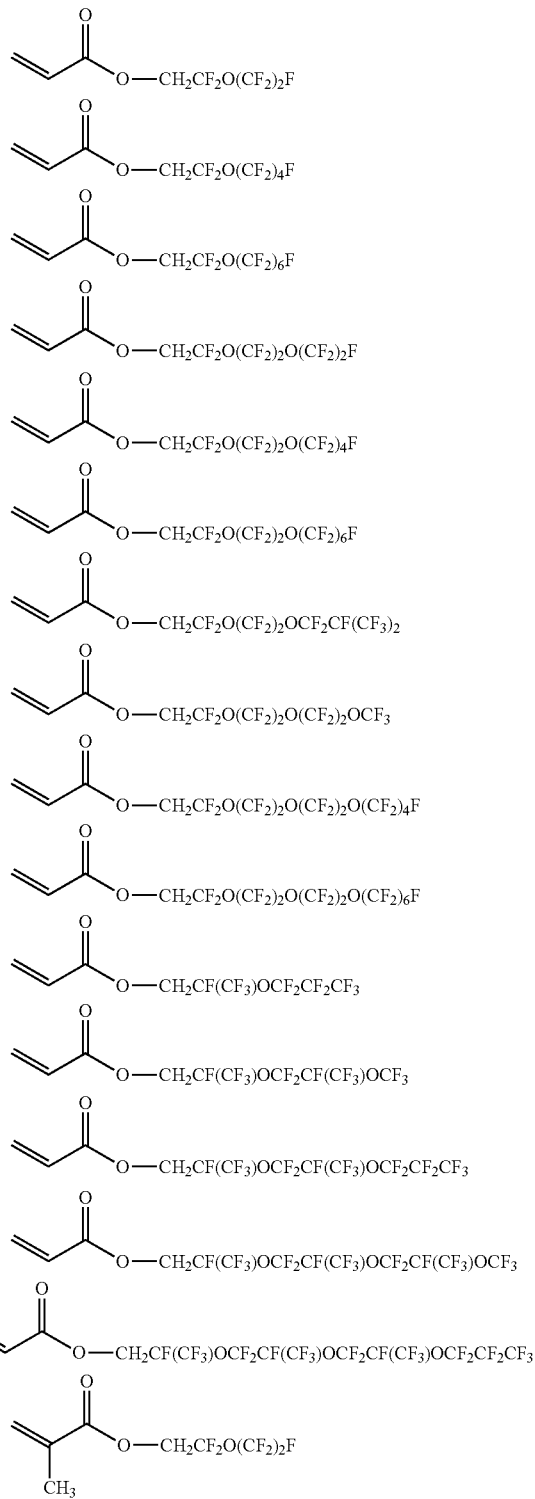

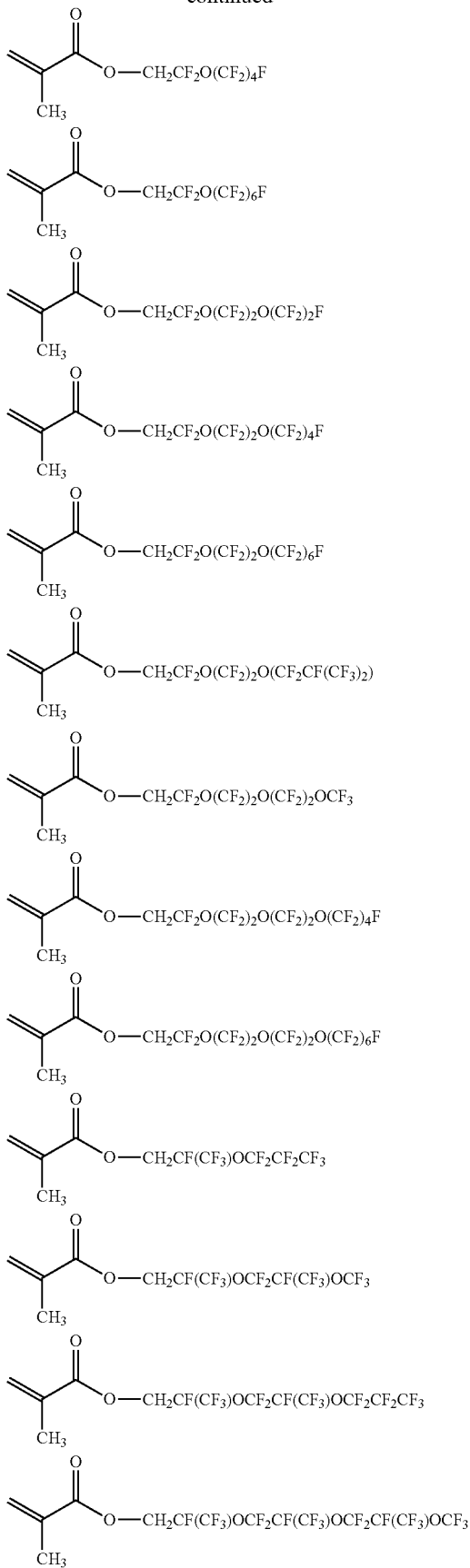

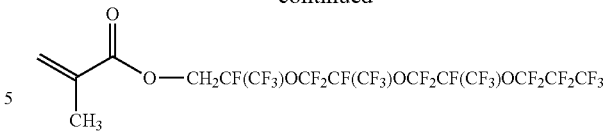

Among these, preferred are (perfluoroethyl) methyl (meth)acrylate, (perfluoropropyl) methyl (meth)acrylate, (perfluorobutyl) methyl (meth)acrylate, (perfluoropentyl) methyl (meth)acrylate, (perfluorohexyl) methyl (meth)acrylate, 2-(perfluoroethyl) ethyl (meth)acrylate, 2-(perfluoropropyl) ethyl (meth)acrylate, 2-(perfluorobutyl) ethyl (meth) acrylate, 2-(perfluoropentyl) ethyl (meth)acrylate, 2-(perfluorohexyl) ethyl (meth)acrylate, 3-(perfluoroethyl) propyl (meth)acrylate, 3-(perfluoropropyl) propyl (meth) acrylate, 3-(perfluorobutyl) propyl (meth)acrylate, 3-(perfluoropentyl) propyl (meth)acrylate, 3-(perfluorohexyl) propyl (meth)acrylate, or the like, from the viewpoint of (meth) acrylate stability and simplicity of production.

From the viewpoint of dispersibility of the fluorine resin, more preferred are (perfluorobutyl) methyl (meth)acrylate, (perfluoropentyl) methyl (meth)acrylate, (perfluorohexyl) methyl (meth)acrylate, 2-(perfluorobutyl) ethyl (meth)acrylate, 2-(perfluoropentyl) ethyl (meth)acrylate, 2-(perfluorohexyl) ethyl (meth)acrylate, 3-(perfluorobutyl) propyl (meth)acrylate, 3-(perfluoropentyl) propyl (meth)acrylate, 3-(perfluorohexyl) propyl (meth)acrylate, or the like. From the viewpoint of reactivity with a macromonomer, particularly preferred are (perfluorobutyl) methyl acrylate, (perfluoropentyl) methyl acrylate, (perfluorohexyl) methyl acrylate, 2-(perfluorobutyl) ethyl acrylate, 2-(perfluoropentyl) ethyl acrylate, 2-(perfluorohexyl) ethyl acrylate, 3-(perfluorobutyl) propyl acrylate, 3-(perfluoropentyl) propyl acrylate, 3-(perfluorohexyl) propyl acrylate, or the like.

A plurality of the fluorine-containing (meth)acrylate compounds described above may be used in combination if necessary.

1-1-10. Other Aspects of Polymer

The weight average molecular weight (Mw) of the polymer is preferably 10,000 or more, and more preferably 15,000 or more. On the other hand, Mw of the polymer is preferably 200,000 or less, and more preferably 100,000 or less. When the molecular weight is within the above range, good dispersion stability of the fluororesin particles can be obtained.

A ratio of the weight average molecular weight (Mw) of the polymer to the number average molecular weight (Mn) thereof (Mw/Mn) is preferably 1.1 or more, more preferably 1.5 or more, still more preferably 2.0 or more, and particularly preferably 2.5 or more. On the other hand, the above ratio is preferably 10.0 or less, more preferably 7.5 or less, particularly preferably 5.0 or less, and still more preferably 4.0 or less. When the ratio is within the above range, dispersibility of fluororesin particles is good.

The content of the moiety derived from the structure represented by the Formula (A1) contained in the polymer relative to the entire polymer is preferably 1% by mass or more, more preferably 10% by mass or more, and particularly preferably 30% by mass or more. On the other hand, the content of the moiety is preferably 80% by mass or less, more preferably 60% by mass or less, and particularly preferably 50% by mass or less. When the content is within the above range, good electrical properties can be obtained.

Meanwhile, the content of unreacted raw materials derived from the structure represented by the Formula (A1)

contained in the polymer is preferably 0.5% by mass or less, more preferably 0.1% by mass or less, and particularly preferably 0.01% by mass or less. When the content is within the above range, electrical properties are good.

The content of the repeating units represented by the Formula (A3) contained in the polymer is preferably 10% by mass or more, more preferably 20% by mass or more, and particularly preferably 30% by mass or more. On the other hand, the content of the repeating units is preferably 80% by mass or less, more preferably 70% by mass or less, and particularly preferably 60% by mass or less. When the content is within the above range, good dispersion stability of the fluororesin particles can be obtained.

Meanwhile, the content of unreacted fluorine-containing (meth) acrylate serving as the source of the repeating units represented by the Formula (A3) contained in the polymer is preferably 0.5% by mass or less, more preferably 0.1% by mass or less, and particularly preferably 0.01% by mass or less. When the content is within the above range, good electrical properties can be obtained.

The polymer may be copolymerized with other monomers. Examples of other monomers include a (meth)acrylic acid monomer, a (meth)acrylate monomer, a (meth)acrylamide monomer, an aromatic vinyl monomer, an alkyl vinyl ether monomer, a vinyl ester monomer, or the like. As other monomers, a (meth)acrylate monomer and a (meth)acrylamide monomer are preferred from the viewpoint of electrical properties, and a (meth)acrylate monomer is particularly preferred from the viewpoint of dispersion stability of fluororesin particles.

The content of other monomers in the polymer according to the present invention is preferably 20% by mass or less, more preferably 15% by mass or less from the viewpoint of electrical properties, and more preferably 10% by mass or less from the viewpoint of dispersibility of fluororesin particles.

Specific examples of the (meth)acrylate monomer include methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, isoamyl (meth)acrylate, hexyl (meth)acrylate, 2-ethylhexyl (meth)acrylate, octyl (meth)acrylate, lauryl (meth)acrylate, dodecyl (meth)acrylate, tetradecyl (meth)acrylate, hexadecyl (meth)acrylate, stearyl (meth)acrylate, cyclohexyl (meth)acrylate, isobornyl (meth)acrylate, adamantyl (meth) acrylate, 2-isopropyl-2-adamantyl (meth)acrylate, dicyclopentenyl (meth)acrylate, dicyclopentanyl (meth)acrylate, 2-cyanoethyl (meth)acrylate, 2-bromoethyl (meth)acrylate, 2-chloroethyl (meth)acrylate, 2,3-dibromopropyl (meth) acrylate, 3-chloro-2-hydroxypropyl (meth)acrylate, 2-hydroxyethyl (meth)acrylate, 4-hydroxybutyl (meth)acrylate, 2-hydroxypropyl (meth)acrylate, 2-hydroxy-1-methylethyl (meth)acrylate, 2-methoxyethyl (meth)acrylate, ethoxy-diethylene glycol (meth)acrylate, methoxy-triethylene glycol (meth)acrylate, 2-ethylhexyl-diglycol (meth)acrylate, methoxy-polyethylene glycol (meth)acrylate, nonylphenoxy-polyethylene glycol (meth)acrylate, methoxy dipropylene glycol (meth)acrylate, 2-phenoxyethyl (meth)acrylate, 2-dicyclopentenyloxyethyl (meth)acrylate, a phenoxydiethylene glycol (meth)acrylate, phenoxy-polyethylene glycol (meth)acrylate, glycidyl (meth)acrylate, tetrahydrofurfuryl (meth)acrylate, benzyl (meth)acrylate, naphthylmethyl (meth)acrylate, anthrylmethyl (meth)acrylate, 2-hydroxy-3-phenoxypropyl (meth)acrylate, 2-succinate ethyl (meth)acrylate, 2-hexahydro phthalate ethyl (meth) acrylate, 2-phthalated ethyl (meth)acrylate, 2,2-dimethyl-3-benzoate propyl (meth)acrylate, 2-(dimethylamino) ethyl (meth)acrylate, pentamethyl piperidinyl (meth)acrylate, tetramethyl piperidinyl (meth)acrylate, 3-(trimethoxysilyl) propyl (meth)acrylate, a phenyl (meth)acrylate, naphthyl (meth)acrylate, anthracene (meth)acrylate, furfuryl (meth) acrylate, PMMA, or a macromonomer of polystyrene or polyester having a (meth)acrylate group.

From the viewpoint of electrical properties, preferred are methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, isoamyl (meth)acrylate, hexyl (meth)acrylate, 2-ethylhexyl (meth)acrylate, cyclohexyl (meth)acrylate, isobornyl (meth) acrylate, adamantyl (meth)acrylate, dicyclopentanyl (meth) acrylate, 2-methoxyethyl (meth)acrylate, 2-phenoxyethyl (meth)acrylate, 2-dicyclopentenyloxyethyl (meth)acrylate, benzyl (meth)acrylate, naphthylmethyl (meth)acrylate, PMMA, or a macromonomer of polystyrene having a (meth) acrylate group. From the viewpoint of reactivity with macromonomer, particularly preferred are methyl acrylate, ethyl acrylate, n-propyl (meth)acrylate, cyclohexyl acrylate, isobornyl acrylate, dicyclopentanyl acrylate, 2-phenoxyethyl acrylate, 2-dicyclopentenyloxyethyl acrylate, and benzyl acrylate.

1-1-11. Method for Producing Polymer

In a method for producing the polymer of the present invention, the polymer may be produced by using a macromonomer serving as a source of the repeating unit represented by the Formula (A1) (and if necessary, fluorine-containing (meth)acrylate serving as a source of the repeating unit represented by the Formula (A3)), and the production method thereof is not particularly limited. The polymer is preferably produced by radical polymerization from the viewpoint of reactivity, and is more preferably produced using a thermal polymerization initiator from the viewpoint of electrical properties.

<Method for Producing Macromonomer Serving as Source of Repeating Unit Represented by Formula (A1)>

The macromonomer serving as a source of the repeating unit represented by the Formula (A1) (Hereinafter, it may be referred to as "macromonomer a1".) can be produced by known methods. Examples of the method for producing the macromonomer a1 in the present invention include a method for producing macromonomer a1 by using a cobalt chain transfer agent (U.S. Pat. No. 4,680,352), a method in which an α-substituted unsaturated compound such as α-bromomethylstyrene is used as a chain transfer agent (WO 88/004304), a method in which polymerizable groups are chemically bonded (Japanese Unexamined Patent Publication No. 60-133007, U.S. Pat. No. 5,147,952), a method according to thermal decomposition (JP-A-H11-240854), or the like. Among these, preferred are the method for producing macromonomer a1 by using a cobalt chain transfer agent and the method in which an α-substituted unsaturated compound such as α-bromomethylstyrene is used as a chain transfer agent.

Between the two methods consisting of the method for producing macromonomer a1 by using a cobalt chain transfer agent and the method in which an α-substituted unsaturated compound such as α-bromomethylstyrene is used as a chain transfer agent, the method for producing macromonomer a1 by using a cobalt chain transfer agent is preferred from the viewpoint of few production steps and using catalyst with high chain transfer constant. Examples of the method for producing macromonomer a1 by using a cobalt chain transfer agent include a bulk polymerization method, a solution polymerization method and an aqueous dispersion polymerization method. Examples of the aqueous dispersion polymerization method include a suspension polymerization method and an emulsion polymerization method.

Among these, the aqueous dispersion polymerization method is preferred from the viewpoint of simplification of a macromonomer al recovery step. In the aqueous dispersion polymerization method, only water or a "mixture of water and a water-soluble solvent (for example, ethanol)" may be used as a solvent. An average particle diameter of the macromonomer al obtained by the aqueous dispersion polymerization method is, for example, about 20 µm to 400 µm, and preferably about 50 µm to 200 µm.

Examples of a solvent used when the macromonomer al is obtained by the solution polymerization method include hydrocarbons such as toluene; ethers such as diethyl ether and tetrahydrofuran; halogenated hydrocarbons such as dichloromethane and chloroform; ketones such as acetone; alcohols such as methanol; nitriles such as acetonitrile; esters such as ethyl acetate; carbonates such as ethylene carbonate; supercritical carbon dioxide; or the like. One selected from these may be used alone, or two or more selected from these may be used in combination.

<Polymerization Method>

The production of the polymer according to the present invention is preferably a production according to radical polymerization using the macromonomer al (and if necessary, fluorine-containing (meth)acrylate serving as a source of the repeating unit represented by the Formula (A3)).

In the production according to radical polymerization, reactive substances such as the macromonomer al and fluorine-containing (meth)acrylate are dissolved in an organic solvent, then a thermal polymerization initiator is added thereto, and the mixture is heated to 40° C. to 200° C. and is polymerized, so as to obtain a target polymer. Feed methods for the polymerization reaction include a method in which all raw materials are fed together, a method in which at least one of raw materials such as an initiator and a monomer represented by fluorine-containing (meth)acrylate is continuously fed into a reactor, and a method in which all the raw materials are continuously fed and is continuously extracted from a reactor at the same time. Among these, the method in which fluorine-containing (meth)acrylate is continuously supplied to a reactor is preferred from the viewpoint of preventing homopolymerization of fluorine-containing (meth)acrylate.

The solvent used for the radical polymerization is not particularly limited, and specific examples thereof include alcohols such as methanol, ethanol, propanol, and 2-methoxyethanol; ethers such as tetrahydrofuran, 1,4-dioxane, dimethoxyethane, and anisole; esters such as methyl formate, ethyl acetate, and butyl acetate; ketones such as acetone, methyl ethyl ketone, methyl isobutyl ketone, and cyclohexanone; aromatic hydrocarbons such as benzene, toluene, and xylene; aprotic polar solvents such as N-methyl pyrrolidone, N,N-dimethylformamide, and dimethyl sulfoxide; or the like.

Among these solvents, toluene, xylene, anisole, dimethoxyethane, butyl acetate, methyl ethyl ketone, methyl isobutyl ketone, cyclohexanone, and N,N-dimethylformamide are preferred from the viewpoint of volatility during polymerization, and anisole, dimethoxyethane, butyl acetate, methyl ethyl ketone, and methyl isobutyl ketone are preferred from the viewpoint of the solubility of the polymer according to the present invention. Any one selected from these may be used alone, and two or more selected from these may be used in combination.

The using amount of the reaction solvent is preferably 20 parts by mass or more, more preferably 30 parts by mass or more, and particularly preferably 40 parts by mass or more, relative to the total 100 parts by mass of the reactive substances such as the macromonomer al and fluorine-containing (meth)acrylate serving as a source of the repeating unit represented by the Formula (A3). On the other hand, the using amount of the reaction solvent is preferably 500 parts by mass or less, more preferably 200 parts by mass or less, and particularly preferably 100 parts by mass or less. When the using amount is within the above range, a uniform polymer with high molecular weight can be obtained.

As the polymerization initiator used in the radical polymerization, known polymerization initiators such as azo compounds, organic peroxides, inorganic peroxides, and redox-type polymerization initiators can be used.

Examples of the azo compounds include 2,2'-azobis (isobutyronitrile), 1,1-azobis (cyclohexane-1-carbonitrile), azocumene, 2,2'-azobis (2-methylbutyronitrile), 2,2'-azobis-dimethyl valeronitrile, 4,4'-azobis (4-cyanovaleric acid), 2-(tert-butylazo)-2-cyanopropane, 2,2'-azobis (2,4,4-trimethylpentane), 2,2'-azobis (2-methylpropane), dimethyl 2,2'-azobis (2-methyl propionate), or the like.

Examples of the organic peroxides include cyclohexanone peroxide, 3,3,5-trimethylcyclohexanone peroxide, methylcyclohexanone peroxide, 1,1-bis(tert-butylperoxy)-3,3,5-trimethylcyclohexane, 1,1-bis(tert-butylperoxy) cyclohexane, n-butyl-4,4-bis(tert-butylperoxy) valerate, cumene hydroperoxide, 2,5-dimethylhexane-2,5-dihydroperoxide, 1,3-bis(tert-butylperoxy)-m-isopropyl) benzene, 2,5-dimethyl-2,5-di(tert-butylperoxy) hexane, diisopropyl benzene peroxide, tert-butylcumyl peroxide, decanoyl peroxide, lauroyl peroxide, benzoyl peroxide, 2,4-dichlorobenzoyl peroxide, bis(tert-butylcyclohexyl) peroxydicarbonate, tert-butyl peroxybenzoate, 2,5-dimethyl-2,5-di(benzoylperoxy) hexane, or the like.

Examples of the inorganic peroxides include potassium persulfate, sodium persulfate, ammonium persulfate, or the like.

Examples of the redox-type polymerization initiator include sodium sulfite, sodium thiosulfate, sodium formaldehyde sulfoxylate, ascorbic acid, and ferrous sulfate, which are used as a reducing agent, and potassium peroxodisulfate, hydrogen peroxide, and tert-butyl hydroperoxide, which are used as an oxidant.

Among these polymerization initiators, 2,2'-azobis (isobutyronitrile), 1,1-azobis (cyclohexane-1-carbonitrile), dimethyl 2,2'-azobis (2-methyl propionate), and benzoyl peroxide are preferred from the viewpoint of influences of electrical properties due to residues.

The amount of the polymerization initiator is preferably 0.01 part by mass or more, more preferably 0.05 part by mass or more, and particularly preferably 0.10 part by mass or more, relative to 100 parts by mass of the reactive substances such as the macromonomer al and fluorine-containing (meth)acrylate serving as a source of the repeating unit represented by the Formula (A3). On the other hand, the amount of the polymerization initiator is preferably 20 parts by mass or less, more preferably 10 parts by mass or less, and particularly preferably 2 parts by mass or less. When the amount of the polymerization initiator is within the above range, high dispersibility and good electrical properties are obtained.

The chain transfer agent may be used in the radical reaction for the purpose of molecular weight adjustment and introduction of other functional groups. The chain transfer agent to be used is not particularly limited, and examples thereof include thiols such as 1-butanethiol, 1-hexylthiol, 1-decanethiol, and thioglycolic acid 2-ethylhexyl; halogenated polyhalogenated hydrogens such as carbon tetrabromide and carbon tetrachloride; α-methylstyrene dimers such as 2,4-diphenyl-4-methyl-1-pentene; naphthoquinones; or the like.

The reaction temperature can be appropriately adjusted depending on the solvent and the polymerization initiator used. The reaction temperature of 50° C. to 200° C. is preferred, and the reaction temperature of 60° C. to 90° C. is particularly preferred. The polymer-containing solution after the polymerization may be used as a solution dissolved in an organic solvent, or the polymer may be pulled out by subjecting the solution to precipitation in alcohol and other organic solvents in which the polymer is insoluble, or by distilling off the solvent in a dispersion medium in which the polymer is insoluble, or by distilling off the solvent by heating and vacuum.

The drying in a case where the polymer is extracted is generally dried at temperature equal to or lower than the decomposition temperature of the polymer, and can be preferably dried at 30° C. to a melting temperature of the polymer. At this time, drying under reduced pressure is preferred.

Drying time is preferably equal to or longer than the time during which the purity of impurities such as a residual solvent falls below a constant level. Specifically, drying is performed for a time during which the amount of residual solvent is generally 1000 ppm or less, preferably 300 ppm or less, and particularly preferably 100 ppm or less.

1-1-12. Copolymer A

A preferred example of the polymers (copolymers) containing both the "repeating unit represented by the Formula (A1)" and the "repeating unit represented by the Formula (A3)" among the polymers contained by the electrophotographic photoreceptor according to the present invention include a "copolymer A" described below.

The copolymer A according to the present invention contains a moiety derived from a structure represented by the following Formula (1) and a repeating unit represented by the following Formula (3). The copolymer A according to the present invention contains the "moiety derived from a structure represented by the Formula (1)" and the "repeating unit represented by the Formula (3)", and may contain a moiety, a structure, and a repeating unit other than these.

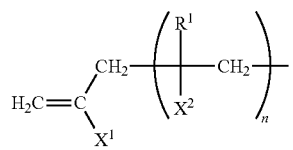

(1)

(In the Formula (1), $X^1$ and $X^2$ each independently represent a hydrocarbon group which may have a substituent or a group represented by the following Formula (2). R' represents a hydrogen atom, or a hydrocarbon group which may have a substituent. n is an integer of 2 or more.)

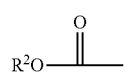

(2)

(In the Formula (2), $R^2$ represents a hydrogen atom, a hydrocarbon group which may have a substituent, or a heterocyclic group which may have a substituent.)

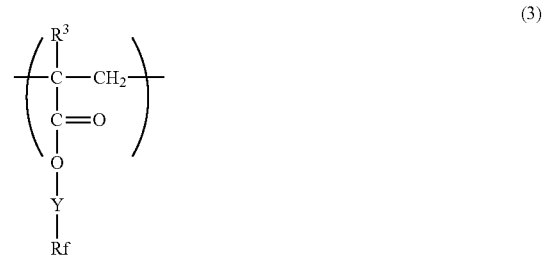

(3)

(In the Formula (3), Y represents a single bond or a divalent group. Rf represents a group having a C—F bond. $R^3$ represents a hydrogen atom or a hydrocarbon group.)

1-1-12-1. Hydrocarbon Group in $X^1$, $X^2$, $R^1$, and $R^2$

The following descriptions of the hydrocarbon group are common to $X^1$, $X^2$, $R^1$, and $R^2$.

The term "hydrocarbon group" refers to a group composed of a carbon atom and a hydrogen atom, and corresponds to an aliphatic hydrocarbon group and an aromatic hydrocarbon group.

The term "aliphatic hydrocarbon group" refers to an acyclic or cyclic hydrocarbon group composed of a carbon atom and a hydrogen atom, and represents a group which does not have an aromatic structure. Examples of aliphatic hydrocarbon groups include linear, branched and cyclic hydrocarbon groups, in which the linear hydrocarbon group and the cyclic hydrocarbon group are preferred, and the linear hydrocarbon group is more preferred. The linear hydrocarbon group and cyclic hydrocarbon group have a high affinity with a solvent, and thus dispersion stability of fluororesin particles is improved.

In addition, the term "aromatic hydrocarbon group" refers to a hydrocarbon group having an aromatic structure composed of carbon atoms and hydrogen atoms.

Examples of the aliphatic hydrocarbon group include an alkyl group, an alkenyl group, and an alkynyl group. The number of carbon atoms of the aliphatic hydrocarbon group is not particularly limited, and the number of carbon atoms of the alkyl group is generally 1 or more, and the number of carbon atoms of the alkenyl group and the alkynyl group is generally 2 or more. On the other hand, the number of carbon atoms of the alkyl group, the alkenyl group, and the alkynyl group is preferably 20 or less, more preferably 10 or less, and particularly preferably 6 or less. When the number of carbon atoms is within the above range, high solvent affinity can be obtained.

Examples of the aromatic hydrocarbon group include an aryl group and an aralkyl group. The number of carbon atoms of the aromatic hydrocarbon group is not particularly limited, and is preferably 6 or more, and is preferably 20 or less, and more preferably 12 or less. When the number of carbon atoms is within the above range, solubility and electrical properties are excellent.

Specific examples of the hydrocarbon group include: an alkyl group, for example, an alkyl group having 1 to 5 carbon atoms, such as a methyl group, an ethyl group, a n-propyl group, an i-propyl group, a n-butyl group, a sec-butyl group, an i-butyl group, a tert-butyl group, a n-pentyl group, an isopentyl group, a sec-pentyl group, a neopentyl group, a 1-methylbutyl group, a 2-methylbutyl group, a 1,1-dimethylpropyl group, and a 1,2-dimethylpropyl group;

an alkenyl group, for example, an alkenyl group having 2 to 5 carbon atoms, such as a vinyl group, a 1-propenyl group, a 2-propenyl group, an isopropenyl group, a 1-butenyl group, a 2-butenyl group, a 3-butenyl group, a 1-pentenyl group, a 2-pentenyl group, a 3-pentenyl group, and a 4-pentenyl group; and an alkynyl group, for example, an alkynyl group having 2 to 5 carbon atoms, such as an ethynyl group, a 1-propynyl group, a 2-propynyl group, a 1-butynyl group, a 2-butynyl group, a 3-butynyl group, a 1-pentynyl group, a 2-pentynyl group, a 3-pentynyl group, and a 4-pentynyl group.

Specific examples of the hydrocarbon group include: an aryl group such as a phenyl group, a tolyl group, an xylyl group, an ethyl phenyl group, a n-propylphenyl group, an i-propylphenyl group, a n-butylphenyl group, a sec-butylphenyl group, an i-butylphenyl group, a tert-butylphenyl group, a naphthyl group, an anthracene group, a biphenyl group, and a pyrene group; and an aralkyl group, for example, an aralkyl group having 7 to 12 carbon atoms, such as a benzyl group, an α-methyl benzyl group, a 1-methyl-1-phenylethyl group, a phenethyl group, a 2-phenylpropyl group, a 2-methyl-2-phenylpropyl group, a 3-phenylpropyl group, a 3-phenylbutyl group, a 3-methyl-3-phenylbutyl group, a 4-phenylbutyl group, a 5-phenylpentyl group, and a 6-phenylhexyl group.

From the viewpoint of the dispersibility of fluororesin particles, particularly preferred are an alkyl group such as a methyl group, an ethyl group, a n-propyl group, and a n-butyl group; an alkenyl group such as a vinyl group and a 1-propenyl group; and an alkynyl group such as an ethynyl group and a 1-propynyl group.

From the viewpoint of the dispersibility of fluororesin particles, particularly preferred are an aryl group such as a phenyl group, a tolyl group, an xylyl group, a naphthyl group, a biphenyl group, a tert-butylphenyl group, and a naphthyl group; and an aralkyl group such as a benzyl group, a phenethyl group, a 3-phenylpropyl group, and a 4-phenylbutyl group.

Among these, the hydrocarbon group is still more preferably a methyl group, an ethyl group, a n-propyl group, a n-butyl group, a phenyl group, a tolyl group, a naphthyl group, and a benzyl group, and most preferably a methyl group, an ethyl group, a phenyl group, and a benzyl group, from the viewpoint of electrical properties and the dispersibility of fluororesin particles.

$R^1$ is most preferably a hydrogen atom.

When the above groups are satisfied, the solubility and reactivity of the copolymer A can be compatible.

1-1-12-2. Substituent in $X^1$, $X^2$, $R^1$, and $R^2$ $X^1$, $X^2$, $R^1$, and $R^2$ represent the above groups, and may have a substituent.

Examples of the substituent include a hydrocarbon group, an alkoxy group, a halogen group, or the like.

Here, the hydrocarbon group has the same meaning as the hydrocarbon group described in "1-1-12-1.". Examples of the alkoxy group include a methoxy group, an ethoxy group, a phenoxy group, a one-terminal alkoxy polyethylene glycoloxy group, a one-terminal alkoxy polypropylene glycoxy group, or the like. Examples of the halogen group include a fluoro group, a chloro group and a bromo group.

Examples of the substituent further include a cyano group, an acyloxy group, a carboxyl group, an alkoxycarbonyl group, a carbamoyl group, an allyl group, a hydroxyl group, an amino group, a siloxane group, a hydrophilic or ionic group, or the like.

Examples of the acyloxy group include an acetate group, a propionate group, a succinate group, a malonate group, a phthalate group, a 2-hydroxyethyl-phthalate group, a benzoate group, a naphthoate group, or the like. Examples of the alkoxycarbonyl group incldue a methoxy carbonyl group, an ethoxycarbonyl group, a propoxycarbonyl group, a butoxycarbonyl group, a benzyl alkoxy carboxyl group, or the like. Examples of the amino group include a monoalkylamino group and a dialkylamino group.

From the viewpoint of the electrical properties, preferred are an alkoxy group such as a methoxy group, an ethoxy group, and a phenoxy group; an acyloxy group such as an acetate group, a propionate group and a phthalate group; and an alkoxycarbonyl group such as a methoxycarbonyl group, an ethoxycarbonyl group, and a benzylalkoxycarbonyl group.

1-1-12-3. In Respect of Heterocyclic Group in $R^2$

Examples of the "heterocycle" of the above-mentioned "a heterocyclic group which may have a substituent" represented by $R^2$ include a heterocycle having 2 to 18 carbon atoms.

Examples of the heterocyclic group include an aromatic heterocyclic group, a cyclic ether group, a cyclic amino group, a cyclic thioether group, or the like. Specific examples of the heterocyclic group include a furanyl group, a pyrrolyl group, a pyridinyl group, a thiophenyl group, an oxiranyl group, an oxetanyl group, a tetrahydrofuranyl group, a tetrahydropyranyl group, a dioxolanyl group, a dioxanyl group, a tetrahydrothiophenyl group, or the like. From the viewpoint of electrical properties, a furanyl group, a thiophenyl group, and a tetrahydrofuranyl group are preferred.

As a "substituent" in the heterocyclic group, substituents have the same meaning as the substituent described in "1-1-12-2." can be mentioned. Examples of the substituent include a hydrocarbon group, an alkoxy group, a halogen group, or the like.

1-1-12-4. In Respect of Formula (1)

The above $X^1$ and $X^2$ each independently represent a hydrocarbon group which may have a substituent, or a group represented by the above Formula (2). From the viewpoint of reactivity and dispersibility, $X^1$ or $X^2$ is preferably the group represented by the above Formula (2).

That is, $X^1$ and $X^2$ may independently be any one of the two groups mentioned above. Only $X^2$ in each of the n repeating units in the Formula (1) may be independently the above groups respectively, or may be different from each other.

A ratio of $X^2$ represented by the Formula (2) (repeating unit) to the entire (n) repeating units (the entire repeating unit derived from the structure represented by Formula (1)) is preferably 60 mol % or more, and particularly preferably 80 mol % or more.

From the viewpoint of reactivity and dispersibility, $X^1$ or $X^2$ is more preferably the group represented by the above Formula (2) ($X^2$ in the all n repeating units are the group represented by the above Formula (2)).

Further, from the viewpoint of reactivity and dispersibility, both $X^1$ and $X^2$ are preferably the group represented by the above Formula (2).

From the viewpoint of synthesis, no less than half of $R^1$ in the repeating units of the Formula (1) are preferably hydrocarbon groups.

"n" in the Formula (1) is an integer of 2 or more, preferably 3 or more, more preferably 5 or more, and particularly preferably 10 or more. On the other hand, an upper limit is not particularly limited, and is generally 1000, preferably 800, more preferably 500, and particularly preferably 200. When "n" is within the above range, good dispersibility is obtained.

A weight average molecular weight (Mw) of the structures represented by the above Formula (1) is not particularly limited, and is preferably 2,000 or more, and particularly preferably 3,000 or more. On the other hand, Mw is preferably 20,000 or less, and particularly preferably 15,000 or less.

When the molecular weight is within the above range, good solvent affinity can be obtained, and a smooth coating film having good compatibility with other binder resins can be obtained.

The weight average molecular weight (Mw) in the present invention refers to a weight average molecular weight obtained by gel permeation chromatography (GPC) using polystyrene as a standard substance.

1-1-12-5. In Respect of Y in Formula (3)

Y represents a single bond or a divalent group.

The "divalent group" is not particularly limited as long as it is a divalent group, and examples thereof include a divalent hydrocarbon group, a divalent group containing an ether group, a divalent group containing ester group, a divalent group containing a hydrocarbon group and an ether group, a divalent group containing a hydrocarbon group and an ester group, a "divalent group containing a hydrocarbon group, an ether group and an ester group", or the like.

The divalent hydrocarbon group corresponds to a divalent group obtained by being derived by removing one hydrogen atom from a hydrocarbon group in "1-1-12-1. Hydrocarbon Group in $X^1$, $X^2$, $R^1$, and $R^2$".

Preferred specific examples of the divalent hydrocarbon group include an alkylene group, a divalent aromatic group, a divalent group containing an ether group, a divalent group containing an ester group, or the like.

Examples of the alkylene group include a linear hydrocarbon group, a branched hydrocarbon group, and an alicyclic hydrocarbon group. Examples of the linear hydrocarbon group include a methylene group, an ethylene group, a trimethylene group, a tetramethylene group, a pentamethylene group, or the like. Examples of the branched hydrocarbon group include a methyl ethylene group, a methyltrimethylene group, a dimethyltrimethylene group, or the like. Examples of the alicyclic hydrocarbon group include alkylene groups such as a cyclohexylene group and a 1,4-dimethylenecyclohexane group.

From the viewpoint of stability and reactivity of the (meth)acrylate which is the source of the structure, a linear alkylene group is preferred. From the simplicity of production, an alkylene group having 1 to 3 carbon atoms is particularly preferred.

Examples of the divalent aromatic group include a phenylene group, a naphthylene group, a biphenylene group, a terphenylene group, or the like.

Examples of the divalent group containing an ether group include —[(CH$_2$)O]$_m$— (in which 1 represents an integer of 1 to 10, m represents an integer of 1 to 100), or the like.

Examples of the divalent group containing an ester group include —R'COOR"— (in which R' and R" each independently represent a divalent hydrocarbon group), or the like.

Examples of the substituent include substituents which are the same as that in "1-1-12-2. Substituent in $X^1$, $X^2$, $R^1$ and $R^2$".

1-1-12-6. In Respect of Rf in Formula (3)

Rf represents a group having a C—F bond, and is not particularly limited. Any group having a C—F bond can be used as Rf. Examples of the group having a C—F bond include groups obtained by replacing some or all of C—H bonds of hydrocarbon groups in "1-1-12-1. Hydrocarbon Group in $X^1$, $X^2$, $R^1$, and $R^2$".

Specific examples of the group having a C—F bond include a fluoroalkyl group, a fluoroalkenyl group, a fluoroalkynyl group, a fluorophenyl group, a fluoroaryl group, a fluoroaralkyl group, or the like.

The number of carbon atoms of the group having a C—F bond is not particularly limited, and is generally 1 or more, preferably 2 or more, and more preferably 4 or more, and on the other hand, is generally 6 or less, in the case of a fluoroalkyl group. In the case of a fluoroalkenyl group, the number of carbon atoms of the group having a C—F bond is generally 2 or more, and preferably 3 or more, and on the other hand, is preferably 6 or less. In the case of a fluoroalkynyl group, the number of carbon atoms of the group having a C—F bond is generally 2 or more, and preferably 3 or more, and on the other hand, is generally 7 or less, and preferably 6 or less.

When the number of carbon atoms is within the above range, good dispersibility and good electrical properties of the fluororesin particles can be obtained particularly.

Specific examples of the fluoroalkyl group include a fluoromethyl group, a difluoromethyl group, a trifluoromethyl group, a fluoroethyl group, a difluoroethyl group, a trifluoroethyl group, a tetrafluoroethyl group, a pentafluoroethyl group, or the like.

Specific examples thereof further include perfluoro (cyclo)alkyl groups such as a perfluoroethyl group, a perfluoropropyl group, a perfluoro n-butyl group, a perfluoro n-pentyl group, a perfluoro n-hexyl group, a perfluoro iso-propyl group, a perfluoro iso-butyl group, a perfluoro tert-butyl group, a perfluoro sec-butyl group, a perfluoro iso-pentyl group, a perfluoro iso-hexyl group, a perfluorocyclopentyl group, and a perfluorocyclohexyl group.

In addition, specific examples thereof include a 2H-tetrafluoroethyl group, a 3H-hexafluoropropyl group, a 1H-1-(trifluoromethyl) trifluoroethyl group, a 2H-hexafluoropropyl group, a 4H-octafluorobutyl group, a 6H-dodecafluorohexyl group, or the like.

Rf preferably represents a linear perfluoroalkyl group having 4 to 6 carbon atoms from the viewpoint of obtaining good dispersibility and good electrical properties of the fluororesin particles.

From the viewpoint of electrical properties, preferred are a perfluoroethyl group, a perfluoropropyl group, a perfluoro n-butyl group, a perfluoro n-pentyl group, and a perfluoro n-hexyl group. From the viewpoint of the dispersibility of fluororesin particles, particularly preferred are a perfluoro n-butyl group, a perfluoro n-pentyl group, and a perfluoro n-hexyl group.

Rf may have a hetero atom. Specific examples of the hetero atom include nitrogen, oxygen, sulfur, phosphorus, or the like. The hetero atom is preferably oxygen or sulfur, and more preferably oxygen.

Specific examples of the group having a hetero atom are shown below.

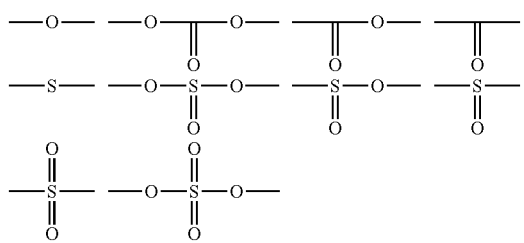

Preferred examples among the specific examples of the group having a hetero atom are shown below.

—O— —S—

In a case where Rf has a hetero atom, Rf further preferably has a divalent hydrocarbon group. Examples of the divalent hydrocarbon group preferably include an alkylene group, a fluoro alkylene group, an alkenylene group, a fluoroalkenylene group, an alkynylene group, a fluoroalkynylene group, an arylene group, a fluoroarylene group, an aralkylene group, a fluoroaralkylene group, or the like. Among these, an alkylene group or a fluoro alkylene group is more preferred, and a fluoro alkylene group is particularly preferred.

The number of carbon atoms of the divalent hydrocarbon group is not particularly limited, and is generally 1 or more, and preferably 2 or more. On the other hand, the number of carbon atoms of the divalent hydrocarbon group is generally 20 or less, preferably 15 or less, more preferably 10 or less, still more preferably 8 or less, particularly preferably 6 or less, and most preferably 4 or less.

When the number of carbon atoms is within the above range, good dispersibility and good electrical properties can be obtained.

Specific examples of the fluoro alkylene group include a perfluoromethylene group, a perfluoroethylene group, a perfluoro 2-methyl ethylene group, a perfluoro 2-ethyl ethylene group, a perfluoro 2-propyl ethylene group, a perfluoro 2-butyl ethylene group, a perfluorotrimethylene group, a perfluorotetramethylene group, a perfluoropentamethylene group, a perfluorohexamethylene group, or the like.

From the viewpoint of solubility, a perfluoromethylene group, a perfluoroethylene group, and a perfluoro 2-methyl ethylene group are preferred.

Rf preferably represents a structure represented by the following Formula (4).

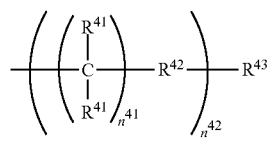

(4)

$R^{41}$ represents any one of a hydrogen atom, a fluorine atom, and a group having a C—F bond independently, $R^{42}$ represents a group having a hetero atom, and $R^{43}$ represents a group having a C—F bond.

$n^{41}$ represents an integer of 1 to 20, and $n^{42}$ represents an integer of 0 to 100.

With the above structure, the reactivity of the radical reaction can be enhanced, and the copolymer A can be obtained with good yield.

1-1-12-7. In Respect of $R^3$ in Formula (3)

Examples of $R^3$ in the Formula (3) include those which are the same as $R^1$. From the viewpoint of reactivity, a hydrogen atom or a methyl group is preferred, and a hydrogen atom is particularly preferred.

1-1-12-8. In Respect of Formula (3)

When the fluorine-containing (meth)acrylate which is the source of the repeating unit represented by the Formula (3) is specifically described, examples thereof include perfluoroethyl (meth)acrylate, perfluoropropyl (meth)acrylate, perfluorobutyl (meth) acrylate, perfluoropentyl (meth)acrylate, perfluorohexyl (meth)acrylate, perfluoro iso-propyl (meth) acrylate, perfluoroiso-butyl (meth)acrylate, perfluoro tert-butyl (meth)acrylate, perfluoro sec-butyl (meth)acrylate, perfluoro iso-pentyl (meth)acrylate, perfluoro iso-hexyl (meth)acrylate, perfluorocyclopentyl (meth)acrylate, perfluorocyclohexyl (meth)acrylate, (perfluoroethyl) methyl (meth)acrylate, (perfluoropropyl) methyl (meth)acrylate, (perfluorobutyl) methyl (meth)acrylate, (perfluoropentyl) methyl (meth)acrylate, (perfluorohexyl) methyl (meth)acrylate, (perfluoroiso-propyl) methyl (meth)acrylate, (perfluoroiso-butyl) methyl (meth)acrylate, (perfluoro tert-butyl) methyl (meth)acrylate, (perfluorosec-butyl) methyl (meth)acrylate, (perfluoro iso-pentyl) methyl (meth)acrylate, (perfluoroiso-hexyl) methyl (meth)acrylate, (perfluorocyclopentyl) methyl (meth)acrylate, (perfluorocyclohexyl) methyl (meth)acrylate, 2-(perfluoroethyl) ethyl (meth)acrylate, 2-(perfluoropropyl) ethyl (meth)acrylate, 2-(perfluorobutyl) ethyl (meth)acrylate, 2-(perfluoropentyl) ethyl (meth)acrylate, 2-(perfluorohexyl) ethyl (meth)acrylate, 2-(perfluoro iso-propyl) ethyl (meth)acrylate, 2-(perfluoro iso-butyl) ethyl (meth)acrylate, 2-(perfluoro tert-butyl) ethyl (meth)acrylate, 2-(perfluoro sec-butyl) ethyl (meth)acrylate, 2-(perfluoro iso-pentyl) ethyl (meth)acrylate, 2-(perfluoro iso-hexyl) ethyl (meth)acrylate, 2-(perfluorocyclopentyl) ethyl (meth)acrylate, 2-(perfluorocyclohexyl) ethyl (meth)acrylate, 3-(perfluoroethyl) propyl (meth)acrylate, 3-(perfluoropropyl) propyl (meth)acrylate, 3-(perfluorobutyl) propyl (meth)acrylate, 3-(perfluoropentyl) propyl (meth)acrylate, 3-(perfluorohexyl) propyl (meth)acrylate, 3-(perfluoroisopropyl) propyl (meth)acrylate, 3-(perfluoro iso-butyl) propyl (meth)acrylate, 3-(perfluoro tert-butyl) propyl (meth)acrylate, 3-(perfluoro sec-butyl) propyl (meth)acrylate, 3-(perfluoro iso-pentyl) propyl (meth)acrylate, 3-(perfluoro iso-hexyl) propyl (meth)acrylate, 3-(perfluorocyclopentyl) propyl (meth)acrylate, 3-(perfluorocyclohexyl) propyl (meth)acrylate, 4-(perfluoroethyl) butyl (meth)acrylate, 4-(perfluoropropyl) butyl (meth)acrylate, 4-(perfluorobutyl) butyl (meth)acrylate, 4-(perfluoropentyl) butyl (meth)acrylate, 4-(perfluorohexyl) butyl (meth)acrylate, 4-(perfluoro iso-propyl) butyl (meth)acrylate, 4-(perfluoro iso-butyl) butyl (meth)acrylate, 4-(perfluoro tert-butyl) buty (meth)acrylate, 4-(perfluoro sec-butyl) butyl (meth)acrylate, 4-(perfluoro iso-pentyl) butyl (meth)acrylate, 4-(perfluoro iso-hexyl) butyl (meth)acrylate, 4-(perfluorocyclopentyl) butyl (meth)acrylate, 4-(perfluorocyclohexyl) butyl (meth)acrylate, or the like.

Specific examples of the fluorine-containing (meth)acrylate serving as the source of the repeating unit represented by the formula (3) include (meth)acrylate having the following structural formula.

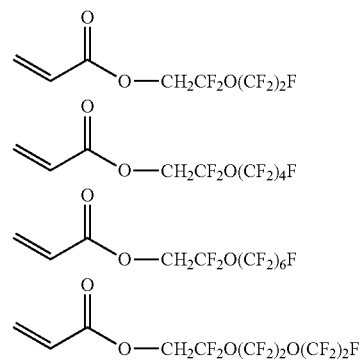

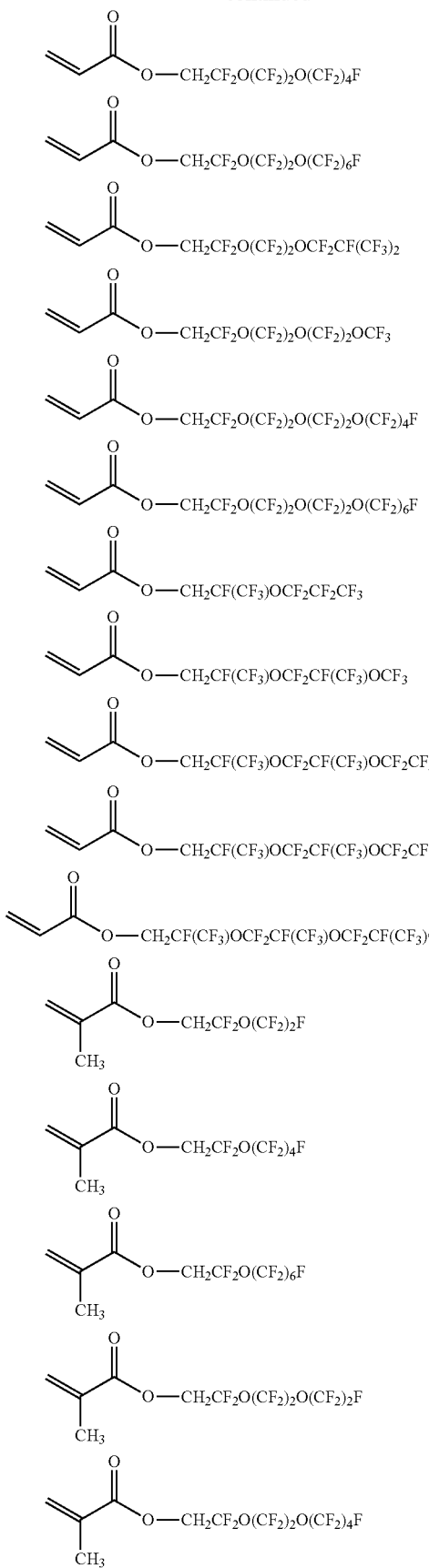
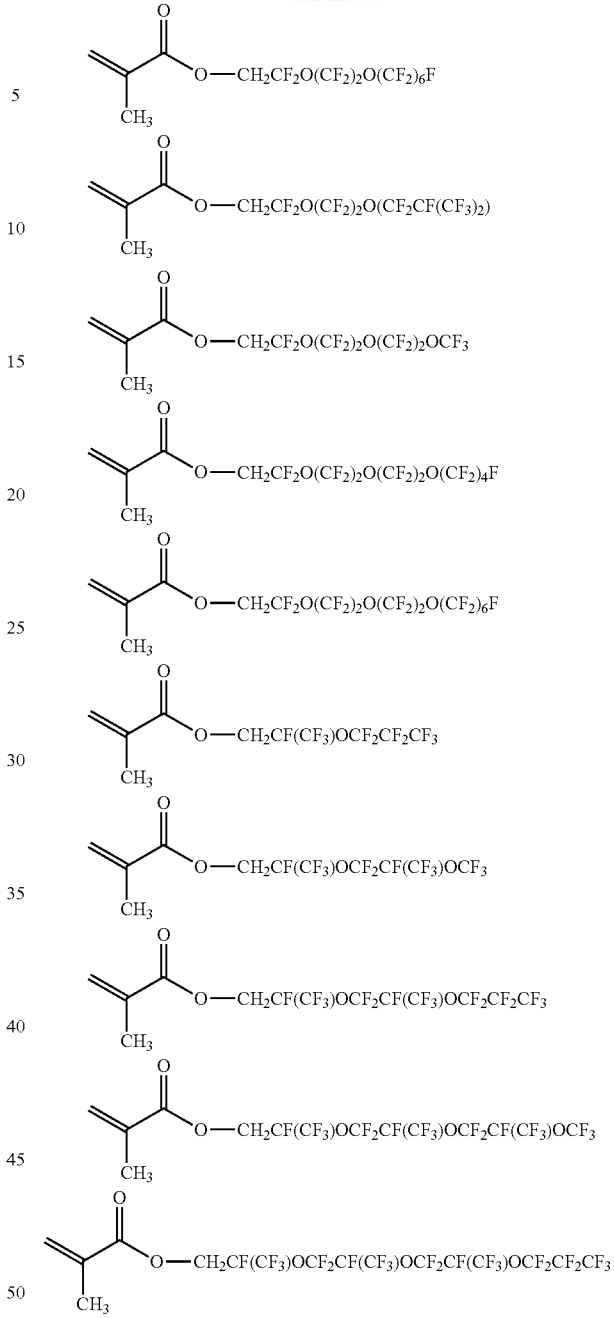

Among these, preferred are (perfluoroethyl) methyl (meth)acrylate, (perfluoropropyl) methyl (meth)acrylate, (perfluorobutyl) methyl (meth)acrylate, (perfluoropentyl) methyl (meth)acrylate, (perfluorohexyl) methyl (meth)acrylate, 2-(perfluoroethyl) ethyl (meth)acrylate, 2-(perfluoropropyl) ethyl (meth)acrylate, 2-(perfluorobutyl) ethyl (meth)acrylate, 2-(perfluoropentyl) ethyl (meth)acrylate, 2-(perfluorohexyl) ethyl (meth)acrylate, 3-(perfluoroethyl) propyl (meth)acrylate, 3-(perfluoropropyl) propyl (meth)acrylate, 3-(perfluorobutyl) propyl (meth)acrylate, 3-(perfluoropentyl) propyl (meth)acrylate, 3-(perfluorohexyl) propyl (meth)acrylate, or the like, from the viewpoint of (meth) acrylate stability and simplicity of production.

From the viewpoint of dispersibility of the fluorine resin, more preferred are (perfluorobutyl) methyl (meth)acrylate, (perfluoropentyl) methyl (meth)acrylate, (perfluorohexyl) methyl (meth)acrylate, 2-(perfluorobutyl) ethyl (meth)acrylate, 2-(perfluoropentyl) ethyl (meth)acrylate, 2-(perfluorohexyl) ethyl (meth)acrylate, 3-(perfluorobutyl) propyl (meth)acrylate, 3-(perfluoropentyl) propyl (meth)acrylate, 3-(perfluorohexyl) propyl (meth)acrylate, or the like. From the viewpoint of reactivity with a macromonomer, particularly preferred are (perfluorobutyl) methyl acrylate, (perfluoropentyl) methyl acrylate, (perfluorohexyl) methyl acrylate, 2-(perfluorobutyl) ethyl acrylate, 2-(perfluoropentyl) ethyl acrylate, 2-(perfluorohexyl) ethyl acrylate, 3-(perfluorobutyl) propyl acrylate, 3-(perfluoropentyl) propyl acrylate, 3-(perfluorohexyl) propyl acrylate, or the like.

A plurality of the fluorine-containing (meth)acrylate compounds described above may be used in combination if necessary.

1-1-12-9. Other Aspects of Copolymer A

The weight average molecular weight (Mw) of the copolymer A is preferably 10,000 or more, and more preferably 15,000 or more. On the other hand, Mw of the copolymer A is preferably 200,000 or less, and more preferably 100,000 or less. When the molecular weight is within the above range, good dispersion stability of the fluororesin particles can be obtained.

A ratio of the weight average molecular weight (Mw) of the copolymer A to the number average molecular weight (Mn) thereof (Mw/Mn) is preferably 1.1 or more, more preferably 1.5 or more, still more preferably 2.0 or more, and particularly preferably 2.5 or more. On the other hand, the above ratio is preferably 10.0 or less, more preferably 7.5 or less, particularly preferably 5.0 or less, and still more preferably 4.0 or less. When the ratio is within the above range, dispersibility of fluororesin particles is good.

The content of the moiety derived from the structure represented by the Formula (1) contained in the copolymer A relative to the entire copolymer A is preferably 1% by mass or more, more preferably 10% by mass or more, and particularly preferably 30% by mass or more. On the other hand, the content of the moiety is preferably 80% by mass or less, preferably 60% by mass or less, and particularly preferably 50% by mass or less. When the content is within the above range, good electrical properties can be obtained.

Meanwhile, the content of unreacted raw materials derived from the structure represented by the Formula (1) contained in the copolymer A is preferably 0.5% by mass or less, more preferably 0.1% by mass or less, and particularly preferably 0.01% by mass or less. When the content is within the above range, electrical properties are good.

The content of the repeating units represented by the Formula (3) contained in the copolymer A is preferably 10% by mass or more, more preferably 20% by mass or more, and particularly preferably 30% by mass or more. On the other hand, the content of the repeating units is preferably 80% by mass or less, more preferably 70% by mass or less, and particularly preferably 60% by mass or less. When the content is within the above range, good dispersion stability of the fluororesin particles can be obtained.

Meanwhile, the content of unreacted fluorine-containing (meth)acrylate serving as the source of the repeating units represented by the Formula (3) contained in the copolymer A is preferably 0.5% by mass or less, more preferably 0.1% by mass or less, and particularly preferably 0.01% by mass or less. When the content is within the above range, good electrical properties can be obtained.

The copolymer A may be copolymerized with other monomers. Examples of other monomers include a (meth) acrylic acid monomer, a (meth)acrylate monomer, a (meth) acrylamide monomer, an aromatic vinyl monomer, an alkyl vinyl ether monomer, a vinyl ester monomer, or the like. As other monomers, a (meth)acrylate monomer and a (meth) acrylamide monomer are preferred from the viewpoint of electrical properties, and a (meth)acrylate monomer is particularly preferred from the viewpoint of dispersion stability of fluororesin particles.

The content of other monomers in the copolymer A according to the present invention is preferably 20% by mass or less, more preferably 15% by mass or less from the viewpoint of electrical properties, and more preferably 10% by mass or less from the viewpoint of dispersibility of fluororesin particles.

Specific examples of the (meth)acrylate monomer include methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, isoamyl (meth)acrylate, hexyl (meth)acrylate, 2-ethylhexyl (meth)acrylate, octyl (meth)acrylate, lauryl (meth)acrylate, dodecyl (meth)acrylate, tetradecyl (meth)acrylate, hexadecyl (meth)acrylate, stearyl (meth)acrylate, cyclohexyl (meth)acrylate, isobornyl (meth)acrylate, adamantyl (meth) acrylate, 2-isopropyl-2-adamantyl (meth)acrylate, dicyclopentenyl (meth)acrylate, dicyclopentanyl (meth)acrylate, 2-cyanoethyl (meth)acrylate, 2-bromoethyl (meth)acrylate, 2-chloroethyl (meth)acrylate, 2,3-dibromopropyl (meth) acrylate, 3-chloro-2-hydroxypropyl (meth)acrylate, 2-hydroxyethyl (meth)acrylate, 4-hydroxybutyl (meth)acrylate, 2-hydroxypropyl (meth)acrylate, 2-hydroxy-1-methylethyl (meth)acrylate, 2-methoxyethyl (meth)acrylate, ethoxy-diethylene glycol (meth)acrylate, methoxy-triethylene glycol (meth)acrylate, 2-ethylhexyl-diglycol (meth)acrylate, methoxy-polyethylene glycol (meth)acrylate, nonylphenoxy-polyethylene glycol (meth)acrylate, methoxy dipropylene glycol (meth)acrylate, 2-phenoxyethyl (meth)acrylate, 2-dicyclopentenyloxyethyl (meth)acrylate, a phenoxydiethylene glycol (meth)acrylate, phenoxy-polyethylene glycol (meth)acrylate, glycidyl (meth)acrylate, tetrahydrofurfuryl (meth)acrylate, benzyl (meth)acrylate, naphthylmethyl (meth)acrylate, anthrylmethyl (meth)acrylate, 2-hydroxy-3-phenoxypropyl (meth)acrylate, 2-succinate ethyl (meth)acrylate, 2-hexahydro phthalate ethyl (meth) acrylate, 2-phthalated ethyl (meth)acrylate, 2,2-dimethyl-3-benzoate propyl (meth)acrylate, 2-(dimethylamino) ethyl (meth)acrylate, pentamethyl piperidinyl (meth)acrylate, tetramethyl piperidinyl (meth)acrylate, 3-(trimethoxysilyl) propyl (meth)acrylate, a phenyl (meth)acrylate, naphthyl (meth)acrylate, anthracene (meth)acrylate, furfuryl (meth) acrylate, PMMA, or a macromonomer of polystyrene or polyester having a (meth)acrylate group.

From the viewpoint of electrical properties, preferred are methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, isoamyl (meth)acrylate, hexyl (meth)acrylate, 2-ethylhexyl (meth)acrylate, cyclohexyl (meth)acrylate, isobornyl (meth) acrylate, adamantyl (meth)acrylate, dicyclopentanyl (meth) acrylate, 2-methoxyethyl (meth)acrylate, 2-phenoxyethyl (meth)acrylate, 2-dicyclopentenyloxyethyl (meth)acrylate, benzyl (meth)acrylate, naphthylmethyl (meth)acrylate, PMMA, or a macromonomer of polystyrene having a (meth) acrylate group. From the viewpoint of reactivity with macromonomer, particularly preferred are methyl acrylate, ethyl acrylate, n-propyl (meth)acrylate, cyclohexyl acrylate, isobornyl acrylate, dicyclopentanyl acrylate, 2-phenoxyethyl acrylate, 2-dicyclopentenyloxyethyl acrylate, and benzyl acrylate.

1-1-12-10. Method for Producing Copolymer A

In a method for producing the copolymer A according to the present invention, the copolymer may be produced by using a macromonomer represented by the Formula (1) and fluorine-containing (meth)acrylate serving as a source of the repeating unit represented by the Formula (3), and the production method thereof is not particularly limited. The polymer is preferably produced by radical polymerization from the viewpoint of reactivity, and is more preferably produced using a thermal polymerization initiator from the viewpoint of electrical properties.

<Method for Producing Macromonomer Represented by Formula (1)>

The macromonomer represented by the Formula (1) can be produced by known methods. Examples of the method for producing the macromonomer in the present invention include a method for producing the macromonomer by using a cobalt chain transfer agent (U.S. Pat. No. 4,680,352), a method in which an α-substituted unsaturated compound such as α-bromomethylstyrene is used as a chain transfer agent (WO 88/004304), a method in which polymerizable groups are chemically bonded (Japanese Unexamined Patent Publication No. 60-133007, U.S. Pat. No. 5,147,952), a method according to thermal decomposition (JP-A-H11-240854), or the like. Among these, preferred are the method for producing the macromonomer by using a cobalt chain transfer agent and the method in which an α-substituted unsaturated compound such as α-bromomethylstyrene is used as a chain transfer agent.

Between the two methods consisting of the method for producing the macromonomer by using a cobalt chain transfer agent and the method in which an α-substituted unsaturated compound such as α-bromomethylstyrene is used as a chain transfer agent, the production method using cobalt chain transfer agent is preferred from the viewpoint of few production steps and using catalyst with high chain transfer constant. Examples of the method for producing the macromonomer represented by the Formula (1) by using a cobalt chain transfer agent include a bulk polymerization method, a solution polymerization method and an aqueous dispersion polymerization method. Examples of the aqueous dispersion polymerization method include a suspension polymerization method and an emulsion polymerization method.

Among these, the aqueous dispersion polymerization method is preferred from the viewpoint of simplification of a recovery step of the macromonomer represented by the Formula (1). In the aqueous dispersion polymerization method, only water or a "mixture of water and a water-soluble solvent (for example, ethanol)" may be used as a solvent. An average particle diameter of the macromonomer represented by the Formula (1) obtained by the aqueous dispersion polymerization method is, for example, about 20 μm to 400 μm, and preferably about 50 μm to 200 μm.

Examples of a solvent used when the macromonomer represented by the Formula (1) is obtained by the solution polymerization method include hydrocarbons such as toluene; ethers such as diethyl ether and tetrahydrofuran; halogenated hydrocarbons such as dichloromethane and chloroform; ketones such as acetone; alcohols such as methanol; nitriles such as acetonitrile; esters such as ethyl acetate; carbonates such as ethylene carbonate; supercritical carbon dioxide; or the like. One selected from these may be used alone, or two or more selected from these may be used in combination.

<Polymerization Method>

The production of the copolymer A according to the present invention is preferably a production according to radical polymerization using the macromonomer represented by the Formula (1) and fluorine-containing (meth) acrylate serving as a source of the repeating unit represented by the Formula (3).

In the production according to radical polymerization, reactive substances such as the macromonomer represented by the Formula (1) and fluorine-containing (meth)acrylate are dissolved in an organic solvent, then a thermal polymerization initiator is added thereto, and the mixture is heated to 40° C. to 200° C. and is polymerized, so as to obtain a target copolymer A. Feed methods for the polymerization reaction include a method in which all raw materials are fed together, a method in which at least one of raw materials such as an initiator and a monomer represented by fluorine-containing (meth)acrylate is continuously fed into a reactor, and a method in which all the raw materials are continuously fed and is continuously extracted from a reactor at the same time. Among these, the method in which fluorine-containing (meth)acrylate is continuously supplied to a reactor is preferred from the viewpoint of preventing homopolymerization of fluorine-containing (meth)acrylate.

The solvent used for the radical polymerization is not particularly limited, and specific examples thereof include alcohols such as methanol, ethanol, propanol, and 2-methoxyethanol; ethers such as tetrahydrofuran, 1,4-dioxane, dimethoxyethane, and anisole; esters such as methyl formate, ethyl acetate, and butyl acetate; ketones such as acetone, methyl ethyl ketone, methyl isobutyl ketone, and cyclohexanone; aromatic hydrocarbons such as benzene, toluene, and xylene; aprotic polar solvents such as N-methyl pyrrolidone, N,N-dimethylformamide, and dimethyl sulfoxide; or the like.

Among these solvents, toluene, xylene, anisole, dimethoxyethane, butyl acetate, methyl ethyl ketone, methyl isobutyl ketone, cyclohexanone, and N,N-dimethylformamide are preferred from the viewpoint of volatility during polymerization, and anisole, dimethoxyethane, butyl acetate, methyl ethyl ketone, and methyl isobutyl ketone are preferred from the viewpoint of the solubility of the copolymer A according to the present invention. Any one selected from these may be used alone, and two or more selected from these may be used in combination.

The using amount of the reaction solvent is preferably 20 parts by mass or more, more preferably 30 parts by mass or more, and particularly preferably 40 parts by mass or more, relative to the total 100 parts by mass of the reactive substances such as the macromonomer represented by the Formula (1) and fluorine-containing (meth)acrylate serving as a source of the repeating unit represented by the Formula (3). On the other hand, the using amount of the reaction solvent is preferably 500 parts by mass or less, more preferably 200 parts by mass or less, and particularly preferably 100 parts by mass or less. When the using amount is within the above range, a uniform polymer with high molecular weight can be obtained.

As the polymerization initiator used in the radical polymerization, known polymerization initiators such as azo compounds, organic peroxides, inorganic peroxides, and redox-type polymerization initiators can be used.

Examples of the azo compounds include 2,2'-azobis (isobutyronitrile), 1,1-azobis (cyclohexane-1-carbonitrile), azocumene, 2,2'-azobis (2-methylbutyronitrile), 2,2'-azobis-dimethyl valeronitrile, 4,4'-azobis (4-cyanovaleric acid), 2-(tert-butylazo)-2-cyanopropane, 2,2'-azobis (2,4,4-trimethylpentane), 2,2'-azobis (2-methylpropane), dimethyl 2,2'-azobis (2-methyl propionate), or the like.

Examples of the organic peroxides include cyclohexanone peroxide, 3,3,5-trimethylcyclohexanone peroxide, methylcyclohexanone peroxide, 1,1-bis(tert-butylperoxy)-3,3,5-trimethylcyclohexane, 1,1-bis(tert-butylperoxy) cyclohexane, n-butyl-4,4-bis(tert-butylperoxy) valerate, cumene hydroperoxide, 2,5-dimethylhexane-2,5-dihydroperoxide, 1,3-bis(tert-butylperoxy)-m-isopropyl) benzene, 2,5-dimethyl-2,5-di(tert-butylperoxy) hexane, diisopropyl benzene peroxide, tert-butylcumyl peroxide, decanoyl peroxide, lauroyl peroxide, benzoyl peroxide, 2,4-dichlorobenzoyl peroxide, bis(tert-butylcyclohexyl) peroxydicarbonate, tert-butyl peroxybenzoate, 2,5-dimethyl-2,5-di(benzoylperoxy) hexane, or the like.

Examples of the inorganic peroxides include potassium persulfate, sodium persulfate, ammonium persulfate, or the like.

Examples of the redox-type polymerization initiator include sodium sulfite, sodium thiosulfate, sodium formaldehyde sulfoxylate, ascorbic acid, and ferrous sulfate, which are used as a reducing agent, and potassium peroxodisulfate, hydrogen peroxide, and tert-butyl hydroperoxide, which are used as an oxidant.

Among these polymerization initiators, 2,2'-azobis (isobutyronitrile), 1,1-azobis (cyclohexane-1-carbonitrile), dimethyl 2,2'-azobis (2-methyl propionate), and benzoyl peroxide are preferred from the viewpoint of influences of electrical properties due to residues.

The amount of the polymerization initiator is preferably 0.01 part by mass or more, more preferably 0.05 part by mass or more, and particularly preferably 0.10 part by mass or more, relative to 100 parts by mass of the reactive substances such as the macromonomer represented by the Formula (1) and (meth)acrylate serving as a source of the repeating unit represented by the Formula (3). On the other hand, the amount of the polymerization initiator is preferably 20 parts by mass or less, more preferably 10 parts by mass or less, and particularly preferably 2 parts by mass or less. When the amount of the polymerization initiator is within the above range, high dispersibility and good electrical properties are obtained.

The chain transfer agent may be used in the radical reaction for the purpose of molecular weight adjustment and introduction of other functional groups. The chain transfer agent to be used is not particularly limited, and examples thereof include thiols such as 1-butanethiol, 1-hexylthiol, 1-decanethiol, and thioglycolic acid 2-ethylhexyl; halogenated polyhalogenated hydrogens such as carbon tetrabromide and carbon tetrachloride; α-methylstyrene dimers such as 2,4-diphenyl-4-methyl-1-pentene; naphthoquinones; or the like.

The reaction temperature can be appropriately adjusted depending on the solvent and the polymerization initiator used. The reaction temperature of 50° C. to 200° C. is preferred, and the reaction temperature of 60° C. to 90° C. is particularly preferred. The copolymer A-containing solution after the polymerization may be used as a solution dissolved in an organic solvent, or the copolymer A may be pulled out by subjecting the solution to precipitation in alcohol and other organic solvents in which the copolymer A is insoluble, or by distilling off the solvent in a dispersion medium in which the copolymer A is insoluble, or distilling off the solvent by heating and vacuum.

The drying in a case where the copolymer A is extracted is generally dried at temperature equal to or lower than the decomposition temperature of the copolymer A, and can be preferably dried at 30° C. to a melting temperature of the copolymer A. At this time, drying under reduced pressure is preferred.

Drying time is preferably equal to or longer than the time during which the purity of impurities such as a residual solvent falls below a constant level. Specifically, drying is performed for a time during which the amount of residual solvent is generally 1000 ppm or less, preferably 300 ppm or less, and particularly preferably 100 ppm or less.

1-2. Fluororesin and Dispersion Thereof

The electrophotographic photoreceptor according to the present invention may contain fluororesin particles. The polymer in the present invention can be used as a dispersant for the fluororesin particles. As the fluororesin particles, it is preferable to appropriately select one or two or more from tetrafluoroethylene resin, trifluoro chlorinated ethylene resin, hexafluoropropylene resin, vinyl fluoride resin, vinylidene fluoride resin, difluoride dichloride ethylene resin, and copolymers thereof. In particular, tetrafluoroethylene resin and vinylidene fluoride resin are preferred.

An average primary particle diameter of the fluororesin particles is preferably 0.05 μm or more, more preferably 0.1 μm or more, and particularly preferably 0.15 μm or more. On the other hand, the average primary particle diameter of the fluororesin particles is preferably 20 μm or less, more preferably 10 μm or less, and particularly preferably 1 μm or less.

When the average primary particle diameter is 0.1 μm or more, coagulation during dispersion is prevented, and a stable dispersion liquid can be obtained. On the other hand, when the average primary particle diameter is 20 μm or less, image quality defects are prevented. The average primary particle diameter of the fluororesin is measured, for example, by a dynamic light scattering method by FPAR-1000 (manufactured by Otsuka Electronics Co., Ltd.) or a laser diffraction/scattering method by Microtrack (manufactured by Nikkiso Co., Ltd.).

The amount of the copolymer according to the present invention, which is used when the fluororesin is dispersed, is preferably 0.5 part by mass or more, more preferably 1 part by mass or more, and particularly preferably 3 parts by mass or more from the viewpoint of dispersibility, relative to the total 100 parts by mass of fluororesins. On the other hand, the amount of the copolymer is preferably 20 parts by mass or less, and more preferably 10 parts by mass or less, from the viewpoint of electrical properties and preventing decrease in film forming properties due to phase separation with other binder resins during formation of a coating film.

The solvent used when the fluororesin is dispersed is preferably a non-aqueous solvent, and examples thereof include hydrocarbon solvents such as xylene, toluene, and cyclohexane; ketone solvents such as acetone, methyl ethyl ketone, cyclohexanone, and methyl isobutyl ketone; ether solvents such as tetrahydrofuran, anisole, dimethoxyethane, 1,4-dioxane, dioxolane, methyl cellosolve, cellosolve, butyl cellosolve, methyl carbitol, carbitol, butyl carbitol, diethyl carbitol, and propylene glycol monomethyl ether; ester solvents such as ethyl acetate, n-butyl acetate, isobutyl acetate, n-amyl acetate, cellosolve acetate, propylene glycol monomethyl ether acetate, and 3-methoxybutyl acetate; alcohol solvents such as n-butyl alcohol, sec-butyl alcohol, isobutyl alcohol, cyclohexanol, 2-ethylhexanol, and 3-methyl-3-methoxybutanol; or the like.

From the viewpoint of the influence of the solubility and electrical properties of the fluororesin dispersant, preferred are toluene, xylene, anisole, tetrahydrofuran, and dimethoxyethane. These solvents may be used alone, or may be used by mixing a plurality thereof.

Preparation of the dispersion liquid of the fluororesin can be performed by: mixing the fluororesin, non-aqueous liquid medium, and the copolymer according to the present invention; and then dispersing the fluororesin by using a dispersion apparatus such as ultrasonic, paint shaker, beads mill, ball mill, various mixers, or various high-pressure wet dispersers.

1-3. Layer Configuration of Electrophotographic Photoreceptor

The electrophotographic photoreceptor in which the polymer according to the present invention is used may include a photosensitive layer provided on a conductive support.

Specific configurations of the photosensitive layer include: a lamination-type photoreceptor obtained by laminating a charge generation layer containing a charge generation substance as a main component, and a charge transport layer containing a charge transport substance and a binder resin as main components, on the conductive support; and a dispersion type (single-layer type) photoreceptor including a photosensitive layer in which the charge generation substance is dispersed in a layer containing a charge transport substance and a binder resin, on the conductive support; or the like.

In addition, a protective layer may be provided on the outermost surface of the photoreceptor. The polymer and the fluororesin particles are generally used for the outermost layer, preferably used for the charge transport layer in the case of a lamination-type photoreceptor, preferably used for the single layer in the case of a single-layer type photoreceptor, and preferably used for the protective layer in the case of a photoreceptor including a protective layer.

<Conductive Support>

The conductive support is not particularly limited, and mainly used as the conductive support is, for example, a metallic material such as aluminum, an aluminum alloy, stainless steel, copper, or nickel, a resin material to which conductivity has been imparted by adding a conductive powder, such as a metal, carbon, or tin oxide powder, or a resin, glass, paper, or the like, having a surface on which a conductive material, e.g., aluminum, nickel, or ITO (indium oxide/tin oxide) has been vapor deposited or coated. One selected from these may be used alone, or two or more selected from these may be used in any desired combination and in any desired proportion. As a form of the conductive support, a drum-like conductive support, a sheet-like conductive support, a belt-like conductive support, or the like can be used. Further, a conductive material having an appropriate resistance value may be applied to the conductive support made of a metal material, for the purpose of control of conductivity, surface properties and the like and coating of defects.

In a case where a metallic material such as an aluminum alloy is used as a conductive support, this material may be used after an anodized layer is applied thereto. In the case where an anodized layer has been applied, the material is preferably subjected to a pore-sealing treatment by a known method.

The surface of the support may be smooth, or it may be roughened by using a special cutting method or applying a polishing treatment. The surface of the support may also be roughened by mixing particles having an appropriate particle diameter with a material constituting the support. In addition, in order to reduce the cost, it is also possible to use a drawn pipe as it is without performing the cutting treatment.

<Undercoat Layer>

In order to improve the adhesiveness, the blocking property and the like, an undercoat layer may be provided between the conductive support and the photosensitive layer described below. As the undercoat layer, a resin or a resin in which particles of a metal oxide or the like is dispersed is used. In addition, the undercoat layer may include a single layer, or may include a plurality of layers. The undercoat layer may contain known antioxidants, pigment particles, resin particles, or the like. The thickness of the undercoat layer is generally 0.01 µm or more, and preferably 0.1 µm or more, and generally 30 µm or less and preferably 20 µm or less, from the viewpoint of improving the electrical properties, the strong exposure property, the image properties and the repetition property of the electrophotographic photoreceptor, and of improving the applicability during production.

Examples of the particles of a metal oxide used for the undercoat layer include particles of a metal oxide containing one metallic element, such as titanium oxide, aluminum oxide, silicon oxide, zirconium oxide, zinc oxide, and iron oxide, and particles of a metal oxide containing a plurality of metallic elements, such as calcium titanate, strontium titanate, and barium titanate. One kind of these particles may be used alone, or two or more kinds of these particles may be mixed together and used. Among these particles of a metal oxide, titanium oxide and aluminum oxide are preferred, and titanium oxide is particularly preferred. The surface of the titanium oxide particle may be treated with inorganic materials such as tin oxide, aluminum oxide, antimony oxide, zirconium oxide, silicon oxide, or organic materials such as stearic acid, polyol, and silicon. As the crystal form of the titanium oxide particles, any of rutile, anatase, brookite, and amorphous can be used. In addition, a plurality of crystalline states may be included.

Particles of a metal oxide having various particle diameters can be utilized, and from the viewpoint of properties thereof and liquid stability, preferably used of those particles are particles of a metal oxide having an average primary-particle diameter of 10 nm to 100 nm, and particularly preferably 10 nm to 50 nm. The average primary particle diameter can be obtained from a TEM photograph or the like.

The undercoat layer is preferably formed so as to contain a binder resin and particles of a metal oxide dispersed therein. Examples of the binder resin to be used in the undercoat layer include: an epoxy resin, a polyethylene resin, a polypropylene resin, an acrylic resin, a methacrylic resin, a polyamide resin, a vinyl chloride resin, a vinyl acetate resin, a phenol resin, a polycarbonate resin, a polyurethane resin, a polyimide resin, a vinylidene chloride resin, a polyvinyl acetal resin, a vinyl chloride-vinyl acetate copolymer, a polyvinyl alcohol resin, a polyurethane resin, a polyacrylic resin, a polyacrylamide resin, a polyvinylpyrrolidone resin, a polyvinylpyridine resin, a water-soluble polyester resin, a cellulose ester resin such as nitrocellulose, a cellulose ether resin, a casein, a gelatin, a polyglutamic acid, starch, starch acetate, amino starch, organic zirconium compounds such as zirconium chelate compounds and zirconium alkoxide compounds, organic titanyl compounds such as titanyl chelate compounds and titanium alkoxide compounds, a silane coupling agent or the like, which are known binder resins.

One selected from these may be used alone, or two or more selected from these may be used in any desired combination and in any desired proportion.

In addition, these resins may be used together with a curing agent to come into a hardened state. Among them, alcohol-soluble copolymerized polyamides, modified polyamides, and the like are preferred because of the excellent dispersibility and coating properties they exhibit.

The ratio of inorganic particles to be used relative to the binder resin used for the undercoat layer can be optionally selected, and the ratio is preferably in a range of 10% by mass to 500% by mass relative to the binder resin, from the viewpoint of the stability and applicability of the dispersion.

<Photosensitive Layer>

Types of the photosensitive layer include: a single-layer type in which a charge generation substance and a charge transport substance are present on the same layer, and are dispersed in a binder resin; and a function separation type (lamination-type) formed of two layers of a charge generation layer in which the charge generation substance is dispersed in the binder resin and a charge transport layer in which the charge transport substance is dispersed in the binder resin, and any of two types of the photosensitive layers may be used. Examples of the lamination-type photosensitive layer include a normal lamination-type photosensitive layer in which the charge generation layer and the charge transport layer are laminated and disposed in this order from the conductive support side, and a reverse lamination-type photosensitive layer in which the charge transport layer and the charge generation layer are laminated and disposed in this order from the conductive support side. Either type can be employed, and the normal lamination-type photosensitive layer is preferred because this type can exhibit an especially well balanced photoconductivity.

[Charge Generation Layer-Lamination Type]

In a case of the lamination-type photoreceptor (function separation type photoreceptor), the charge generation layer is formed by binding the charge generation substance with the binder resin. The thickness thereof is generally in a range of 0.1 μm or more, and preferably 0.15 μm or more, and is generally in a range of 10 μm or less, and preferably 0.6 μm or less.

Examples of the charge generation substance include: selenium and alloys thereof; inorganic photoconductive materials such as cadmium sulfide; and organic photoconductive materials such as organic pigments. Preferred of these are organic photoconductive materials, and particularly preferred are organic pigments.

Examples of the organic pigments include phthalocyanine pigments, azo pigments, dithioketopyrrolopyrrole pigments, squalene (squarylium) pigments, quinacridone pigments, indigo pigments, perylene pigments, polycyclic quinone pigments, anthanthrone pigments, and benzimidazole pigments. Particularly preferred of these organic pigments are phthalocyanine pigments and azo pigments. In the case of using any of these organic pigments as the charge generation substance, the organic pigment is used generally in the form of a dispersion layer in which fine particles thereof have been bound with any of various binder resins.

In a case where a metal-free phthalocyanine compound or a metal-containing phthalocyanine compound is used as the charge generation substance, a photoreceptor can be obtained, which has a high sensitivity relative to a laser beam having a relatively long wavelength, for example, a laser beam having a wavelength in the vicinity of 780 nm.

In addition, in a case of using an azo pigment such as monoazo, diazo, and trisazo, a photoreceptor can be obtained, which has sufficient sensitivity relative to white light, a laser beam having a wavelength in the vicinity of 660 nm, or a laser beam having a relatively short wavelength (for example, a laser beam having a wavelength in the vicinity of 450 nm or 400 nm).

In a case of using an organic pigment as the charge generation substance, a phthalocyanine pigment or an azo pigment is particularly preferred. The phthalocyanine pigment is excellent from the viewpoint of obtaining a photoreceptor highly sensitive to laser light having a relatively long wavelength, and the azo pigment is excellent from the viewpoint of having sufficient sensitivity to white light and laser light having a relatively short wavelength.

In a case where a phthalocyanine pigment is used as the charge generation substance, specific examples thereof include metal-free phthalocyanine, metal such as copper, indium, gallium, tin, titanium, zinc, vanadium, silicon, germanium, and aluminum, those having crystal forms of coordinated phthalocyanines such as halides, hydroxides, and alkoxides, and phthalocyanine dimers using an oxygen atom or the like as a bridge atom. Particularly preferred are X-form and τ-form metal-free phthalocyanines, A-form (also called β-form), B-form (also called α-form), D-form (also called Y-form), or the like of titanyl phthalocyanines (other name: oxytitanium phthalocyanines), vanadyl phthalocyanines, chloroindium phthalocyanines, hydroxyindium phthalocyanines, II-form or the likes of chlorogallium phthalocyanines, V-form or the like of hydroxygallium phthalocyanines, G-form, I-form, or the likes of μ-oxo-gallium phthalocyanine dimers, and II-form or the likes of t-oxo-aluminum phthalocyanine dimers, which are crystal forms having high sensitivity.

Particularly preferred of these phthalocyanines are A-form (also called β-form) and B-form (also called α-form) titanyl phthalocyanines, D-form (Y-form) titanyl phthalocyanine characterized by showing a distinct peak at a diffraction angle 2θ (±0.20) of 27.1° or 27.3° in X-ray powder diffractometry, II-form chlorogallium phthalocyanine, V-form hydroxygallium phthalocyanine, the hydroxygallium phthalocyanine characterized by having a most intense peak at 28.1° or characterized by having no peak at 26.2°, having a distinct peak at 28.1°, and having a half-value width W at 25.9° of 0.10≤W≤0.4°, and a G-form g-oxo-gallium phthalocyanine dimer. Among these, D-form (Y-form) titanyl phthalocyanine is preferred because of good sensitivity thereof.

A single phthalocyanine compound may be used alone, or a mixture of several phthalocyanine compounds or a phthalocyanine compound in a mixed-crystal state may be used. The state in which phthalocyanine compounds are mixed or the mixed-crystal state may be one obtained by mixing the constituent elements later, or may be one formed in steps for phthalocyanine compound production and treatments, such as synthesis, pigment formation, and crystallization. Such treatments as known include an acid paste treatment, a grinding treatment, a solvent treatment, or the like. Examples of methods for producing a mixed-crystal state include a method in which two kinds of crystals are mixed together and the resultant mixture is mechanically ground and made amorphous and is then subjected to a solvent treatment, thereby converting into a specific crystalline state, as described in JP-A-H10-48859.

The binder resin used for the charge generation layer is not particularly limited. Examples thereof include insulating resins such as a polyvinyl acetal resin, for example, a polyvinyl butyral resin, a polyvinyl formal resin, and a partly acetalized polyvinyl butyral resin in which the butyral moieties have been partly modified with formal, acetal, or the like, a polyarylate resin, a polycarbonate resin, a polyester resin, a modified ether-type polyester resin, a phenoxy resin, a polyvinyl chloride resin, a polyvinylidene chloride resin, a polyvinyl acetate resin, a polystyrene resin, an acrylic resin, a methacrylic resin, a polyacrylamide resin, a polyamide resin, a polyvinylpyridine resin, a cellulosic resin, a polyurethane resin, an epoxy resin, a silicon resin, a polyvinyl alcohol resin, a polyvinylpyrrolidone resin, casein, copolymers based on vinyl chloride and vinyl acetate, for example, vinyl chloride/vinyl acetate copolymers, hydroxy-modified vinyl chloride/vinyl acetate copolymers, carboxyl-modified vinyl chloride/vinyl acetate copolymers, and vinyl chloride/vinyl acetate/maleic anhydride copolymers, styrene/butadiene copolymers, vinylidene chloride/acrylonitrile copolymers, styrene-alkyd resins, silicon-alkyd resins, and phenol-formaldehyde resins; and organic photoconductive polymers such as poly-N-vinylcarbazole, polyvinylanthracene, and polyvinylperylene. Any one of these binder resins may be used alone, or any combination of two or more thereof may be used as a mixture thereof.

In the charge generation layer, regarding the mixing ratio (the mass ratio) of the charge generation substance to the binder resin, the charge generation substance is generally 10 parts by mass or more, preferably 30 parts by mass or more, and is generally 1,000 parts by mass or less, preferably 500 parts by mass or less, based on 100 parts by mass of the binder resin.

[Charge Transport Layer-Lamination Type]

The charge transport layer of the lamination-type photoreceptor contains a charge transport substance and generally contains a binder resin and other components which are used as necessary. The charge transport layer may be formed of a single layer or may be formed by laminating a plurality of layers having different constituent components and composition ratios. The thickness thereof is generally 5 μm to 50 μm, and preferably 10 μm to 45 μm.

The charge transport substance is not particularly limited, and any substance can be used. Examples of the charge transport substance include an electron withdrawing substance such as an aromatic nitro compound such as 2,4,7-trinitrofluorenone, a cyano compound such as tetracyanoquinodimethane, and a quinone compound such as diphenoquinone, an electron-donating substance such as a heterocyclic compound such as a carbazole derivative, an indole derivative, an imidazole derivative, an oxazole derivative, a pyrazole derivative, a thiadiazole derivative, and a benzofuran derivative, an aniline derivative, a hydrazone derivative, an aromatic amine derivative, a stilbene derivative, a butadiene derivative, an enamine derivative, a substance in which plural types of these compounds bind, and a polymer having a group composed of these compounds in a main chain or a side chain.

Among these, a carbazole derivative, an aromatic amine derivative, a stilbene derivative, a butadiene derivative, an enamine derivative, and a substance where plural kinds of these compounds bind, are preferred. These charge transport substances may be used alone or several substances may be used in combination.

Specific examples of the preferred structure of the charge transport substance are as follows.

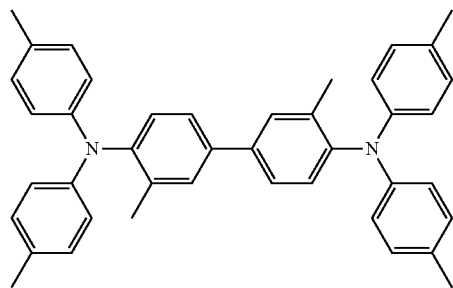

HTM1

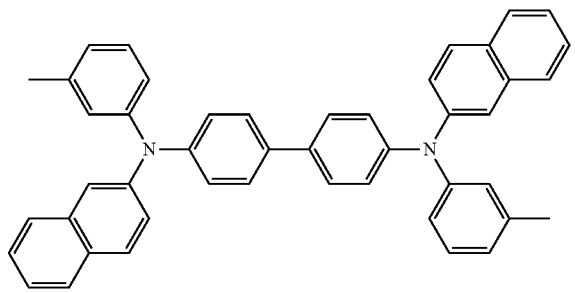

HTM2

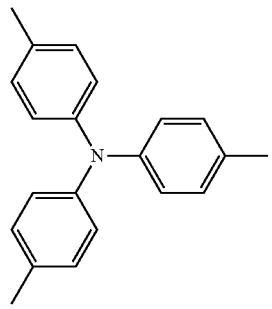

HTM3

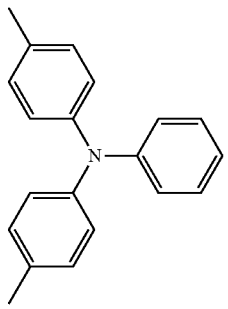

HTM4

-continued
HTM5
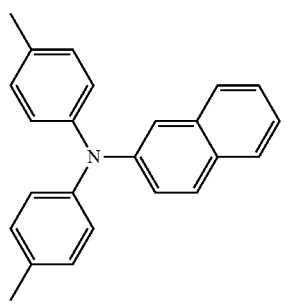
HTM6
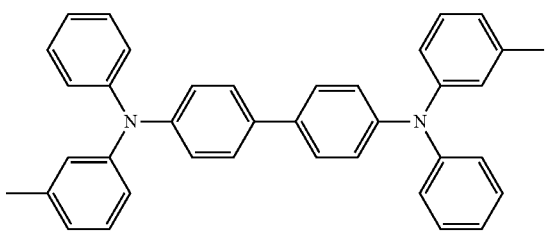
HTM7
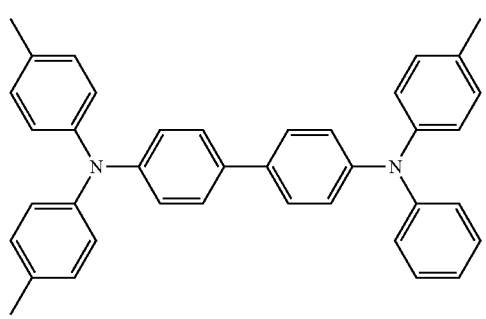
HTM8
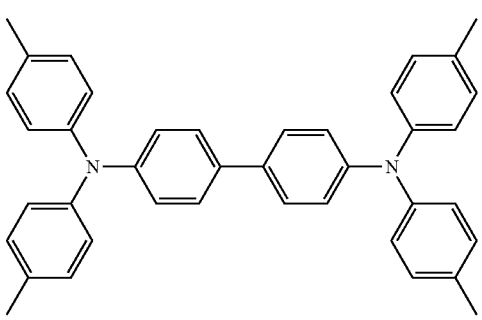
HTM9
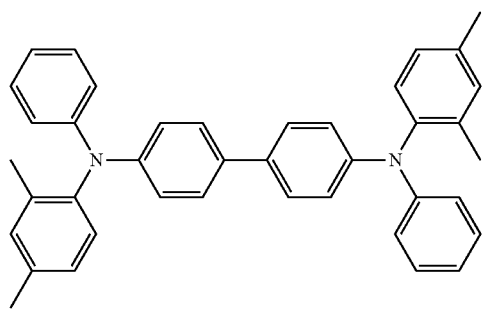
HTM10
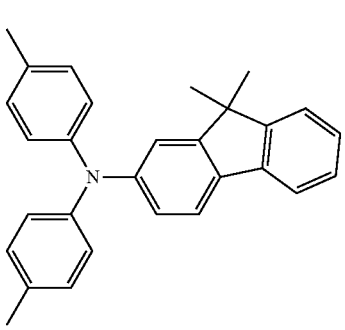
HTM11
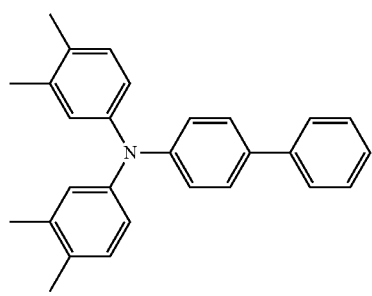
HTM12
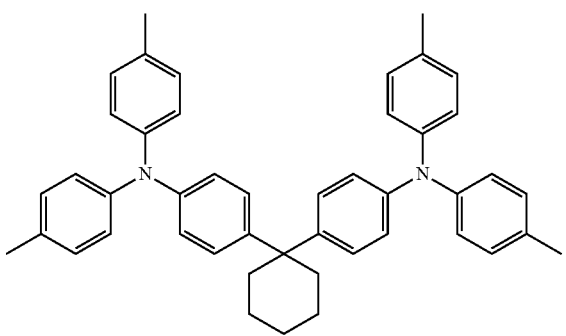
HTM13
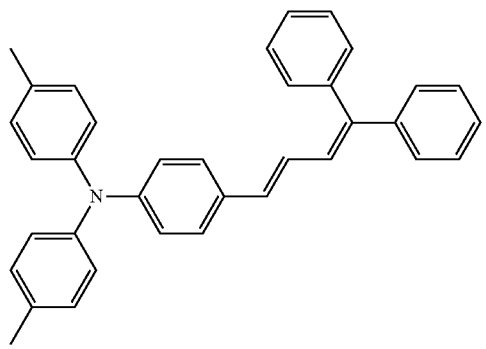
HTM14

-continued
HTM15
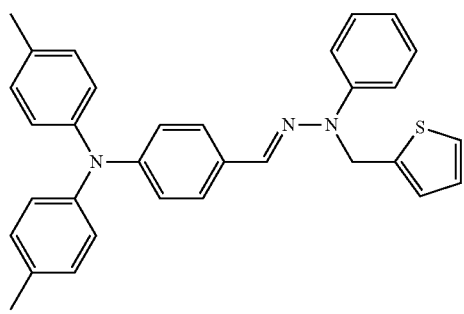
HTM16
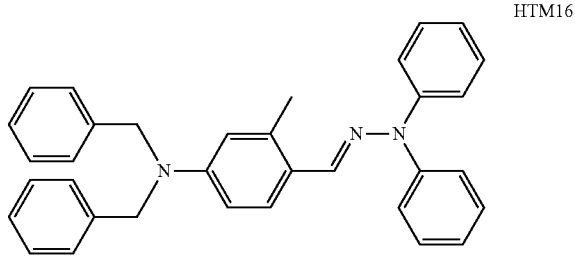
HTM17
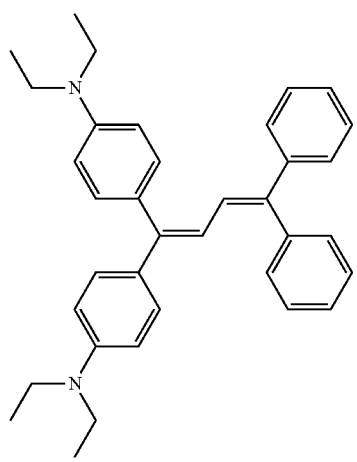
HTM18
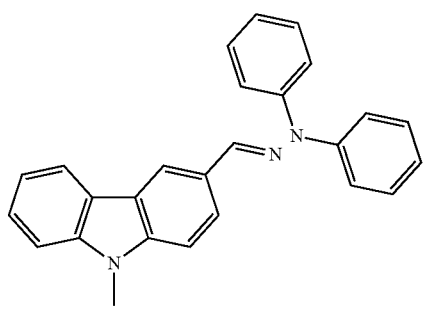
HTM19
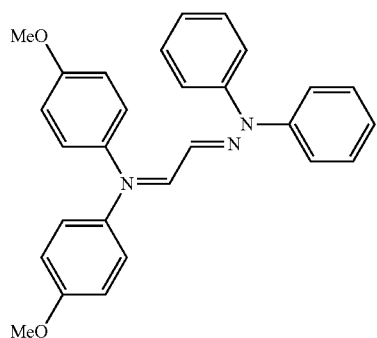
HTM20
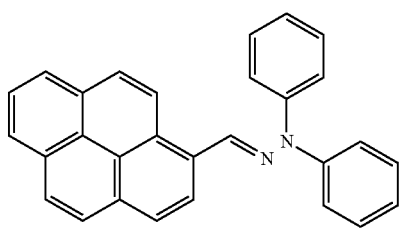
HTM21
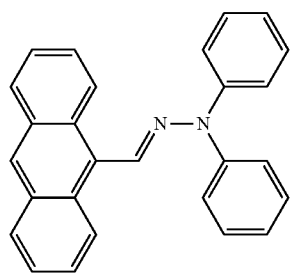
HTM22
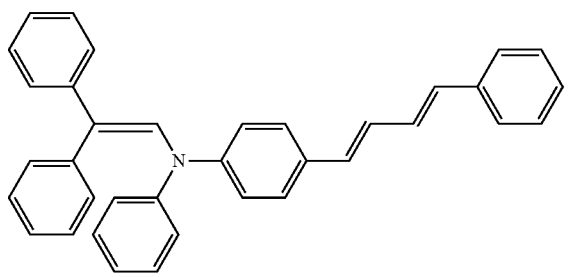

HTM23
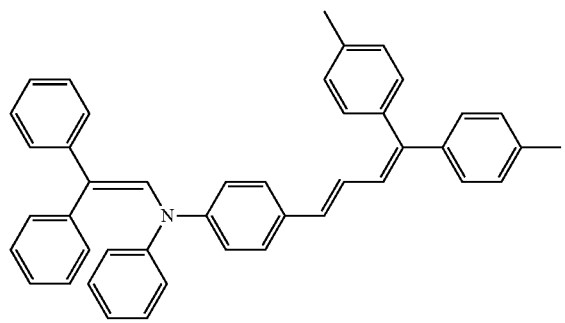
HTM24
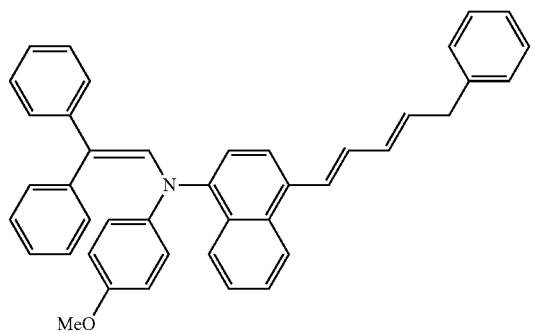
HTM25
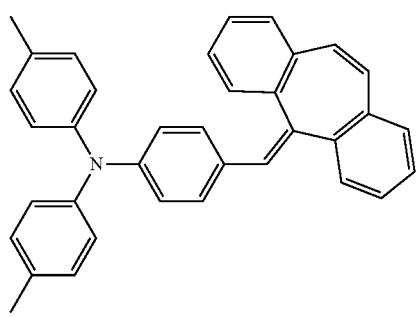
HTM26
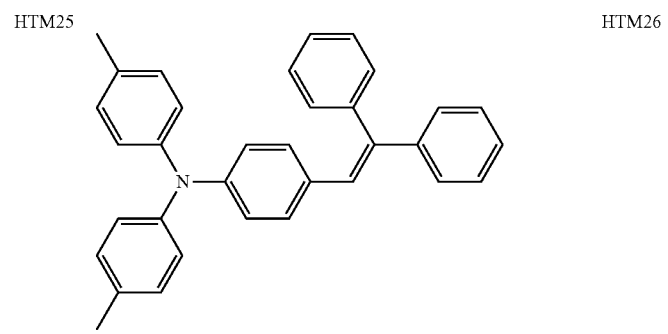
HTM27
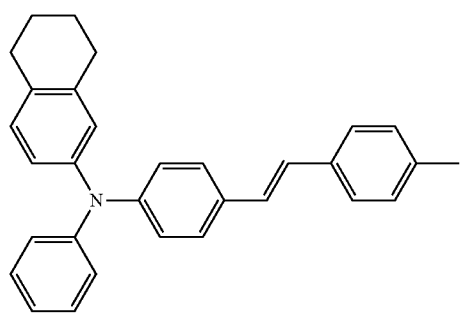
HTM28
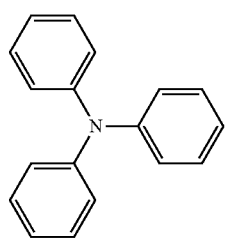
HTM29
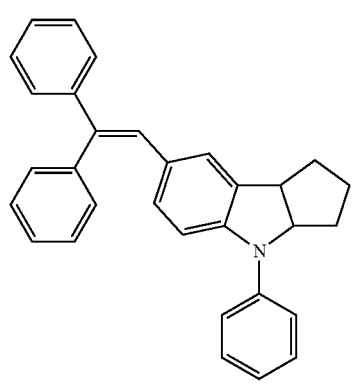
HTM30
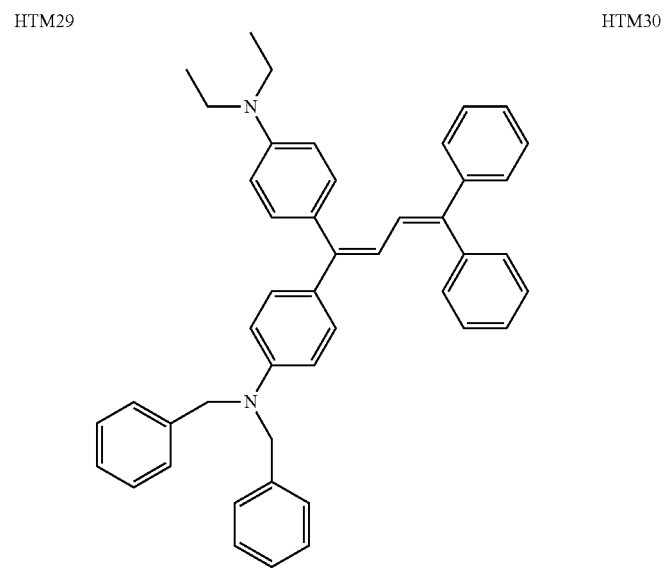

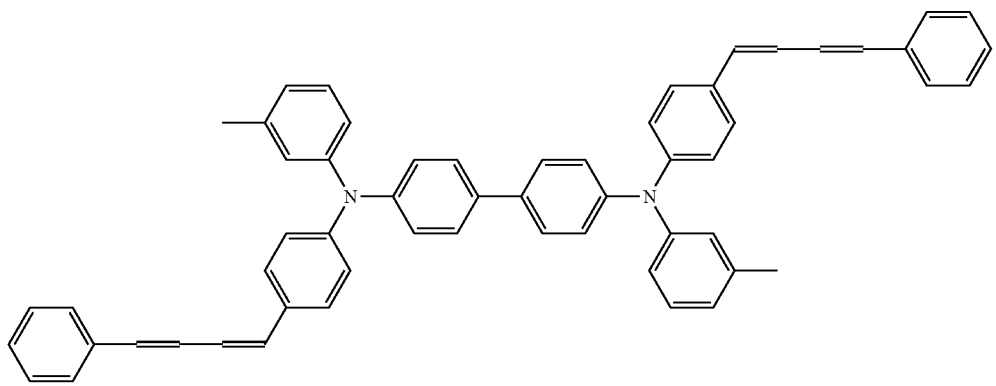
HTM31
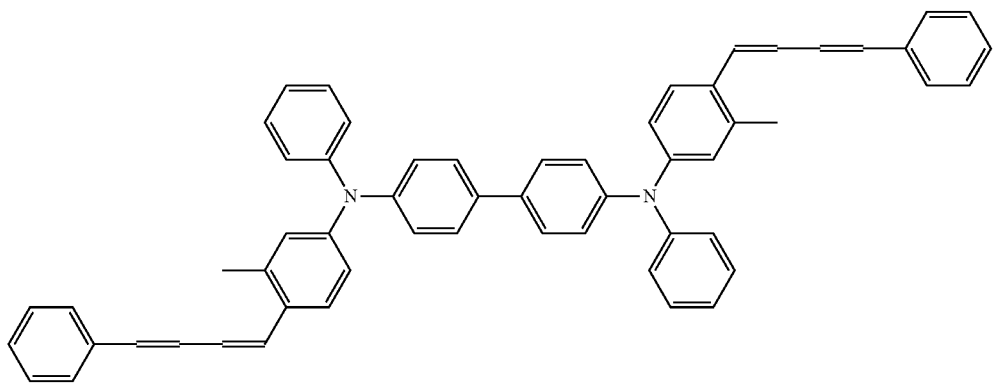
HTM32
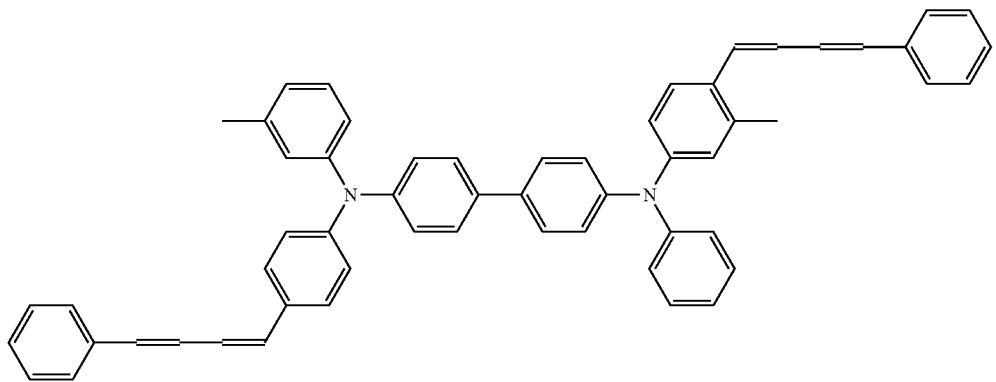
HTM33
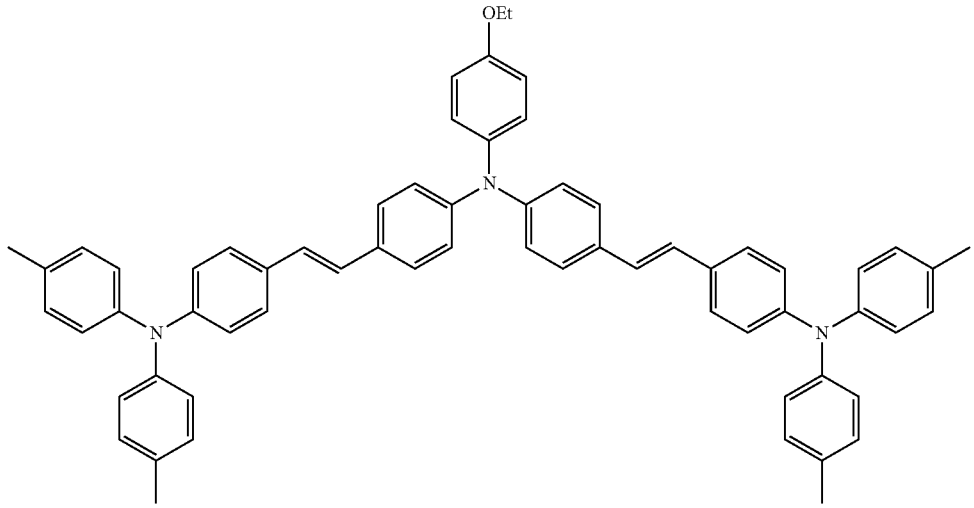
HTM34

HTM35
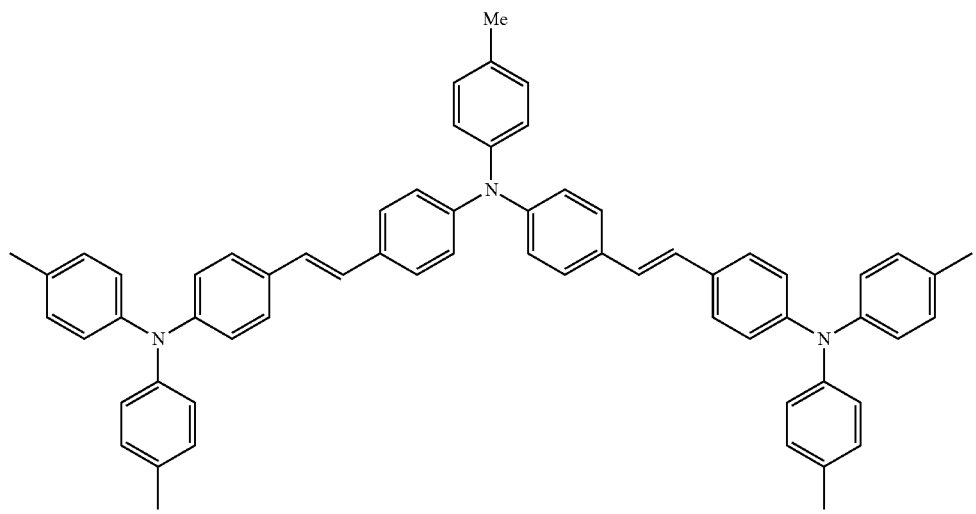
HTM36
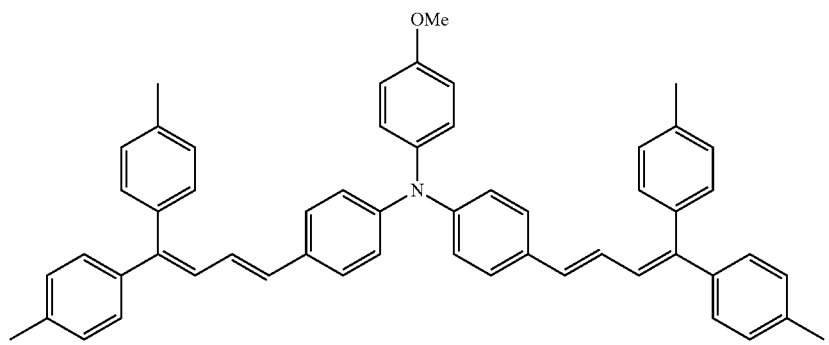
HTM37
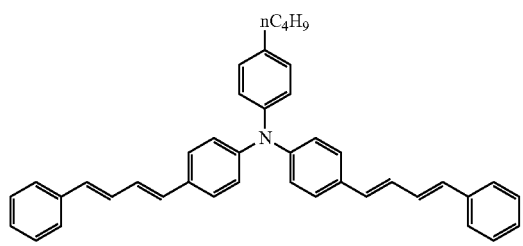
HTM38
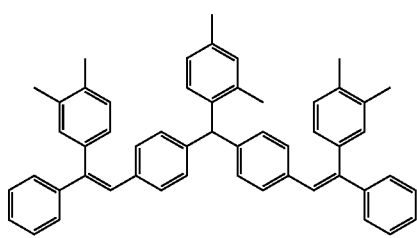
HTM39
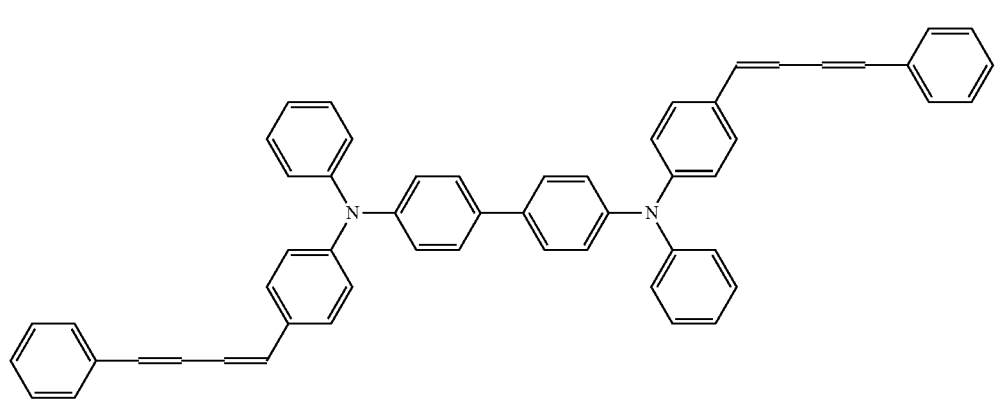

-continued
HTM40
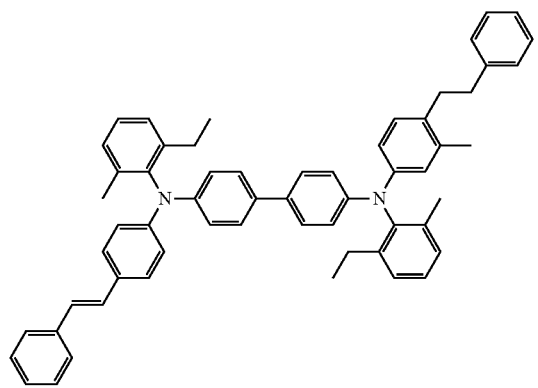
HTM41
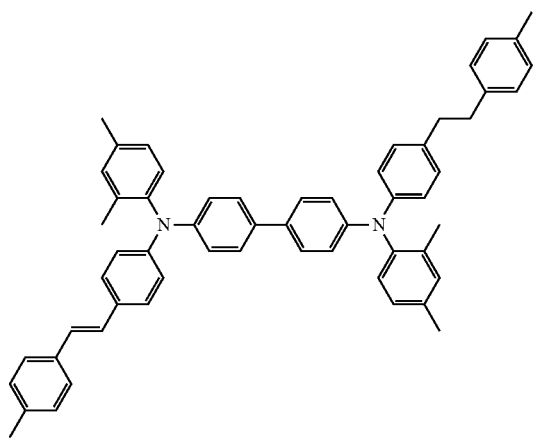
HTM42
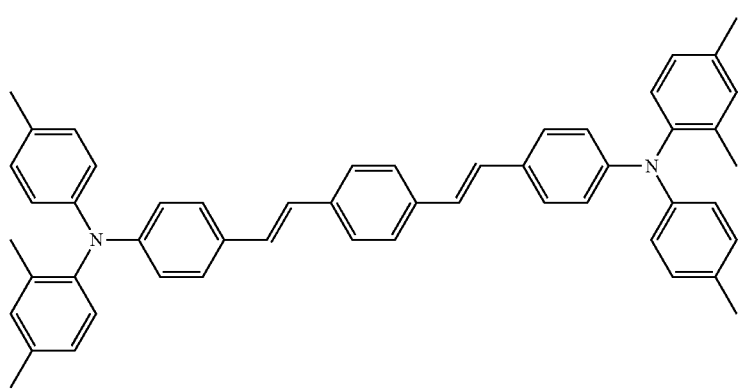
HTM43
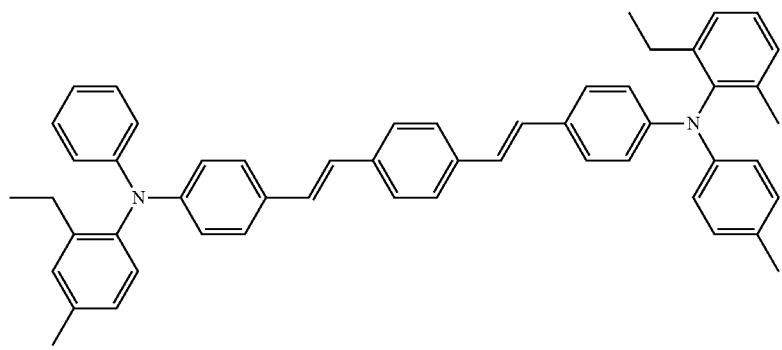
HTM44
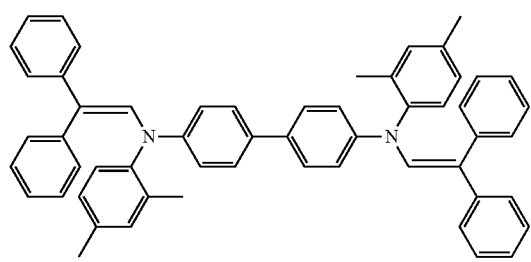
HTM45
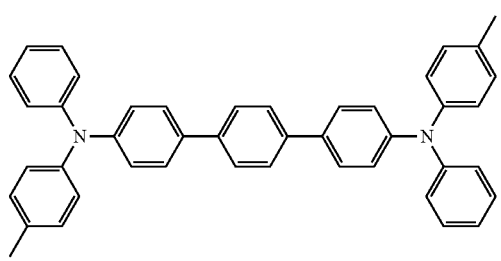

-continued

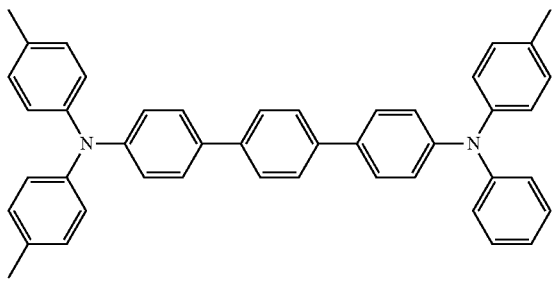
HTM46

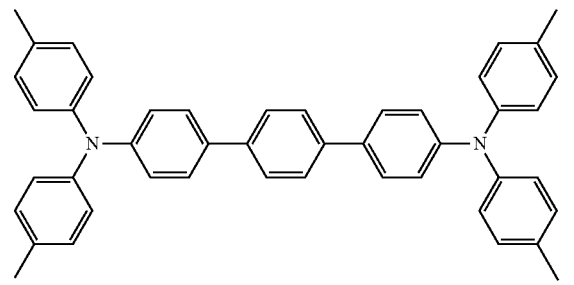
HTM47

The charge transport layer is formed by binding a charge transport substance or the like with a binder resin. Examples of the binder resin include vinyl polymers, such as polymethyl methacrylate, polystyrene and polyvinyl chloride, and a copolymer thereof; and thermoplastic resins and various thermosetting resins such as a polycarbonate resin, a polyester resin, a polyester polycarbonate resin, a polysulfone resin, a phenoxy resin, an epoxy resin, and a silicone resin. Among these resins, polycarbonate resins or polyester resins are preferred from the viewpoint of light attenuation properties and mechanical strength of a photoreceptor.

Specific examples of the repeating structural unit suitable for the binder resin are shown below. These specific examples are shown for illustrative purposes, and any known binder resin may be mixed and used as long as it does not depart from the spirit of the present invention.

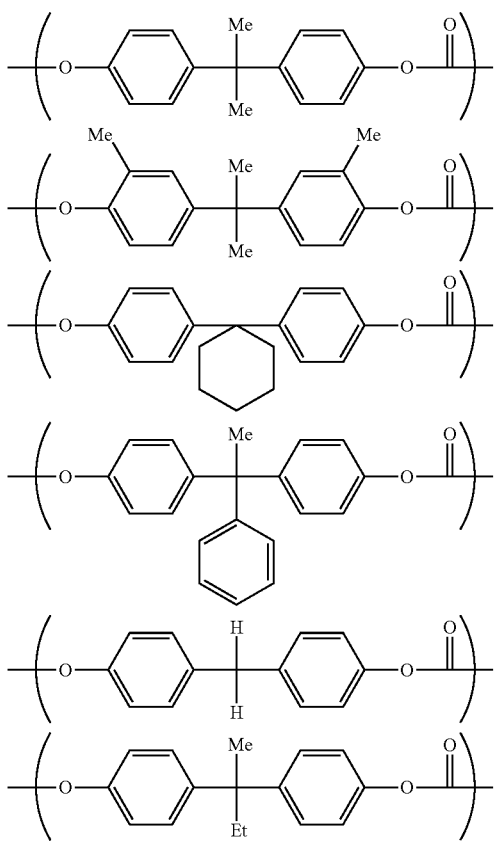

-continued

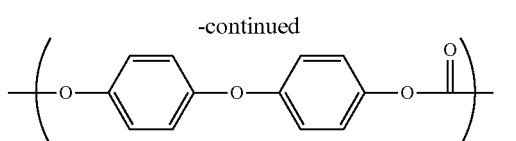

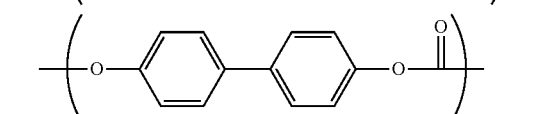

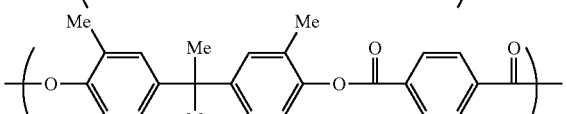

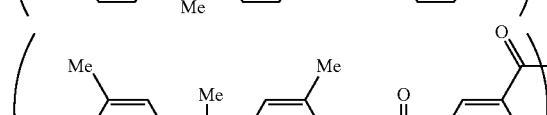

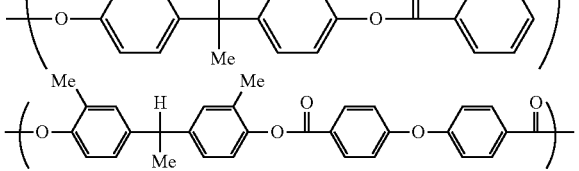

The viscosity-average molecular weight of the binder resin is generally 20,000 or more, preferably 30,000 or more, and more preferably 40,000 or more, from the viewpoint of mechanical strength. In addition, the viscosity-average molecular weight of the binder resin is generally 150,000 or less, preferably 120,000 or less, and more preferably 100,000 or less, from the viewpoint of preparation of coating liquid for photosensitive layer formation.

The ratio of the charge transport substance to the entire binder resin is generally 10 parts by mass or more based on 100 parts by mass of the binder resin in the same layer. Among these, 20 parts by mass or more is preferred from the viewpoint of reducing residual potential, and 30 parts by mass or more is more preferred from the viewpoint of stability and charge mobility when repeatedly used. On the other hand, the charge transport substance is generally used in an amount of 150 parts by mass or less, and preferably 120 parts by mass or less from the viewpoint of thermal stability of the photosensitive layer. Among these, 100 parts by mass or less is preferred from the viewpoint of compatibility between the charge transport substance and the binder resin, and 80 parts by mass or less is still more preferred from the viewpoint of abrasion resistance.

The content of the polymer contained in the charge transport layer is generally 0.001 part by mass or more, preferably 0.01 part by mass or more, and more preferably 0.1 part by mass or more relative to 100 parts by mass of the binder resin. On the other hand, the content of the polymer is generally 10 parts by mass or less, preferably 5 parts by mass or less, and more preferably 3 parts by mass or less. When the content is within the above range, good electrical properties and a smooth coating film are obtained.

In a case where the fluororesin particles are used, the types of the fluororesin contained in the charge transport layer are the same as those mentioned in "Fluororesin and Dispersion thereof". The content of the fluororesin contained in the charge transport layer is generally 1 part by mass or more, and is preferably 3 parts by mass or more and more preferably 5 parts by mass or more from the viewpoint of slipperiness and abrasion resistance, based on 100 parts by mass of binder resins. On the other hand, the content of the fluororesin is generally 30 parts by mass or less, and is preferably 25 parts by mass or less from the viewpoint of the stability of the coating liquid and electrical properties.

The content of the polymer according to the present invention contained in the charge transport layer is generally 0.01 part by mass or more, and is preferably 0.05 part by mass or more and more preferably 0.1 part by mass or more from the viewpoint of dispersibility, based on 100 parts by mass of the binder resin. On the other hand, the content of the polymer is generally 3 parts by mass or less, and is preferably 2 parts by mass or less from the viewpoint of electrical properties.

The charge transport layer may contain additives such as a plasticizer, an antioxidant, an ultraviolet absorber, an electron-withdrawing compound, a dye, a pigment, and a leveling agent which are well known, so as to improve the film forming property, flexibility, applicability, stain resistance, gas resistance, and light resistance. Examples of the antioxidant include hindered phenolic compounds, hindered amine compounds, or the like. In addition, examples of the dye and the pigment include various dye compounds, azo compounds, or the like.

The molecular weight of the plasticizer is preferably 150 or more, more preferably 170 or more, and still more preferably 200 or more. On the other hand, the molecular weight of the plasticizer is preferably 400 or less, more preferably 380 or less, and still more preferably 350 or less. When the molecular weight is within the above range, crack resistance and gas resistance can be improved due to the compatibility with the binder resin while sublimation during film formation/drying can be prevented.

These plasticizers may be used alone or in combination. Specific examples of the preferred structure of the plasticizer are shown below.

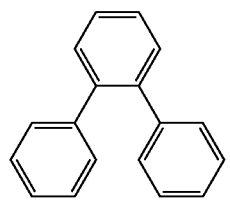

AD-1

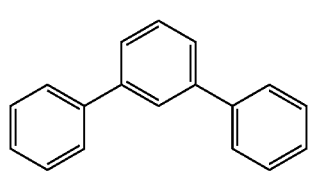

AD-2

-continued

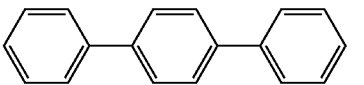

AD-3

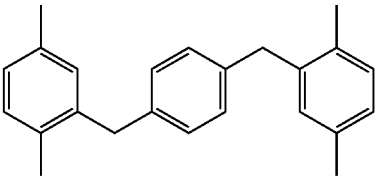

AD-4

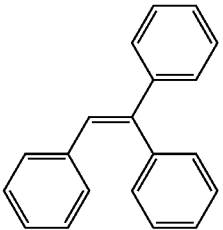

AD-5

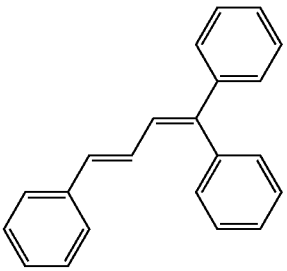

AD-6

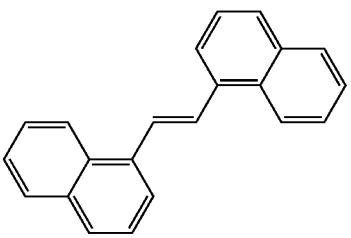

AD-7

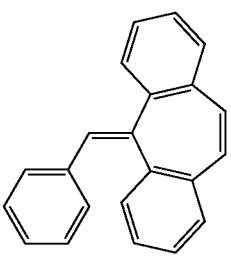

AD-8

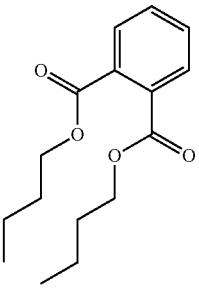

AD-9

-continued

AD-10

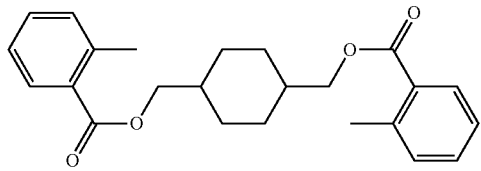

AD-11

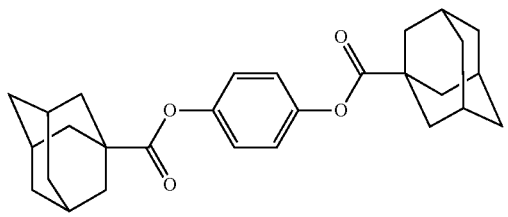

AD-12

AD-13

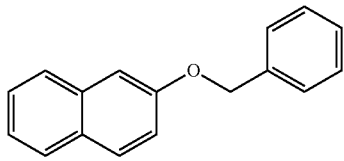

AD-14

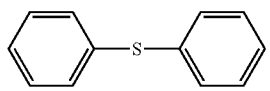

Among these plasticizers, preferred are AD-2, AD-4, AD-5, AD-6, AD-8, AD-10, AD-11, and AD-13, and more preferred are AD-2, AD-6, AD-8, AD-10, AD-11, and AD-13. With the above plasticizers, gas resistance and crack resistance can be improved without deteriorating electrical properties.

Examples of the antioxidant include a hindered phenol compound, a hindered amine compound, trialkyl amines, dialkyl aryl amines, or the like. In addition, examples of the dye and the pigment include various dye compounds, azo compounds, or the like.

The charge transport layer may contain inorganic particles such as alumina and silica, and organic particles such as silicone particles, polyethylene particles, crosslinked polystyrene particles, and crosslinked (meth)acrylate particles, for the purpose of reducing the frictional resistance and abrasion of the surface of the photoreceptor and increasing the transfer efficiency of the toner from the photoreceptor to the transfer belt or paper.

<Single-layer Type Photosensitive Layer>

In addition to the charge generation substance and the charge transport substance, the single-layer type photosensitive layer is formed by using a binder resin in order to ensure the film strength similar to the charge transport layer of the lamination-type photoreceptor. Specifically, the single-layer type photosensitive layer can be obtained by dissolving or dispersing the charge generation substance, the charge transport substance and various binder resins in a solvent to prepare a coating liquid, and applying the coating liquid onto a conductive support (onto an undercoat layer in a case where the undercoat layer is disposed) to dry. It is preferable to use a positive hole transport substance and an electron transport substance in combination as the charge transport substance. The charge transport substance exemplified in the charge transport layer can be used as the positive hole transport substance, and a diphenoquinone compound or a dinaphthoquinone compound can be used as the electron transport substance.

The types of the charge transport substance and the binder resin and the use ratio thereof are the same as those described for the charge transport layer of the lamination-type photoreceptor. A charge generation substance is further dispersed in a charge transport medium containing the charge transport substance and the binder resin. In the case of the photosensitive layer of the single-layer type photoreceptor, it is necessary to sufficiently reduce the particle diameter of the charge generation substance. Specifically, the particle diameter is generally in a range of 1 µm or less, and preferably 0.5 µm or less.

When the amount of the charge generation substance dispersed in the single-layer type photosensitive layer is excessively small, sufficient sensitivity cannot be obtained; on the other hand, when it is excessively large, there are adverse effects such as deterioration of the charging property and a decrease in sensitivity, and thereby the amount is generally 0.5% by mass or more, preferably 1% by mass or more, and is generally 50% by mass or less, preferably 20% by mass or less, based on the entire single-layer type photosensitive layer.

Regarding the ratio of the charge generation substance to the binder resin to be used in the single-layer type photosensitive layer, the charge generation substance is generally 0.1 part by mass or more, preferably 1 part by mass or more, and is generally 30 parts by mass or less, preferably 10 parts by mass or less, based on 100 parts by mass of binder resins.

The thickness of the single-layer type photosensitive layer is generally in a range of 5 µm or more, preferably 10 µm or more, and is in a range of generally 100 µm or less, preferably 50 µm or less. Also in this case, known plasticizers for improving film forming property, flexibility, mechanical strength, or the like, additives for suppressing residual potential, dispersion aids for improving dispersion stability, leveling agents for improving applicability, surfactants, silicone oil and a fluorine-based oil, and other additives may be added.

<Other Functional Layers>

Both the lamination-type photoreceptor and the single-layer type photoreceptor may contain additives such as known antioxidants, plasticizers, ultraviolet absorbers, electron withdrawing compounds, leveling agents, and visible light blocking agents in the photosensitive layer or each layer constituting the photosensitive layer, so as to improve the film forming property, flexibility, applicability, stain resistance, gas resistance, and light resistance. In addition, the surface layer may contain silicone resins and polyethylene resins, or particles of these resins and particles of inorganic compounds, for the purpose of reducing the frictional resistance and abrasion of the surface of the photoreceptor and increasing the transfer efficiency of the toner from the photoreceptor to the transfer belt or paper. Alternatively, an overcoat layer may be formed, which is a surface layer newly formed of a layer containing these resin particles, the polymer according to the present invention and fluororesin particles. Further, if necessary, an intermediate layer such as a barrier layer, an adhesive layer, a blocking layer, layers for improving electrical properties and mechanical properties, such as a transparent insulating layer, or the like may be provided.

<Methods for Forming Each Layer>

Each layer that constitutes the above-described photoreceptor may be formed by repeatedly and successively performing application and drying steps, in which a coating liquid, which is obtained by dissolving or dispersing, in a solvent, substances to be contained, is applied to a conductive support by a known method in order, such as dip coating, spray coating, nozzle coating, bar coating, roll coating, or blade coating, and dried to form each layer.

Solvents or dispersion medium to be used in preparation of the coating liquid is not particularly limited, and specific examples thereof include alcohols such as methanol, ethanol, propanol, and 2-methoxyethanol; ethers such as tetrahydrofuran, 1,4-dioxane, and dimethoxyethane; esters such as methyl formate and ethyl acetate; ketones such as acetone, methyl ethyl ketone and cyclohexanone; aromatic hydrocarbons such as benzene, toluene and xylene; chlorinated hydrocarbons such as dichloromethane, chloroform, 1,2-dichloroethane, 1,1,2-trichloroethane, 1,1,1-trichloroethane, tetrachloroethane, 1,2-dichloropropane, and trichlorethylene; nitrogen-containing compounds such as n-butylamine, isopropanolamine, diethylamine, triethanolamine, ethylene diamine, and triethylenediamine; aprotic polar solvents such as acetonitrile, N-methyl pyrrolidone, N,N-dimethylformamide, and dimethyl sulfoxide.

Among these solvents, non-halogen solvents are preferred from the viewpoint of environmental consideration, and toluene, xylene, anisole, dimethoxyethane, tetrahydrofuran and 1,4-dioxane are particularly preferred from the viewpoint of solubility. Any one selected from these may be used alone, and two or more selected from these may be used in combination.

Although the amount of the solvent or dispersion medium to be used is not particularly limited, the amount thereof is preferably adjusted, as appropriate, in accordance with the intended purpose of each layer and nature of the selected solvent and dispersion media, so as to set properties such as the solid content concentration or viscosity of the coating liquid, to be in desired ranges.

For example, in a case of a charge transport layer of a single-layer type photoreceptor and a function separation type photoreceptor, the solid content concentration of the coating liquid is generally in a range of 5% by mass or more, preferably 10% by mass or more, and is generally in a range of 40% by mass or less, preferably 35% by mass or less. In addition, the viscosity of the coating liquid is generally 10 cps or more, preferably 50 cps or more, and is generally 500 cps or less, preferably 400 cps or less.

In addition, in a case of a charge generation layer of a limitation-type photoreceptor, the solid content concentration of the coating liquid is generally in a range of 0.1% by mass or more, preferably 1% by mass or more, and is generally in a range of 15% by mass or less, preferably 10% by mass or less. In addition, the viscosity of the coating liquid is generally 0.01 cps or more, preferably 0.1 cps or more, and is generally 20 cps or less, preferably 10 cps or less.

Examples of a method for applying the coating liquid include a dip coating method, a spray coating method, a spinner coating method, a bead coating, a wire bar coating method, a blade coating method, a roller coating method, an air-knife coating method, a curtain coating method, or the like, and other known coating methods can also be used.

Regarding the drying of the coating liquid, it is preferable that after a touch drying at room-temperature, the coating liquid is dried with heating in a temperature range of, generally, 30° C. to 200° C. for 1 minute to 2 hours either in a stationary atmosphere or with air blowing. The heating temperature may be constant, or the heating for drying may be performed while changing the heating temperature.

2. Electrophotographic Photoreceptor Cartridge and Image Forming Apparatus

Next, an embodiment of an electrophotographic photoreceptor cartridge and an image forming apparatus (an image forming apparatus according to the present invention) including the electrophotographic photoreceptor according to the present invention will be described with reference to FIG. 1 showing the main configuration of the apparatus. However, embodiments of the present invention are not limited to the following description, and the embodiments can be freely modified and implemented without departing from the spirit and scope of the present invention.

The present invention provides an image forming apparatus which include the electrophotographic photoreceptor, a charging device which charges the electrophotographic photoreceptor, an exposure device which exposes the charged electrophotographic photoreceptor to form an electrostatic latent image, and a developing device which develops the electrostatic latent image formed on the electrophotographic photoreceptor.

FIG. 1 shows an example of such an image forming apparatus. The image forming apparatus in FIG. 1 includes an electrophotographic photoreceptor 1, a charging device 2, an exposure device 3, and a developing device 4, and may further include, as necessary, a transfer device 5, a cleaning device 6, and a fixing device 7.

The electrophotographic photoreceptor 1 is not particularly limited as long as it is an electrophotographic photoreceptor according to the present invention. FIG. 1 shows, as an example thereof, a drum-shaped photoreceptor in which the above-described photosensitive layer is formed on a surface of a cylindrical conductive support. The charging device 2, the exposure device 3, the developing device 4, the transfer device 5 and the cleaning device 6 are respectively disposed along an outer peripheral surface of the electrophotographic photoreceptor 1.

In the present invention, one or two or more of the charging device 2, the exposure device 3, the developing device 4, the transfer device 5, the cleaning device 6, and the fixing device 7 may be combined with the electrophotographic photoreceptor 1 to form an integrated cartridge (hereinafter, referred to as "electrophotographic photoreceptor cartridge" as appropriate) so that this electrophotographic photoreceptor cartridge can be mounted on and demounted from the main body of an electrophotographic apparatus such as a copier or a laser-beam printer. In this case, for example, when the electrophotographic photoreceptor 1 and other members are deteriorated, maintenance and management of the image forming apparatus is easier by detaching the electrophotographic photoreceptor cartridge from the main body of the image forming apparatus and attaching another new electrophotographic photoreceptor cartridge to the main body of the image forming apparatus.

The present invention also provides an electrophotographic photoreceptor cartridge including the electrophotographic photoreceptor.

In addition, the present invention also provides an electrophotographic photoreceptor cartridge which includes the electrophotographic photoreceptor, and at least one device selected from the group consisting of a charging device which charges the electrophotographic photoreceptor, an exposure device which exposes the charged electrophotographic photoreceptor to form an electrostatic latent image, and a developing device which develops the electrostatic latent image formed on the electrophotographic photoreceptor.

3. Action/Principle

The above-described polymer according to the present invention is excellent in solubility in organic solvents, excellent in dispersibility of fluororesin particles, and good in electrical properties, so that it is possible to provide an electrophotographic photoreceptor excellent in abrasion resistance and electrical properties.

The reason for the improvement of the solubility and dispersibility is not clear, and the present invention is not limited to the scope of the following action and principle, and is considered as follows.

That is, a macromonomer having a structure represented by the Formula (1) or the like has a special reaction activity and is polymerized with other monomers in a manner similar to a living radical reaction (Literature of Yamada et al.; Journal of Polymer Science: Part A: Polymer Chemistry, Vol. 41, 645-654 (2003)), so that a polymer obtained by using the macromonomer is found to have an surfactant function more excellent than that of other polymers obtained by using a "macromonomer with (meth)acrylate", since a moiety having compatibility with the fluororesin particles and a moiety having compatibility with the organic solvent are respectively localized in the polymer.

The polymer according to the present invention has a small free amount even in the dispersion liquid due to its strong action on the fluororesin particles, so that a coating film having excellent electrical properties can be obtained.

In addition, the electrophotographic photoreceptor containing the polymer according to the present invention and fluororesin particles becomes excellent in the abrasion resistance as an electrophotographic photoreceptor since fluororesin particles are uniformly dispersed in the coating film.

EXAMPLE

The specific embodiment of the present invention will be described in more detail with reference to examples, but the present invention is by no means restricted to the following examples so long as it does not exceed the gist thereof.

<Production of Macromonomer>
<Synthesis of Polymerization Dispersant (I)>

In a polymerization device including a mixer, a cooling tube, and a thermometer, 900 parts by mass of deionized water, 60 parts by mass of sodium 2-sulfoethyl methacrylate, 10 parts by mass of potassium methacrylate, and 12 parts by mass of methyl methacrylate were added and mixed, nitrogen purge was performed in the polymerization device, polymerization temperature was increased to 50° C., 0.08 part by mass of 2,2'-azobis (2-methylpropionamidine) dihydrochloride was added as a polymerization initiator, and further the polymerization temperature was increased to 60° C.

Methyl methacrylate (hereinafter, MMA) was continuously dropped at a rate of 0.24 parts by mass/minute for 75 minutes by using a dropping pump while the polymerization initiator was added, the mixture was maintained at polymerization temperature of 60° C. for six hours, and then the temperature is decreased to room temperature so as to obtain the polymerization dispersant (I). The amount of the solid content of the polymerization dispersant (I) was 10% by mass.

<Synthesize of Chain Transfer Agent (c)>

2.00 g (8.03 mmol) of cobalt acetate (II) tetrahydrate (manufactured by Wako Pure Chemical Corporation, wako special grade), 3.86 g (16.1 mmol) of diphenyl glyoxime (manufactured by TCI Tokyo Chemical Industry, EP grade), and 100 ml of diethyl ether previously deoxygenated by nitrogen bubbling were added to a reactor including a stirrer under a nitrogen atmosphere, and were mixed for two hours at room temperature.

Next, 20 ml of boron trifluoride diethyl ether complex (manufactured by TCI Tokyo Chemical Industry, EP grade) were added to the reactor, and further the mixture was stirred for six hours. The reactant was filtered, and the solid was washed with diethyl ether and dried for 12 hours at 20° C. under 100 MPa or less, so as to obtain 5.02 g of chain transfer agents (c) (7.93 mmol, yield 99% by mass).

<Production Example 1> Production of Macromonomer (1-1)

145 parts by mass of deionized water, 0.1 part by mass of sodium sulfate ($Na_2SO_4$), and 0.25 part by mass of polymerization dispersant (I) (10% by mass of solid content) were added to a polymerization device including a mixer, a cooling tube, and a thermometer and were stirred, so as to obtain a homogeneous aqueous solution.

Next, 100 parts by mass of MMA, 0.0022 part by mass of chain transfer agent (c), and 0.4 part by mass of 1,1,3,3-tetramethylbutylperoxy-2-ethylhexanoate (manufactured by Nof Corporation, trade name: perocta O) were added to the polymerization device, so as to obtain a dispersion liquid.

Thereafter, nitrogen purge was sufficiently performed in the polymerization device, temperature of the dispersion liquid was increased to 80° C. and was maintained for four hours, and further was increased to 92° C. and was maintained for two hours.

Then, the reaction liquid was cooled to have a temperature of 40° C., and a suspension liquid containing the polymer was obtained. The suspension liquid was filtered through a filter cloth, and the filtrate was washed with deionized water and dried at 40° C. for 16 hours to obtain the macromonomer (1-1).

Mw of the macromonomer (1-1) was 6,000, Mn thereof was 3,700, and the average number of repetitions n was 35. The structural formula of the macromonomer (1-1) is shown below.

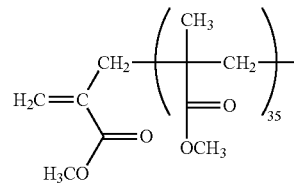

MACROMONOMER (1-1)

<Production Example 2> Production of Macromonomer (1-2)

A macromonomer (1-2) was obtained in the same manner as that in Production Example 1 except that the amount of the chain transfer agent (c) and the amount of perocta O in Production Example 1 was changed to 0.0012 part by mass and 0.27 part by mass respectively. Mw of the macromonomer (1-2) was 12,600, Mn thereof was 5,900, and the average number of repetitions n was 58. The structural formula of the macromonomer (1-2) is shown below.

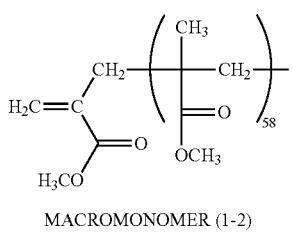

MACROMONOMER (1-2)

Synthesis of Copolymer

<Production Example 3> Production of copolymer (A-1)

50 parts by mass of the macromonomer (1-1) produced in Production Example 1 and 40 parts by mass of butyl acetate were charged in a reactor, and nitrogen purge was performed in the reactor. With flowing nitrogen, the macromonomer (1-1) was heated to 70° C. and was dissolved, then 0.125 part by mass of 2,2'-azobis(2-methylpropionitrile) (manufactured by Tokyo Chemical Industry) (hereinafter, AIBN) was added, and stir was performed for three minutes.

Subsequently, 50 parts by mass of 2-(perfluorohexyl) ethyl acrylate (manufactured by Tokyo Chemical Industry) (hereinafter, described as "fluorine-containing acrylate (3-1)") were dropped over 6.5 hours, and then stir was performed for six hours.

The mixture was diluted with 210 parts by mass of butyl acetate, then the temperature was increased to 90° C., and stir was performed for one hour. Subsequently, the mixture was adjusted with butyl acetate so as to have a solid content concentration of 40% by mass, and a copolymer (A-1) solution was obtained.

When the obtained copolymer solution was partially dried and the weight average molecular weight (Mw) was measured, Mw was 19,100, and Mw/Mn was 2.8.

[Method of Measuring Weight Average Molecular Weight (Mw)]

The produced sample was eluted according to molecular weight by means of a gel permeation chromatography (GPC) (product name of column: TSKGEL, GMH$_{xl}$ manufactured by Tosoh Corporation, temperature 40° C., elution solvent was THF) by which molecules having different molecular weights can be separated, so as to obtain a molecular weight distribution.

A calibration curve was obtained from polystyrene standard substance having known molecular weight in advance, and was compared with the molecular weight distribution of the copolymer, so as to determine a ratio of the weight average molecular weight (Mw) of the copolymer to the number average molecular weight (Mn) thereof (Mw/Mn).

<Production Example 4> Production of Copolymer (A-2)

A copolymer (A-2) solution of 40% by mass was obtained in the same manner as that in Production Example 3 except that "45 parts by mass of macromonomer (1-1) and 55 parts by mass of fluorine-containing acrylate (3-1)" were used instead of "50 parts by mass of macromonomer (1-1) and 50 parts by mass of fluorine-containing acrylate (3-1)".

When the obtained copolymer solution was partially dried and the weight average molecular weight (Mw) was measured, Mw was 24,100, and Mw/Mn was 3.2.

<Production Example 5> Production of Copolymer (A-3)

A copolymer (A-3) solution of 40% by mass was obtained in the same manner as that in Production Example 3 except that "50 parts by mass of macromonomer (1-1) and 50 parts by mass of 2-(perfluorobutyl) ethyl acrylate (hereinafter, referred to as "fluorine-containing acrylate (3-2)" were used instead of "50 parts by mass of macromonomer (1-1) and 50 parts by mass of fluorine-containing acrylate (3-1)".

When the obtained copolymer solution was partially dried and the weight average molecular weight (Mw) was measured, Mw was 44,300, and Mw/Mn was 3.2.

<Production Example 6> Production of Copolymer (A-4)

45 parts by mass of the macromonomer (1-1) and 40 parts by mass of butyl acetate were charged in a reactor, and nitrogen purge was performed in the reactor. With flowing nitrogen, the macromonomer (1-1) was heated to 70° C. and was dissolved, then 0.125 part by mass of AIBN was added, and stir was performed for three minutes.

Subsequently, a mixed liquid of 45 parts by mass of fluorine-containing acrylate (3-1), 5 parts by mass of benzyl acrylate (manufactured by Tokyo Chemical Industry) (hereinafter, (4-1)), and 5 parts by mass of 2-phenoxyethyl acrylate (manufactured by Tokyo Chemical Industry) (hereinafter, (4-2)), which were separately prepared, were dropped over 6.5 hours, and then stir was performed for six hours.

The mixture was diluted with 210 parts by mass of butyl acetate, then the temperature was increased to 90° C., and stir was performed for one hour. Subsequently, the mixture was adjusted with butyl acetate so as to have a solid content concentration of 40% by mass, and a copolymer (A-4) solution was obtained. When the obtained copolymer solution was partially dried and the weight average molecular weight (Mw) was measured, Mw was 41,800, and Mw/Mn was 3.8.

<Production Example 7> Production of Copolymer (A-5)

A copolymer (A-5) solution of 40% by mass was obtained in the same manner as that in Production Example 6 except that "50 parts by mass of macromonomer (1-1), 40 parts by mass of fluorine-containing acrylate (3-1), 5 parts by mass of (4-1), and 5 parts by mass of (4-2)" were used instead of "45 parts by mass of macromonomer (1-1), 45 parts by mass of fluorine-containing acrylate (3-1), 5 parts by mass of (4-1), and 5 parts by mass of (4-2)".

When the obtained copolymer solution was partially dried and the weight average molecular weight (Mw) was measured, Mw was 42,000, and Mw/Mn was 3.5.

<Production Example 8> Production of Copolymer (A-6)

A copolymer (A-6) solution of 40% by mass was obtained in the same manner as that in Production Example 7 except that "50 parts by mass of macromonomer (1-2)" was used instead of "50 parts by mass of macromonomer (1-1)".

When the obtained copolymer solution was partially dried and the weight average molecular weight (Mw) was measured, Mw was 88,400, and Mw/Mn was 3.8.

Compositions and molecular weights of the copolymers (A-1) to (A-6) are shown in Table-1.

TABLE 1

| Production example number | Co-polymer No. | Copolymer composition | | | | | | Mw | Mw/Mn |
|---|---|---|---|---|---|---|---|---|---|
| | | Moiety derived from structure represented by Formula (1) | | Repeating unit represented by Formula (3) | | Other monomers | | | |
| | | No. | Content (wt %) | No. | Content (wt %) | No. | Content (wt%) | | |
| Production example 3 | (A-1) | (1-1) | 50 | (3-1) | 50 | — | 0 | 19,100 | 2.8 |
| Production example 4 | (A-2) | (1-1) | 45 | (3-1) | 55 | — | 0 | 24,100 | 3.2 |
| Production example 5 | (A-3) | (1-1) | 50 | (3-2) | 50 | — | 0 | 44,300 | 3.2 |
| Production example 6 | (A-4) | (1-1) | 45 | (3-1) | 45 | (4-1)/(4-2) | 5/5 | 41,800 | 3.8 |
| Production example 7 | (A-5) | (1-1) | 50 | (3-1) | 40 | (4-1)/(4-2) | 5/5 | 42,000 | 3.5 |
| Production example 8 | (A-6) | (1-2) | 50 | (3-1) | 40 | (4-1)1(4-2) | 5/5 | 88,400 | 3.8 |

Example 1

<Preparation of THF Dispersion Liquid of PTFE>

1.25 parts by mass (corresponding to 0.5 part by mass of solid content) of 40% by mass solution of the copolymer (A-1) produced in Production Example 3 were weighed, and were dissolved by 90 parts by mass of tetrahydrofuran, and then 10 parts by mass of polytetrafluoroethylene (hereinafter, PTFE) particles (KTL-500F manufactured by Kitamura Corporation: primary particle diameter 0.3 μm) were added thereto. Subsequently, the prepared solution was dispersed for one hour under ultrasonic conditions of an oscillation frequency of 40 kHz and a high frequency output of 600 W, and a THF dispersion liquid D1 of PTFE having a solid content of 10% by mass was prepared.

[Evaluation on Dispersion Stability in THF Dispersion Liquid of PTFE]

The THF dispersion Liquid D1 of PTFE stands for one night, and thereby dispersion stability was evaluated from the degree of sedimentation of PTFE particles. The results are shown in Table-2.

As a judgment of dispersibility, after THF dispersion Liquid D1 stood overnight, the case where almost no PTFE particles were deposited was determined as good (indicated by the symbol "○"), the case where a part of the PTFE particles were deposited and formed a sedimentation mass at the bottom of a container was determined as medium (indicated by the symbol "Δ"), and the case where many PTFE particles were deposited and the supernatant of the dispersion liquid was clear was determined as poor (indicated by the symbol "x").

[Evaluation on Dispersion Stability in Binder Resin Solution of PTFE]

2 parts by mass (corresponding to 0.8 part by mass of solid content) of 40% by mass solution of the copolymer (A-1) produced in Production Example 3 were weighed, and were dissolved by 180 parts by mass of tetrahydrofuran, and then 20 parts by mass of polytetrafluoroethylene (hereinafter, PTFE) particles (KTL-500F manufactured by Kitamura Corporation: primary particle diameter 0.3 μm) were added thereto. Subsequently, the prepared solution was dispersed for one hour under ultrasonic conditions of an oscillation frequency of 40 kHz and a high frequency output of 600 W, and a THF dispersion liquid D2 of PTFE having a solid content of 10% by mass was prepared.

100 parts by mass of polycarbonate resins PC-Z as a binder resin (UPITASE PCZ-400 manufactured by Mitsubishi Gas Chemical Co., Ltd., viscosity average molecular weight: 40,000) were dissolved in a mixed solvent of 457 parts by mass of tetrahydrofuran and 154 parts by mass of toluene, then 202 parts by mass (corresponding to 20 parts by mass of PTFE) of the THF dispersion liquid D2 of PTFE (solution immediately after dispersion) was added thereto, and the mixture was stirred for one hour, so as to prepare a binder resin-containing solution of PTFE.

The binder resin-containing solution of PTFE stood for one night, and thereby dispersion stability was evaluated from the degree of sedimentation of PTFE particles. The results are shown in Table-2.

As a judgment of dispersibility, after THF dispersion Liquid D1 stands overnight, the case where almost no PTFE particles were deposited was determined as good (indicated by the symbol "○"), the case where a part of the PTFE particles were deposited and formed a sedimentation mass at the bottom of a container was determined as medium (indicated by the symbol "Δ"), and the case where many PTFE particles were deposited and the supernatant of the dispersion liquid was clear was determined as poor (indicated by the symbol "x").

[Evaluation on Electrical Properties]
[Preparation of Photosensitive Sheet]

The preparation of a undercoat layer dispersion liquid was performed according to the following method. That is, rutile-type titanium oxide with an average primary particle diameter of 40 nm ("TTO55N" manufactured by Ishihara Sangyo Kaisha, Ltd.) and 3% by mass of methyl dimethoxysilane ("TSL 8117" manufactured by Toshiba Silicone Co., Ltd.) relative to the titanium oxide were added to a high-speed liquid mixing mixer ("SMG 300" manufactured by Kawata Mfg. Co., Ltd.). Surface-treated titanium oxide obtained by being high-speed mixed at a rotation circumferential speed of 34.5 m/sec was dispersed in a mixed solvent of methanol and 1-propanol by ball mill, so as to form dispersion slurry of hydrophobized titanium oxide.

The dispersion slurry, a mixed solvent including methanol, 1-propanol, and toluene, and pellets of copolymerized polyamide were heated, stirred, and mixed, so as to dissolve the pellets of polyamide. The copolymerized polyamide is formed of s-caprolactam [a compound represented by the following formula (F)], bis(4-amino-3-methylcyclohexyl)methane [a compound represented by the following formula (G)], hexamethylene diamine [a compound represented by the following formula (H)], decamethylene dicarboxylic acid [a compound represented by the following formula (I)], and octadecamethylenedicarboxylic acid [a compound represented by the following formula (J)], the composition molar ratios of which are respectively 60%, 15%, 5%, 15%, and 5%. Thereafter, ultrasonic dispersion treatment was performed so as to prepare the undercoat layer dispersion liquid, which contains methanol/1-propanol/toluene in a weight ratio of 7/1/2, and hydrophobized titanium oxide/copolyamide in a mass ratio of 3/1, and has a solid content concentration of 18.0%.

Figure 2:
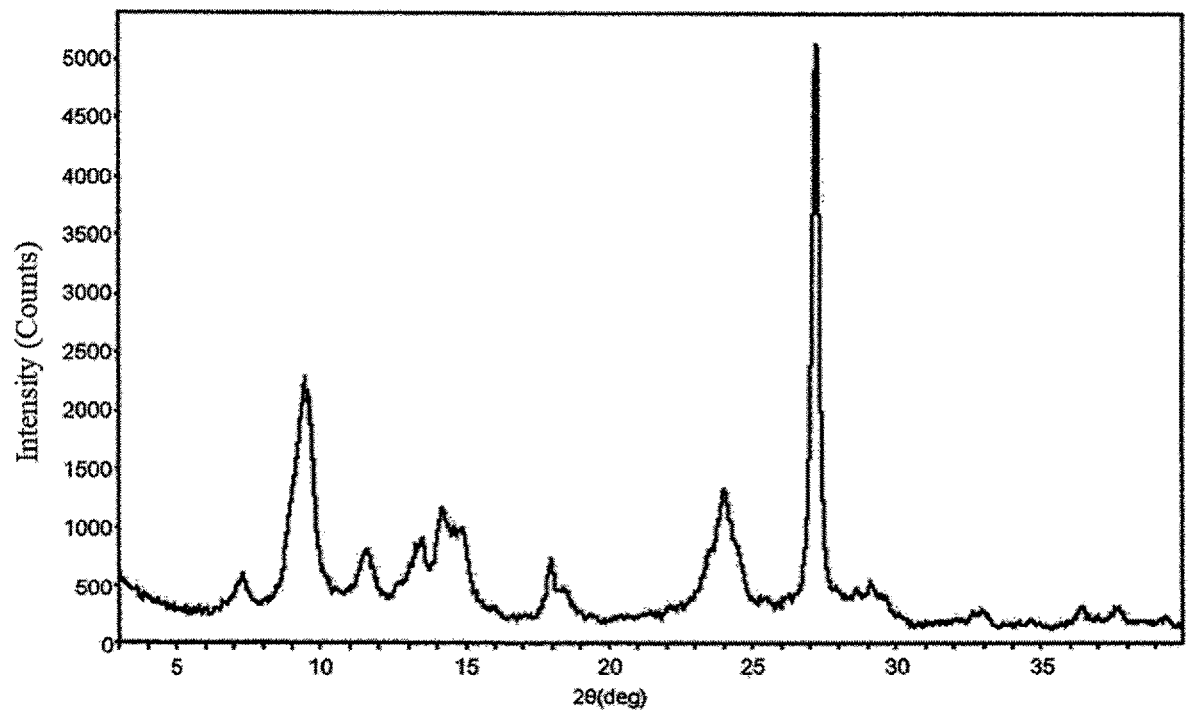
FIG. 2 is a diagram showing an X-ray diffraction spectrum by a CuKα characteristic X-ray of oxytitanium phthalocyanine used in the example.

The preparation of a charge generation layer forming coating liquid was performed according to the following method. 10 parts by mass of oxytitanium phthalocyanine exhibiting intense diffraction peak at a Bragg angle (2θ±0.2) of 27.3° in the X-ray diffraction obtained with CuKα characteristic X-ray, and having an X-ray powder diffraction spectrum as illustrated in FIG. 2 were added to 150 parts by mass of 1,2-dimethoxyethane, and the mixture was subjected to a pulverization and dispersion treatment with a sand grinding mill, so as to prepare a pigment dispersion liquid. 160 parts by mass of the pigment dispersion thus obtained, 100 parts by mass of 5% 1,2-dimethoxyethane solution of polyvinyl butyral (trade name #6000C, manufactured by Denki Kagaku Kogyo K.K.), an appropriate amount of 1,2-dimethoxyethane were mixed, so as to finally prepare a dispersion liquid having a solid content concentration of 4.0%.

The preparation of a charge transport layer forming coating liquid was performed according to the following method. As a charge transport substance, 50 parts by mass of a mixture (CTM1) prepared by a method described in Example 1 of JP-A-2002-080432, including a compound group of a geometric isomer whose main component is the structure shown below, 100 parts by mass of PC-ZB (viscosity average molecular weight 50,000) consisting of a repeating structure shown below as a binder resin, 4 parts by mass of an antioxidant (IRGANOX 1076), and 0.05 part by mass of silicone oil as a leveling agent were dissolved in a mixed solvent of 290 parts by mass of tetrahydrofuran and 112 parts by mass of toluene. Thereafter, 100 parts by mass (corresponding to 10 parts by mass of PTFE) of the above THF dispersion of PTFE (5 parts by mass of copolymers, solution immediately after dispersion) were added and mixed with the above mixture for one hour or longer, so as to prepare the charge transport layer forming coating liquid.

This undercoat layer dispersion liquid was applied to a polyethylene terephthalate sheet, on which aluminum was vapor-deposited on the surface, with a bar coater, and dried to form a undercoat layer, having a film thickness of 1.25 μm after drying. Subsequently, a charge generation layer forming coating liquid was applied to the above undercoat layer and dried to form a charge generation layer, having a film thickness of 0.4 μm after drying.

Next, a charge transporting coating liquid was applied onto the charge generation layer with an applicator and dried at 125° C. for 20 minutes to form a charge transport layer, having a film thickness of 25 μm after drying. Thus, a photosensitive sheet was prepared.

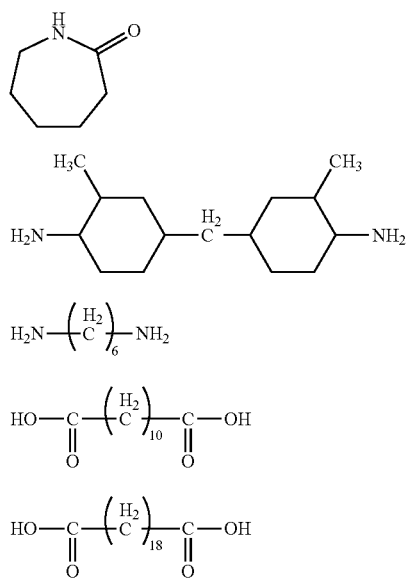

F

G

H

I

J

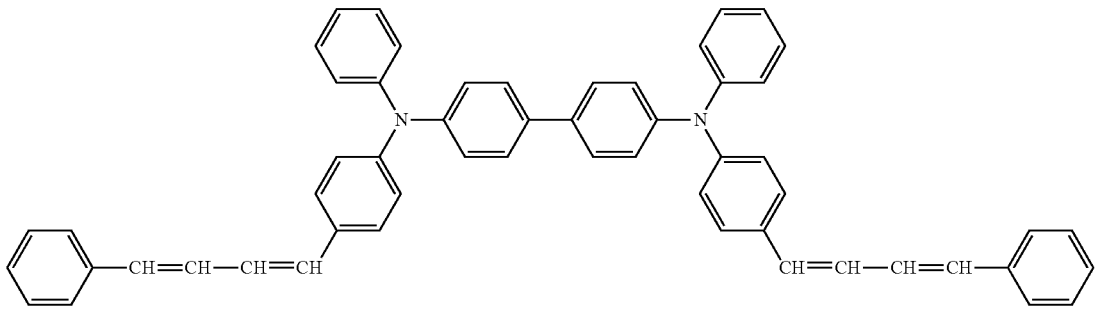

CHARGE TRANSPORT MATERIAL (CTM-1)

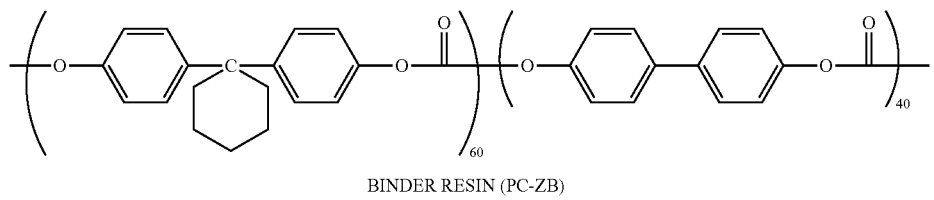

BINDER RESIN (PC-ZB)

[Evaluation on Residual Potential in Repeated Use]

The photosensitive sheet prepared above was attached to an aluminum drum to be formed into a cylindrical shape, and after a conduction between the aluminum drum and the aluminum substrate of the photoreceptor, the drum was rotated at a constant number of revolutions, and an electrical property evaluation test was performed by a cycle of charging, exposure, potential measurement, and charge elimination by using an electrophotography property evaluation apparatus manufactured in accordance with the measurement standards of The Society of Electrophotography of Japan (as described in Foundation and Application of Electrophotographic Technique (Continued), edited by The Society of Electrophotography of Japan, CORONA PUBLISHING CO., LTD., Pages 404 to 405). At that time, the initial surface potential was set to −700 V, monochromatic light of 780 nm was used in the exposure and monochromatic light of 660 nm was used in the static elimination, and the surface potential (residual potential: VL) at the time when exposure light irradiated was 2.4 kJ/cm$^2$ was measured. For the VL measurement, the time required for the potential measurement from the exposure was set to 139 ms.

VL after repeating the above process 5000 times was measured, and the VL difference before and after the repeated measurement was described as ΔVL. The measurement was performed in an environment in which temperature was 35° C. and relative humidity (H/H) was 85% or lower. The smaller the value of VL is, the better the electrical properties are, and the smaller ΔVL is, the better the electrical properties are. The results are shown in Table-2.

Examples 2 to 6

Examples 2 to 6 were implemented in the same manner as Example 1 except that the copolymers (A-2) to (A-6) as shown in Table 2 were used instead of the copolymer (A-1). The evaluation results are shown in Table-2.

Comparative Example 1

Comparative Example 1 was implemented in the same manner as Example 1 except that a fluorinated graft polymer which has a structure shown below, and consists of a structure B-11 and a structure B-12 (B-1: Mw 85,000, l:m=84:16 (molar ratio), n=30, (structure B-11):(structure B-12)=40:60 (weight ratio)) was used instead of the copolymer (A-1). The evaluation results are shown in Table-2.

(B-1)

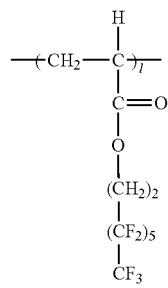

STRUCTURE B-11

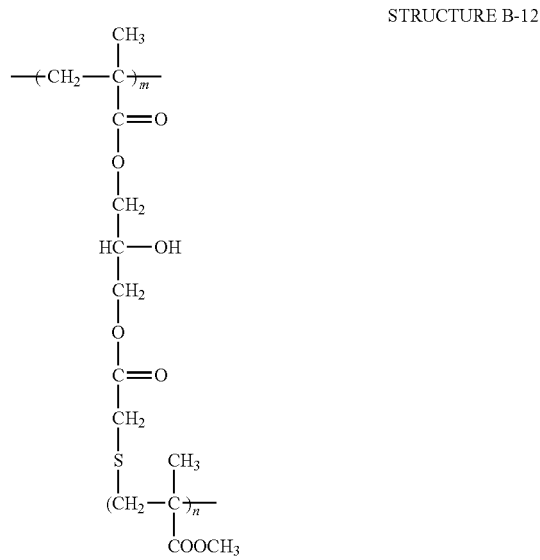

STRUCTURE B-12

Comparative Example 2

Comparative Example 2 was implemented in the same manner as Example 1 except that the copolymer (A-1) was not used. The evaluation results are shown in Table-2.

TABLE 2

| Example Comparative example number | Co- polymer number | Dispersion stability of THF solution | Dispersion stability of binder resin solution | Electrical properties (H/H) Initial VL (-V) | VL after repeating 5000 times (-V) | ΔVL |
|---|---|---|---|---|---|---|
| Example 1 | (A-1) | ○ | ○ | 41 | 201 | 160 |
| Example 2 | (A-2) | ○ | ○ | 40 | 198 | 158 |
| Example 3 | (A-3) | ○ | ○ | 43 | 231 | 188 |
| Example 4 | (A-4) | ○ | ○ | 40 | 211 | 171 |
| Example 5 | (A-5) | ○ | ○ | 45 | 230 | 185 |
| Example 6 | (A-6) | ○ | ○ | 41 | 205 | 164 |
| Comparative example 1 | (B-1) | ○ | ○ | 43 | 249 | 206 |
| Comparative example 2 | absent | x | x | 44 | 195 | 151 |

As apparent from Table-2, by using the copolymer according to the present invention, the dispersion stability of the fluororesin particles in the solvent and the dispersion stability in the binder resin solution are excellent. In addition, the electrophotographic photoreceptor produced by using the dispersion liquid was excellent in electrical properties.

In contrast, in the case of using a fluorinated graft polymer consisting of different structures (Comparative Example 1), dispersion stability was insufficient, and furthermore, the electrical properties of the electrophotographic photoreceptor using the fluorinated graft polymer were inferior.

In addition, in a case where the copolymer was not added, the dispersion stability of the fluororesin particles was very poor, and unevenness due to particle lumps was generated in the coating film (Comparative Example 2).

<Preparation of Electrophotographic Photoreceptor Drum>

<Preparation of Undercoat Layer Forming Coating Liquid>

1 kg of a raw-material slurry obtained by mixing 120 parts by mass of methanol with 50 parts by mass of surface-treated titanium oxide obtained by mixing rutile titanium oxide having an average primary particle diameter of 40 nm ("TTO55N", manufactured by Ishihara Sangyo Co., Ltd.) with methyldimethoxysilane ("TSL8117", manufactured by Toshiba Silicone Co., Ltd.), in an amount of 3% by mass based on the titanium oxide, by means of a Henschel mixer, was subjected to a 1-hour dispersing treatment with Ultra Apex Mill (Type UAM-015) manufactured by Kotobuki Industries Co., Ltd., which had a mill capacity of about 0.15 L, using zirconia beads having a diameter of about 100 μm ("YTZ", manufactured by Nikkato Corp.) as a dispersing medium, while circulating the liquid under the conditions of a rotor peripheral speed of 10 m/sec and a liquid flow rate of 10 kg/hr. Thus, a titanium oxide dispersion liquid was prepared.

The titanium oxide dispersion liquid, a mixed solvent of methanol/1-propanol/toluene, and pellets of the same polyamide resin as that used in preparation of the undercoat layer dispersion liquid during preparation of the photosensitive sheet were stirred and mixed with heating, so as to dissolve the polyamide pellets. Thereafter, the mixture was subjected to an ultrasonic dispersion treatment by using an ultrasonic transmitter with an output of 1200 W for one hour, and was further filtrated with PTFE membrane filter (Mitex LC, manufactured by Advantech Co., Ltd.) having a pore diameter of 5 μm. Thus, an undercoat layer forming coating liquid having surface-treated titanium oxide/copolymer polyamide in a mass ratio of 3/1, methanol/1-propanol/toluene in a mass ratio of 7/1/2, and a solid concentration of 18.0% by mass was prepared.

<Preparation of Charge Generation Layer Forming Coating Liquid>

As the charge generation substance, 20 parts by mass of oxytitanium phthalocyanine showing an X-ray diffraction spectrum by CuKα characteristic X-ray in FIGS. 2 and 280 parts by mass of 1,2-dimethoxyethane were mixed with each other, and the mixture was subjected to a pulverization/dispersion treatment for one hour by using a sand grinding mill.

Subsequently, the resultant fine treatment liquid was mixed with a binder solution obtained by dissolving 10 parts by mass of polyvinyl butyral (trade name "Denka Butyral" #6000C, manufactured by Denki Kagaku Kogyo K.K.) in a mixed solution containing 255 parts by mass of 1,2-dimethoxyethane and 85 parts by mass of 4-methoxy-4-methyl-2-pentanone, and with 230 parts by mass of 1,2-dimethoxyethane, so as to prepare a charge generation layer forming coating liquid A.

Figure 3:
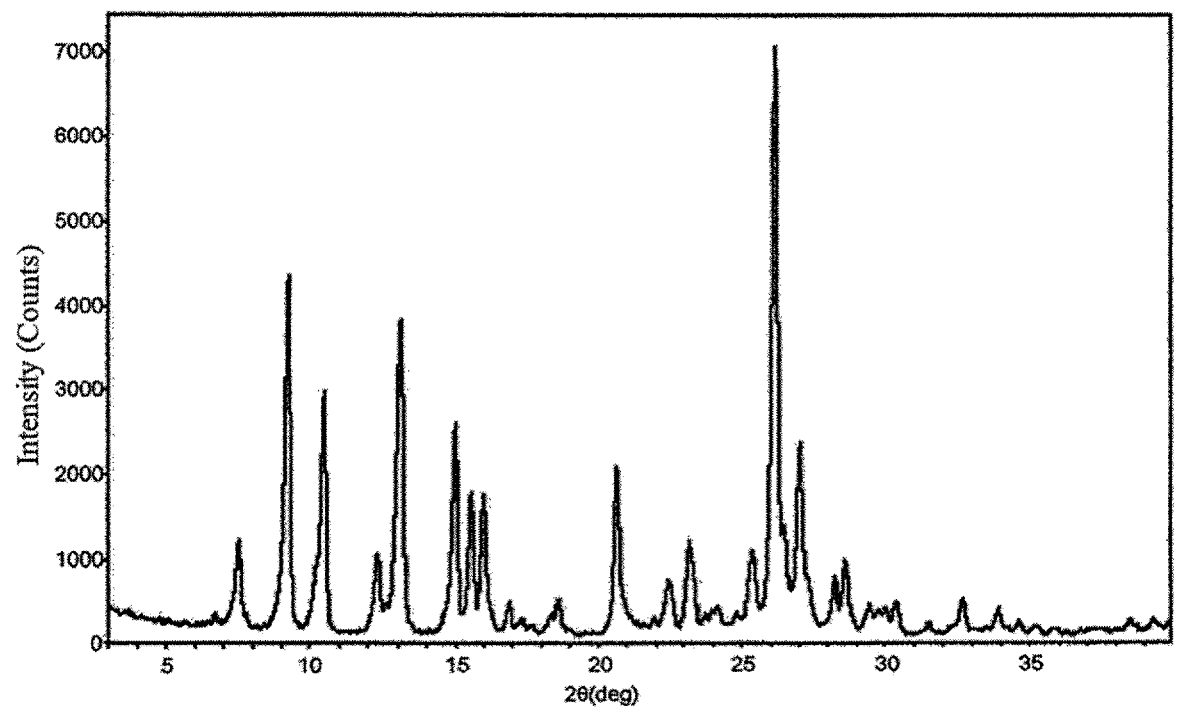
FIG. 3 is a diagram showing an X-ray diffraction spectrum by a CuKα characteristic X-ray of oxytitanium phthalocyanine used in the example.

As the charge generation substance, 20 parts by mass of oxytitanium phthalocyanine showing an X-ray diffraction spectrum by CuKα characteristic X-ray in FIG. 3 and 280 parts by mass of 1,2-dimethoxyethane were mixed with each other, and the mixture was subjected to a pulverization/dispersion treatment for four hours by using a sand grinding mill.

Subsequently, the resultant fine treatment liquid was mixed with a binder solution obtained by dissolving 10 parts by mass of polyvinyl butyral (trade name "Denka Butyral" #6000C, manufactured by Denki Kagaku Kogyo K.K.) in a mixed solution containing 255 parts by mass of 1,2-dimethoxyethane and 85 parts by mass of 4-methoxy-4-methyl-2-pentanone, and with 230 parts by mass of 1,2-dimethoxyethane, so as to prepare a charge generation layer forming coating liquid B.

The charge generation layer forming coating liquid A and the charge generation layer forming coating liquid B are mixed at a mass ratio of 55:45, so as to prepare the charge generation layer forming coating liquid used in the example.

<Preparation of Charge Transport Layer Forming Coating Liquid>

[Coating liquid C1]

0.5 part by mass of the copolymer (A-1) produced in Production Example 3 was dissolved in 90 parts by mass of tetrahydrofuran, then 10 parts by mass of PTFE particles (primary particle diameter 0.3 μm) were added thereto, and this liquid was dispersed under high pressure by a high speed liquid collision type disperser to obtain a PTFE dispersion liquid.

100 parts by mass of PC-ZB, 60 parts by mass of CTM 1, 2 parts by mass of antioxidant 2,6-di-tert-butyl-4-methyl-phenol, and 0.05 part by mass of dimethylpolysiloxane (KF 96-10CS manufactured by Shin-Etsu Chemical Co., Ltd.) were added to a solution of 430 parts by mass of tetrahydrofuran and 65 parts by mass of toluene, and 100.5 parts by mass of the above PTFE dispersion liquid were added to the mixture, so as to prepare a charge transport layer forming coating liquid C1.

[Coating Liquid C2]

A coating liquid C2 was prepared in the same manner as that of the coating liquid C1 except that the copolymer (A-1) in the above coating liquid was changed to the copolymer (A-4) produced in Production Example 6.

[Coating Liquid C3]

A coating liquid C3 was prepared in the same manner as that of the coating liquid C1 except that the copolymer (A-1) in the above coating liquid was changed to the fluorinated graft polymer (B-1).

[Coating Liquid C4]

A coating liquid C4 was prepared in the same manner as that of the coating liquid C1 except that the copolymer (A-1) in the above coating liquid was changed to the copolymer (A-2) produced in Production Example 4.

[Coating Liquid C5]

A coating liquid C5 was prepared in the same manner as that of the coating liquid C1 except that the copolymer (A-1) in the above coating liquid was changed to the copolymer (A-5) produced in Production Example 7.

<Preparation of Photoreceptor Drum>

An undercoat layer forming coating liquid, a charge generation layer forming coating liquid, and a charge transport layer forming coating liquid which were prepared in the preparation example of the coating liquid were sequentially applied to a cylinder made of an aluminum alloy, of which the surface was subjected to a cutting process, and having an external diameter of 24 mm, a length of 248 mm, and a film thickness of 0.75 mm, by using a dip coating method, and dried so as to form an undercoat layer, a charge generation layer, and a charge transport layer such that the film thicknesses thereof after drying respectively were 1.5 km, 0.4 µm, and 36 µm, and thereby an electrophotographic photoreceptor drum was prepared. It should be noted that the charge transport layer was dried at 125° C. for 24 minutes.

<Image Test>

The obtained photoreceptor was mounted on a photoreceptor cartridge of a monochrome printer ML6510 manufactured by Samsung Co., Ltd., and continuous printing of 600,000 sheets was performed at a coverage rate of 5% under a temperature of 25° C. and a relative humidity of 50%. The film thickness of the charge transport layer after the printing was measured, the reduction in film thickness of the charge transport layer before and after the printing was confirmed, and the printing durability was evaluated. The smaller the value, the more excellent the abrasion resistance is.

Examples 7 to 10, Comparative Example 3

The photosensitive drums shown in Table 3 were produced, and the printing durability and the electrophotographic photoreceptor were evaluated. The results are shown in Table-3.

TABLE 3

| Example Comparative example number | Coating liquid number | Copolymer number | reduction in film thickness (µm) |
|---|---|---|---|
| Example 7 | C1 | (A-1) | 2.03 |
| Example 8 | C2 | (A-4) | 2.13 |
| Comparative example 3 | C3 | (B-1) | 2.74 |
| Example 9 | C4 | (A-2) | 2.16 |
| Example 10 | C5 | (A-5) | 2.20 |

It is apparent from Table 3 that the electrophotographic photoreceptor using the copolymer according to the present invention is excellent in the abrasion resistance.

While the present invention has been described in detail and with reference to specific embodiments, it will be apparent to those skilled in the art that various changes and modifications can be made without departing from the spirit and scope of the present invention. This application is based on Japanese Patent Application (Japanese Patent Application No. 2017-050855) filed on Mar. 16, 2017, the contents of which are incorporated herein by reference. In addition, all references cited herein are incorporated in their entirety.

REFERENCE SIGNS LIST

1 Electrophotographic photoreceptor
2 Charging device (charging roller)
3 Exposure device
4 Developing device
5 Transfer device
6 Cleaning device
7 Fixing device
41 Developing tank
42 Agitator
43 Supply roller
44 Developing roller
45 Regulating member
71 Upper fixing member (pressurizing roller)
72 Lower fixing member (fixing roller)
73 Heating device
T Toner
P Recording paper

The invention claimed is:

1. An electrophotographic photoreceptor comprising:.
a photosensitive layer on a conductive support, wherein the photosensitive layer is a lamination-type photosensitive layer containing at least a charge generation layer comprising a charge generation substance, and a charge transport layer comprising a charge transport substance and binder resin, or a single-layer type photosensitive layer comprising a charge generation substance dispersed in a layer comprising a charge transport substance and a binder resin: and
an outermost layer, wherein the outermost layer is opposite the conductive support, comprising fluororesin particles, and a polymer containing a repeating unit represented by the following Formula (A1) and (A3):

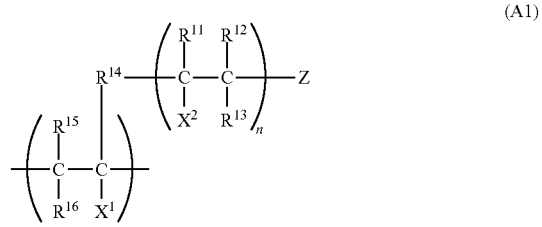

wherein in the formula (A1), $X^1$ and $X^1$ each independently represent a hydrocarbon group which may have a substituent, or a group represented by the following Formula (A2); $R^{11}$ represents a hydrogen atom, or a hydrocarbon group which may have a substituent; $R^{12}$, $R^{13}$, $R^{15}$, and $R^{16}$ represent a hydrogen atom; $R^{14}$ represents a methylene group; Z represents a terminal group; and n represents an integer of 2 or more, and

wherein in the Formula (A2), $R^{21}$ represents a hydrogen atom, a hydrocarbon group which may have a substituent, or a heterocyclic group which may have a substituent,

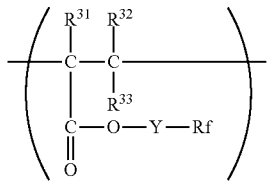
(A3)

wherein in the Formula (A3), Y represents a single bond or a divalent group; Rf represents a group having a C-F bond; $R^{31}$ represents a hydrogen atom or a hydrocarbon group; and $R^{32}$ and $R^{33}$ represent a hydrogen atom.

2. The electrophotographic photoreceptor according to claim 1, wherein at least one of $X^1$ and $X^2$ in the Formula (A1) is a group represented by the Formula (A2).

3. The electrophotographic photoreceptor according to claim 1, wherein the weight average molecular weight (Mw) of the polymer is 10,000 to 200,000.

4. The electrophotographic photoreceptor according to claim 1, wherein the weight average molecular weight of the repeating, unit represented by the Formula (A1) is 2,000 to 20,000.

5. The electrophotographic photoreceptor according to claim 1, wherein Rf in the Formula (A3) is a linear perfluoroalkyl group having 4 to 6 carbon atoms.

6. The electrophotographic photoreceptor according to claim 1, wherein the content of the repeating unit represented by the Formula (A1) is 1% by mass to 80% by mass based on the entire polymer.

7. An electrophotographic photoreceptor cartridge comprising:
the electrophotographic photoreceptor according to claim 1, and
at least one device selected from the group consisting of a charging device which charges the electrophotographic photoreceptor, an exposure device which exposes the charged electrophotographic photoreceptor to form an electrostatic latent image, and a developing device which develops the electrostatic latent image formed on the electrophotographic photoreceptor.

8. An image forming apparatus comprising:
the electrophotographic photoreceptor according to claim 1,
a charging device which charges the electrophotographic photoreceptor to,
an exposure device which exposes the charged electrophotographic photoreceptor to form an electrostatic latent image, and a developing device which develops the electrostatic latent image formed on the electrophotographic photoreceptor.

9. The electrophotographic photoreceptor according to claim 1, wherein the lavers are in the following order: the charge transport layer, the charge generation layer, the conductive support, and wherein the charge transport layer is the outermost layer.

\* \* \* \* \*